United States Patent [19]
Taniguchi et al.

[11] 4,373,793
[45] Feb. 15, 1983

[54] LIGHT MEASURING DEVICE FOR FLASH PHOTOGRAPHY

[75] Inventors: Nobuyuki Taniguchi, Sakai; Yoshio Yuasa, Kawachinagano, both of Japan

[73] Assignee: Minolta Camera Co., Ltd., Sakai, Japan

[21] Appl. No.: 289,384

[22] Filed: Aug. 3, 1981

[30] Foreign Application Priority Data

| Aug. 4, 1980 [JP] | Japan | 55-107607 |
| Aug. 5, 1980 [JP] | Japan | 55-107508 |
| Jul. 21, 1981 [JP] | Japan | 56-114687 |

[51] Int. Cl.³ .......... G03B 15/05; G01J 1/46; H05B 41/38

[52] U.S. Cl. .......... 354/31; 354/33; 354/60 L; 354/60 F; 354/127; 356/215; 356/222; 315/151; 315/155; 315/158; 315/241 P; 250/214 P

[58] Field of Search .......... 354/31, 27, 32–35, 354/60 E, 60 F, 60 L, 53, 127, 128, 230, 132, 139, 145, 149; 250/214 P; 356/215, 218, 222, 226; 315/151, 155, 241 P, 158

[56] References Cited

U.S. PATENT DOCUMENTS 4,291,979 9/1981 Yuasa et al. .......... 356/215 X

*Primary Examiner*—William B. Perkey
*Attorney, Agent, or Firm*—Jackson, Jones & Price

[57] ABSTRACT

The disclosure is directed to an improved light measuring device which is used in flash photography for measuring a preliminary flash light to obtain camera exposure information for photography under a primary flash light. The device is so arranged as to preliminarily obtain informations of light amount contributing to photographing, with respect to each portion or area of a scene to be photographed or object field, in taking photographs with the employment of the auxiliary light.

35 Claims, 37 Drawing Figures

LIGHT MEASURING DEVICE FOR FLASH PHOTOGRAPHY

BACKGROUND OF THE INVENTION

The present invention generally relates to photography and more particularly, to a light measuring device for use in flash photography to be effected by firing a flash light source (referred to as an auxiliary light source hereinbelow) under ambient light.

Generally, the purpose for employing an auxiliary light source under ambient light conditions is to adjust contrast between different portions or areas in a scene to be photographed or the object field. For example, when a main object to be photographed is dark as compared with the background due to rear light or the like, the brightness of the main object can be increased with the use of the auxiliary light for adjusting the contrast with respect to the background as desired.

However, there has not been conventionally proposed any satisfactory light measuring device which is suitable for taking photographs by adjusting the contrast between respective portions in the scene to be photographed as desired by a photographer, with the employment of the auxiliary light source. Up to the present, for taking photographs as required, it has been a common practice that a photographer well experienced in photographing adjusts the lighting based on his experience. However, the practice as described above is nothing but a qualitative control of the contrast after all, and the quantitative control thereof has not been actually effected. Furthermore, it has been extremely difficult for photographers in general even to control the contrast qualitatively.

SUMMARY OF THE INVENTION

Accordingly, an essential object of the present invention is to provide an improved light measuring device which is capable of preliminarily obtaining information of the amount of light contributing to photographing, with respect to each portion or area of a scene to be photographed or object field when employing an auxiliary light.

Another important object of the present invention is to provide an improved light measuring device of the above described type which is capable of obtaining an average value of said information thus obtained, and displaying said informations for comparison.

A further object of the present invention is to provide an improved light measuring device of the above described type which is capable of preliminarily finding the contrast between respective portions or areas in a scene to be photographed during photographing employing the auxiliary light.

A still further object of the present invention is to provide an improved light measuring device of the above described type which is capable of preliminarily obtaining exposure information for achieving set contrast, judging whether or not the value thus obtained can be effected, and also, detecting that the exposure information for achieving the set contrast is impractical.

A further object of the present invention is to provide an improved light measuring device of the above described type which is capable of achieving optimum exposure in photographing employing an auxiliary light.

Still another object of the present invention is to provide an improved light measuring device of the above described type which may be applied to an exposure control device of a photographic camera.

In accomplishing these and other objects, according to one preferred embodiment of the present invention, there is provided a light measuring device to be used in flash photography for measuring a preliminary flash light to obtain camera exposure information for photography under a primary flash light, which includes a plurality of means for receiving light coming from various areas of the object field, respectively, means for producing outputs in response to said plurality of means, respectively, means for respectively integrating the individual outputs of said producing means during a predetermined period of time including at least the duration time of the preliminary flashing to obtain a first group of signals, respectively, means for obtaining a second group of signals respectively including light intensity information of said various areas without the influence of the preliminary flash light, by utilizing the individual outputs of said producing means, respectively, means for setting an exposure time signal, and means for respectively processing at least each of said first group of signals and each of said second group of signals with said exposure time signal to respectively obtain informations of light amount effective in determining the exposure on various areas of the photosensitive surface corresponding to said various areas of the object field upon photography under the primary flash light.

By the arrangement according to the present invention as described above, an improved light measuring device, which makes it possible to take photographs at a contrast of a desired value, has been advantageously presented, with substantial elimination of disadvantages inherent in the conventional light measuring devices of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

First Embodiment

The basic concept of the present invention is to control the contrast of objects in a scene to be photographed through employment of an auxiliary light source, for example, a flash light emitting device such as an electronic flash or the like. More specifically, on the assumption that brightness at two portions in a scene to be photographed are respectively represented by $2^{Bv1}$ and $2^{Bv2}$, and reflected light amounts from the two portions by an auxiliary light source are denoted by $2^{Qv f1}$ and $2^{Qv f2}$, which exposure time being represented by $2^{-Tv}$, the ratio of light amounts contributing to the exposure of a photosensitive member by the two portions may be represented by $$(2^{Bv1-Tv}+2^{Qvf1})/(2^{Bv2-Tv}+2^{Qvf2}) \tag{1}$$

Here, upon definition as $$2^{Bv1-Tv}+2^{Qvf1}=2^{Qvt1} \tag{2-1}$$

$$2^{Bv2-Tv}+2^{Qvf2}=2^{Qvt2} \tag{2-2}$$

the contrast of the two portions reproduced on the photosensitive member will be $$2^{Qvt1}/2^{Qvt2}=2^{\Delta C} \tag{3-1}$$

which may be denoted in the APEX system as follows.

$$Qvt1-Qvt2=\Delta C \tag{3-2}$$

where Qvt1 and Qvt2 are equivalent to values in the APEX system of the light amounts of two photographic objects contributing to the exposure for the photosensitive member.

Accordingly, it becomes possible to control the contrast by controlling the exposure time and light emitting amount of the auxiliary light source. Moreover, the exposure level may be controlled through adjustments of diaphragm aperture values.

Figure 1:
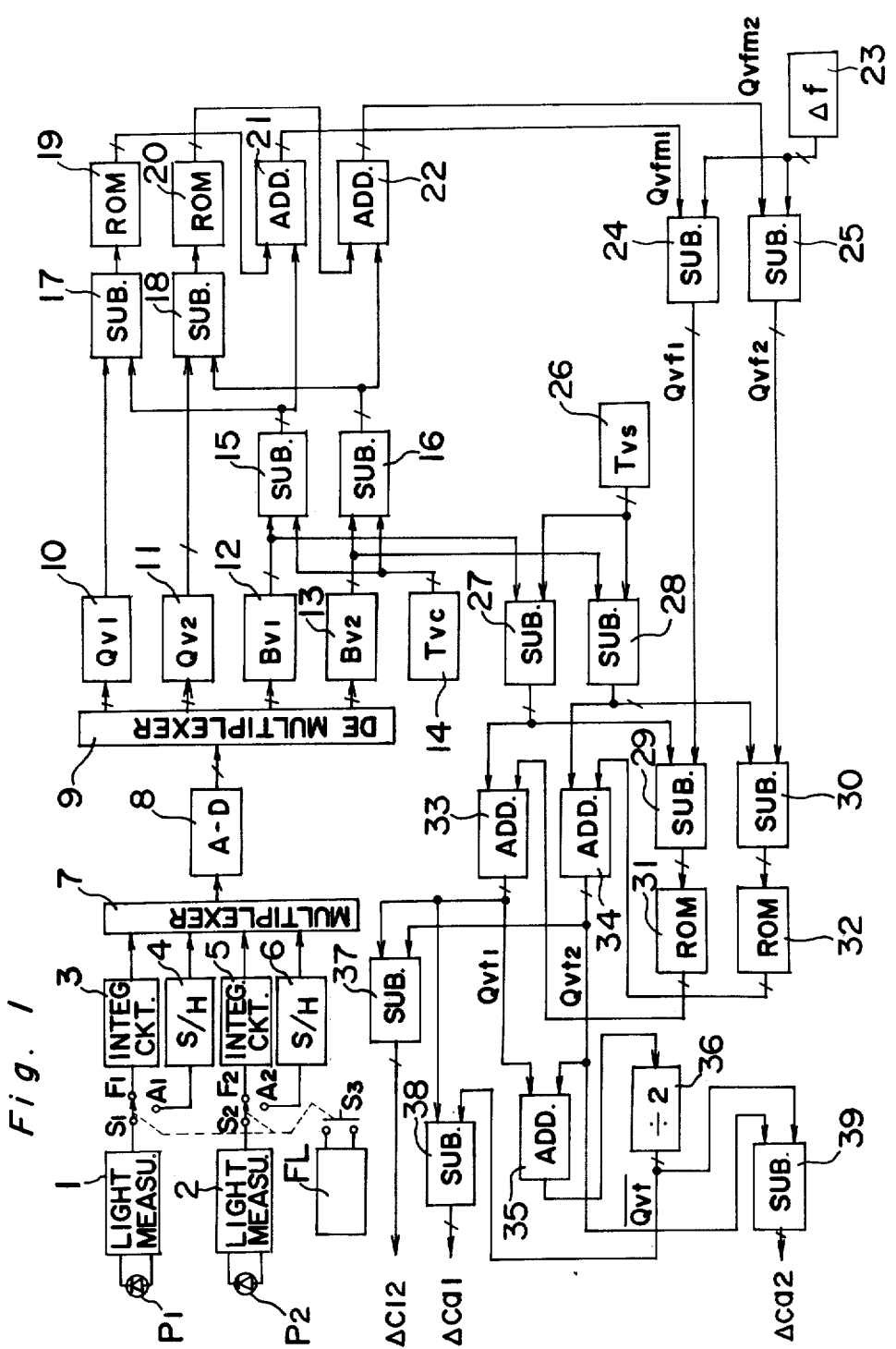
FIG. 1 is an electrical block diagram showing the construction of a light measuring device according to one preferred embodiment of the present invention.

Referring now to the drawings, there is shown in FIG. 1 a general circuit arrangement of a light measuring device for photographing by the use of an auxiliary light according to a first embodiment of the present invention.

The light measuring device of FIG. 1 generally includes light measuring circuits 1 and 2 respectively having photoelectric elements P1 and P2 for measuring light intensities of different portions in the scene to be photographed, and coupled, through change-over switches S1 and S2, to corresponding integration circuits 3 and 5 which produce signals corresponding to logarithmically compressed values of the received light amounts and which are respectively associated with sample-and-hold circuits 4 and 6 for sampling and holding the outputs of the light measuring circuits 1 and 2, and also a flash light emitting device FL which is associated with the light measuring circuits 1 and 2 and integration circuits 3 and 5 through a trigger switch S3 and arranged to be normally open so as to be closed for a predetermined period of time upon reception of a starting signal (not shown) for the light measuring.

The change-over switches S1 and S2 are normally connected to terminals A1 and A2 leading to the sample hold circuits 4 and 6, and adapted to be changed over to terminals F1 and F2 connected to the integration circuits 3 and 5 for a predetermined period of time by the starting signal for the light measuring. The integration circuits 3 and 5 and sample-and-hold circuits 4 and 6 are connected to a analog multiplexer 7 which is further coupled to a digital de-multiplexer through an A-D converter 8. It is to be noted that signal lines marked with slashes represent those dealing with digital signals with a plurality of bits. Connected to the de-multiplexer 9 are a register 10 in which digital data corresponding to the signal Qv1 from the integration circuit 3 are set, another register 11 in which digital data corresponding to the signal Qv2 from the integration circuit 5 are set, a still another register 12 in which digital data corresponding to the signal Bv1 from the sample-and-hold circuit 4 are set, and a further register 13 in which digital data corresponding to the signal Bv2 from the sample-and-hold circuit 6 are set. The registers 10, 11, 12 and 13 are further coupled as shown to subtractors or subtraction circuits 17, 18, 15 and 16, ROM 19 and 20, adders or addition circuits 21 and 22, subtraction circuits 24, 25, 27, 28, 29 and 30, ROM 31 and 32, addition circuits 33, 34 and 35, a divider 36, and subtraction circuits 37, 38 and 39, while a fixed data output circuit 14 for producing fixed data corresponding to the APEX value Tvc of the integration time is connected to the subtraction circuits 15 and 16, and a circuit 23 for producing a data representative of $\Delta f$ which corresponds to a change in the guide number in APEX system between the preliminary flashing and a primary flashing, is coupled to the subtraction circuits 24 and 25, with an exposure data output circuit 26 for producing data corresponding to the APEX value Tvs for the set exposure time being coupled to the subtraction circuits 27 and 28.

The subtraction circuits 15 to 18, ROM 19 and 20, addition circuits 21 and 22, subtraction circuits 24, 25, 27, 28, 29 and 30, ROM 31 and 32, addition circuits 33 to 35, divider 36, and subtraction circuits 37 to 39, etc. are blocks for calculations, and represented in the manner as in the diagram of FIG. 1 for better understanding of the contents of calculations, but in the actual production of the light measuring device according to the present invention, instructions may be prepared based on a flow of calculation shown in the diagram through employment of a micro-computer. It should also be noted that blocks for controlling change-over of the switches S1, S2 and S3, timing for controlling the sample-and-hold circuits 4 and 6, data selection signal and signal change-over of the multiplexer 7 and de-multiplexer 9, timing for the A-D conversion, etc. are omitted here for brevity, because preparation of a timing controller for controlling each block at timings as described in the following description of functionings is obvious to those skilled in the art, and such control may also be readily effected through employment of a micro-computer.

By the above arrangement, upon depression of a light measuring button (not shown) in the first place, the switch S1 is connected to the terminal F1 and the switch S2, to the terminal F2 for a predetermined period of time (i.e. the integration time described earlier, Tvc in APEX value), with the switch S3 being closed for causing the flash light emitting device FL to emit light. The above integration time is arranged to be longer than the maximum light emitting time of the flash light emitting device FL. After the predetermined period of time, since the switches S1 and S2 are respectively connected to the terminals A1 and A2 again, input signal to the integration circuits 3 and 5 is suspended, and thus, the integration output is regarded as being sampled and held. Subsequently, the outputs of the light measuring circuits 1 and 2 are sampled and held by said circuits 4 and 6.

Figure 9:
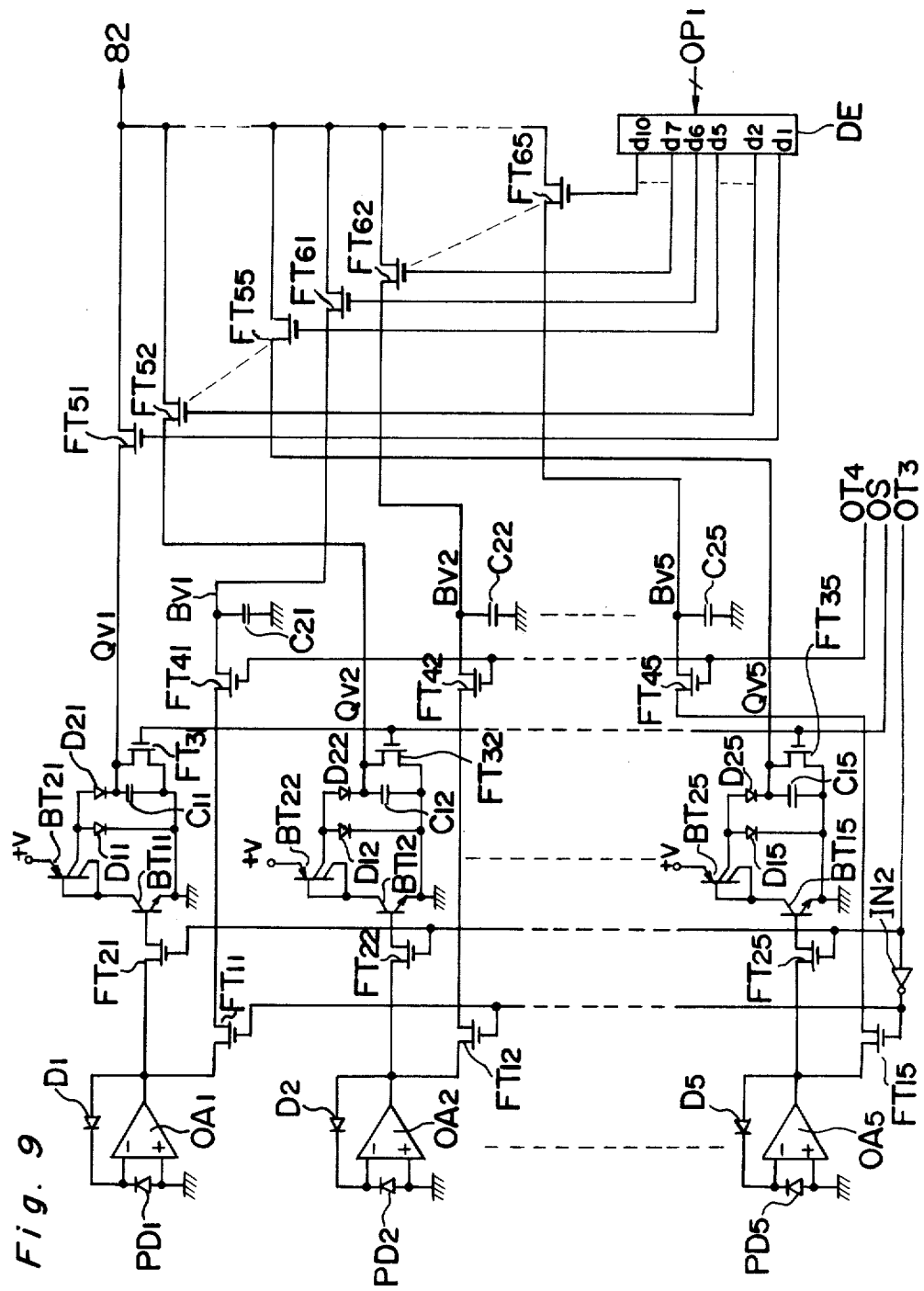
FIG. 9 is an electrical circuit diagram showing specific examples of circuit constructions of light measuring circuits and multiplexers employed in the circuit arrangement of FIG. 8, FIGS. 10(A), 10(B), 11(A), 11(B), 12(A), 12(B), 12(C), 13, and 14 are flow-charts explanatory of functions of a micro-computer employed in the circuit arrangement of FIG. 8.

Incidentally, the integration circuits 3 and 5 produce the logarithmically compressed values of the integrated values of the current corresponding to the output current from the photoelectric elements P1 and P2 in the light measuring circuits 1 and 2, while the light measuring circuits 1 and 2 produce signals for the brightness of the object to be photographed in the APEX value. One example of a specific circuit arrangement for the above purpose is shown in FIG. 9.

On the assumption that the analog output of the integration circuit 3 is denoted by Qv1, and the output of the sample-and-hold circuit 4, by Bv1, the relation will be represented by $$Qv1 = \log_2 (2^{Bv1 - Tvc} + 2^{Qvfm1}) \qquad (4\text{-}1)$$

and when the output of the integration circuit 5 is represented by Qv2 and that of the sample-and-hold circuit 6 by Bv2, the relation will be $$Qv2 = \log_2 (2^{Bv2 - Tvc} + 2^{Qvfm2}) \qquad (4\text{-}2)$$

where Qvfm1 and Qvfm2 are reflected light amounts only by the flash light emitting device during the light measuring. More specifically, data for the brightness at the portions measured for the light intensities by the light measuring circuits 1 and 2 in APEX value are respectively produced from the sample-and-hold circuits 4 and 6, while the light amounts from the two portions during the flash light emitting time are produced from the integration circuits 3 and 5.

When the sampling by the sample-and-hold circuits 4 and 6 are effected, the signal from the integration circuit 3 is first output from the multiplexer 7 so as to be subjected to the A-D conversion by the A-D converter 8, and upon completion of the A-D conversion, the digital data thereof are set in the register 10 through the demultiplexer 9. Subsequently, from the multiplexer 7, the signal from the integration circuit 5 is produced, and subjected to the A-D conversion, and the data thereof are set in the register 11. Thereafter, in the similar manner as described above, the A-D converted data of the output from the sample-and-hold circuit 4 are set in the register 12, while those from the sample-and-hold circuit 5 are set in the register 13. Accordingly, the data corresponding to Qv1 are thus set in the register 10, those corresponding to Qv2, in the register 11, those corresponding to Bv1, in the register 12, and those corresponding to Bv2, in the register 13, and calculations are effected by the subsequent circuits based on the above data.

The subtraction circuit 15 produces the data for Bv1-Tvc based on the data from the register 12 and data from the fixed data output circuit 14, while the subtraction circuit 16 develops the data for Bv2-Tvc in a similar manner. Meanwhile, the subtraction circuit 17 carries out the calculation for $$Qv1 - (Bv1 - Tvc) = \Delta 11 \qquad (5\text{-}1)$$

and the subtraction circuit 18 performs the calculation for $$Qv2 - (Bv2 - Tvc) = \Delta 12 \qquad (5\text{-}2)$$

The data of Δl1 and Δl2 thus worked out are fed to the ROM 19 and 20 as address designating data for the data conversion ROM 19 and 20, from which, data for $\log_2 (2^{\Delta l1} - 1)$ and $\log_2 (2^{\Delta l2} - 1)$ are produced. These data from the ROM 19 and 20 and the data of Bv1-Tvc and Bv2-Tvc from the subtraction circuits 15 and 16 are forwarded to the addition circuits 21 and 22 for the calculations of $$(Bv1 - Tvc) + \log_2 (2^{\Delta l1} - 1) = Qvfm1 \tag{6-1}$$

$$(Bv2 - Tvc) + \log_2 (2^{\Delta l2} - 1) = Qvfm2 \tag{6-2}$$

and thus, the reflected light amounts Qvfm1 and Qvfm2 resulting from the light emission by the flash light emitting device during the light measuring are worked out.

Hereinbelow, the process how the reflected light amounts Qvfm1 and Qvfm2 are worked out by the equations (6-1) and (6-2) will be explained.

Upon rewriting of the equations (4-1) and (4-2) into exponential form, the relations may be represented by $$2^{Qv1} = 2^{Bv1 - Tvc} + 2^{Qvfm1} \tag{4'-1}$$

$$2^{Qv2} = 2^{Bv2 - Tvc} + 2^{Qvfm2} \tag{4'-2}$$

When Qv1 and Qv2 are eliminated for arrangement from the above equations (4'-1) and (4'-2) based on the equations (5-1) and (5-2), the relations will be $$2^{Bv1 - Tvc}(2^{\Delta l1} - 1) = 2^{Qvfm1}$$

$$2^{Bv2 - Tvc}(2^{\Delta l2} - 1) = 2^{Qvfm2}$$

and by taking the logarithm of both sides of these equations to the base of 2, respectively, the equations (6-1) and (6-2) earlier described are obtained.

To the subtraction circuits 24 and 25, the data Qvfm1 and Qvfm2 from the addition circuits 21 and 22 and the data Δf from the data output circuit 23 are applied for calculations of $$Qvf1 = Qvfm1 - \Delta f \tag{7-1}$$

$$Qvf2 = Qvfm2 - \Delta f \tag{7-2}$$

As described earlier, since the data Δf are defined to be a difference from the light emitting amount in an APEX system of the flash light emitting device during the light measuring time to the light emitting amount in the APEX system thereof at the photographing time, the values Qvf1 and Qvf2 worked out by the equations (7-1) and (7-2) are equivalent to the reflected light amounts due to the flash light emission during photographing.

Meanwhile, to the subtracting circuits 27 and 28, the data Bv1 and Bv2 from the registers 12 and 13 and the data for Tvs in APEX value of the set exposure time from the exposure time data output circuit 26 are applied, with the data for Bv1−Tvs and Bv2−Tvs being produced from the respective subtraction circuits 27 and 28. The subtraction circuits 29 and 30 are applied with the data Qvf1 and Qvf2 from the subtraction circuits 24 and 25, and also with the data Bv1−Tvs and Bv2−Tvs from the subtraction circuits 27 and 28 so as to effect the calculations for the equations $$Qvf1 - (Bv1 - Tvs) = \Delta L1 \tag{8-1}$$

$$Qvf2 - (Bv2 - Tvs) = \Delta L2 \tag{8-2}$$

The data ΔL1 and ΔL2 thus worked out are equivalent to the ratio of the amount of contribution towards the exposure of the flash light to that of the ambient light or steady light for the respective two portions, or equivalent to the difference of the contribution amounts in the APEX system, and normally referred to as "lighting contrast".

The data ΔL1 and ΔL2 for the lighting contrast from the subtraction circuits 29 and 30 are supplied as address data for the data conversion ROM 31 and 32, from which, the data for $\log_2 (2^{\Delta L1} + 1)$ and $\log_2 (2^{\Delta L2} + 1)$ are produced. These data $\log_2 (2^{\Delta L1} + 1)$ and $\log_2 (2^{\Delta L2} + 1)$ from the ROM 31 and 32, and the data (Bv1−Tvs) and (Bv2−Tv2) from the subtraction circuits 27 and 28 are applied to the addition circuits 33 and 34 for the calculations of the equations $$(Bv1 - Tvs) + \log_2 (2^{\Delta L1} + 1) = Qvt1 \tag{9-1}$$

$$(Bv2 - Tvs) + \log_2 (2^{\Delta L2} + 1) = Qvt2 \tag{9-2}$$

and thus, the data Qvt1 and Qvt2 for the light amounts contributing to the exposure on the two portions of the photosensitive member during the flash light photographing, are worked out in the APEX system.

Hereinbelow, the process how the data in the APEX system contributing to the exposure are obtained by the equations (9-1) and (9-2) will be explained.

Upon elimination of Qvf1 and Qvf2 from the equations (2-1) and (2-2) through employment of the equations (8-1) and (8-2), equations as follows are obtained.

$$2^{Bv1 - Tvs}(1 + 2^{\Delta L1}) = 2^{Qvt1}$$

$$2^{Bv2 - Tvs}(1 + 2^{\Delta L2}) = 2^{Qvt2}$$

and by taking the logarithm of both sides of these equations to the base of two, respectively, the equations (9-1) and (9-2) are contained. Meanwhile, as is clear from the equations (9-1) and (9-2), the data $\log_2 (2^{\Delta L1} + 1)$ and $\log_2 (2^{\Delta L2} + 1)$ from the ROM 31 and 32 are equivalent to the ratio of light amounts contributing to the exposure of the respective portions when the flash light emitting device FL is fired and when the same is not fired, or to the difference in the APEX system, which is referred to as step number difference Δd, and represented by $$\Delta d1 = \log_2 (2^{\Delta L1} + 1) = Qvt1 - (Bv1 - Tvs) \tag{10-1}$$

$$\Delta d2 = \log_2 (2^{\Delta L2} + 1) = Qvt2 - (Bv1 - Tvs) \tag{10-2}$$

To the addition circuit 35, the data Qvt1 and Qvt2 from the addition circuits 33 and 34 are applied for working out the data Qvt1+Qvt2, which data are further applied to the division circuit 36 for the calculation of $$\overline{Qvt} = (Qvt1 + Qvt2)/2 \tag{11}$$

The value $\overline{Qvt}$ is an arithmetical average of the light amounts at the two portions in the APEX system, and is equivalent to a geometrical average of the light amounts $2^{Qvt1}$ and $2^{Qvt2}$ represented by $$\sqrt{2^{Qvt1} \cdot 2^{Qvt2}} = 2^{\overline{Qvt}}$$

which may be regarded as a density average (i.e. the average of the density of particles for the photosensitive member such as a photographic film) when attention is directed to images to be reproduced on the photosensitive member.

To the subtraction circuit 37, the data Qvt1 and Qvt2 from the addition circuits 33 and 34 are applied for the calculation of an equation $$\Delta c21 = Qvt2 - Qvt1 \tag{12-1}$$

the result of which is equivalent to the contrast for the two portions. Meanwhile, in the subtraction circuit 38, calculation is effected based on the data $\overline{Qvt}$ from the division circuit 36 and the data Qvt1 from the addition circuit 33 for working out an equation $$\Delta ca1 = Qvt - \overline{Qvt1} \tag{12-2}$$

the data of which are equivalent to the ratio of the average light amount to the light amount of a first portion or a difference between the average density and the density of the first portion, i.e. contrast.

In the subtraction circuit 39, calculation is similarly effected for working out an equation $$\Delta ca2 = \overline{Qvt} - Qvt2 \tag{12-3}$$

which is equivalent to the contrast between the average and a second portion.

As is seen from the foregoing description, according to the embodiment of FIG. 1, the contrast for the two portions in a scene to be photographed during the flash light emission and that between the average and each of the portions may be obtained. Further, since any alteration of the setting of Tvs Δf also alters the contrast to be worked out, by altering these set values, exposure factor for achieving the desired contrast may consequently be obtained by means of altering the set values till the desired contrast is worked out. It is to be noted here that, although a block for a display or indication device is omitted in FIG. 1, the contrast to be worked out and various data available in the process of calculating the contrast may be input to the display device for indication.

On the other hand, description will be given hereinbelow with reference to the case where the light measuring calculation is effected without firing the flash light emitting device FL. In the above case, the output data of the subtraction circuits 17 and 18 become 0 as in the following equations.

$$Qv1 = Bv1 - Tvc$$

$$Qv2 = Bv2 - Tvc$$

In this case, it is so arranged that the data equivalent to $-\infty$ (minus infinity) are produced from the ROM 19 and 20, and the data are applied to the ROM 31 and 32 without being affected by the calculations in the subtraction circuits 24 and 25, and 29 and 30. In the actual practice, it may be so arranged, for example, that the bit unnecessary for effecting the calculation is rendered to be "1", and that, when the data are applied to the ROM 31 and 32, data corresponding to 0 are output from the ROM 31 and 32, irrespective of data by other bits, and thus, the outputs of the addition circuits 33 and 34 will be represented by $$Qvt1 = Bv1 - Tvs$$

$$Qvt2 = Bv2 - Tvs$$

Therefore, the contrast to be worked out becomes the ratio with respect to the brightness due to the ambient light, and is not varied even when the set value is altered. Meanwhile, the fact that Qvf1 and Qvf2 are $-\infty$ means that the flash light emitting amount is 0, and that the lighting contrast is $-\infty$, with the step number difference being of 0.

In the embodiment of FIG. 1, the measuring portions by the photoelectric elements P1 and P2 of the two light measuring circuits 1 and 2 have only to be respectively different portions in the scene to be photographed, and therefore, it may be so arranged, for example, that one of the photoelectric elements P1 and P2 measures light at the central portion of the scene, while the other measures the average value at the remaining portion, that one of the elements P1 and P2 measures light at a part in the upper portion of the scene to be photographed, while the other measures light at a part in the lower portion thereof. The arrangements as described above may further be modified in various ways.

Figure 2:
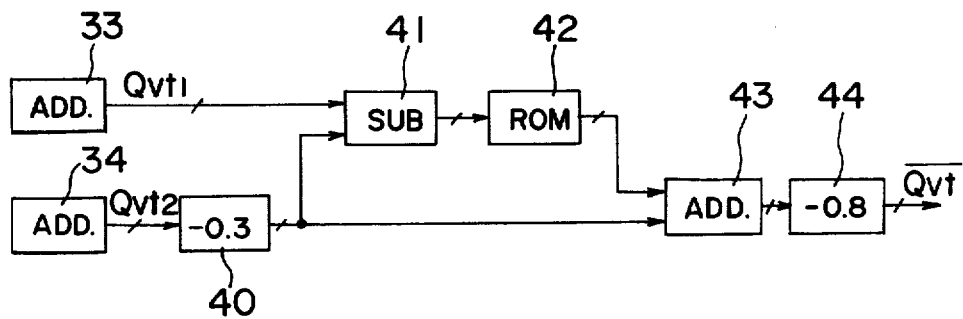
FIG. 2 is an electrical block diagram showing a modification of the circuit portion for an average light amount in the arrangement of FIG. 1.

Reference is made to FIG. 2 showing a modified circuit arrangement for obtaining an average light amount according to the present invention. The modification of FIG. 2 is intended to obtain a weighted average, and is particularly effective, for example, for a light measuring system of a type in which one photoelectric element is arranged to measure light at the central portion of the scene to be photographed, while the other photoelectric element measures the average light intensity in the other portions.

The principle for the above modification will be described hereinbelow. In this case, the average light amount will be represented by $$\overline{Qvt} = \log_2 \{(2^{Qvt1} + 2^{Qvt2} \times 0.8)/(1 + 0.8)\} \tag{13}$$

The above equation (13) may be transformed as follows through utilization of the relations $\log 2\ 0.8 \approx -0.3$ and $\log 2\ 1.8 \approx 0.8$ $$\overline{Qvt} = \log_2 (2^{Qvt1} + 2^{Qvt2 - 0.3}) - 0.8 \tag{13-1}$$

On the supposition that $$Qvt1 - (Qvt2 - 0.3) = \alpha$$

the following relation may be obtain $$\log_2 (2^{Qvt1} + 2^{Qvt2-0.3}) = (Qvt2 - 0.3) + \log_2 (2^\alpha + 1)$$

Accordingly, the data for Qvt2−0.3 are obtained by the subtraction circuit 40 which is connected to the addition circuit 34, and further coupled to a subtraction circuit 41 and an addition circuit 43, while in the subtraction circuit 41, the data represented by $$Qvt1 - (Qvt2 - 0.3) = \alpha$$

are obtained. The above data $\alpha$ are converted into the data for $\log_2 (2^\alpha + 1)$ by a ROM 42 connected to the circuit 41, and $$(Qvt2 - 0.3) + \log_2 (2^\alpha + 1)$$

is worked out in the addition circuit 43, and further, equations as follows are worked out by a subtraction circuit 44 connected to the addition circuit 43.

$$\overline{Qvt} = \log_2(2^\alpha + 1) + (Qvt2 - 0.3) - 0.8$$

$$= \log_2(2^{Qvt1} + 2^{Qvt2-0.3}) - 0.8 \tag{13-1}$$

-continued $$= \log_2\{(2^{Qvt1} + 2^{Qvt2} \times 0.8)/(1 + 0.8)\} \quad (13)$$

Thus, the value for the weighted average of the light amount in the APEX system may be regarded as obtained.

Figure 3:
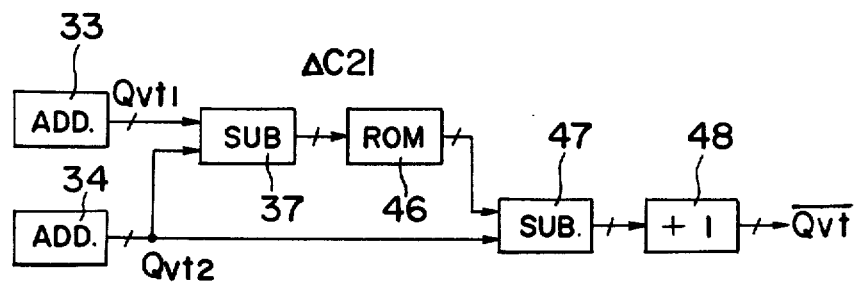
FIG. 3 is a block diagram similar to FIG. 2, which particularly shows another modification thereof for obtaining the average light amount in APEX value.

Reference is also made to FIG. 3 showing another modified arrangement for obtaining the value for the average light amount in the APEX system. This modification intended to obtain a harmonic average is suitable, for example, for a light measuring system of a type in which one photoelectric element mainly measures light at a portion or whole part in the upper section, while the other photoelectric element mainly measures light at a portion or whole part in the lower section of the scene to be photographed.

The principle for the arrangement of FIG. 3 will be explained as follows.

The harmonic average is represented by $$\overline{Qvt} = \log_2\{2/(\tfrac{1}{2}Q^{vt1} + \tfrac{1}{2}Q^{vt2})\} \quad (14)$$

which may be transformed as $$\overline{Qvt1} = 1 - \log_2(2^{-Qvt1} + 2^{-Qvt2}) \quad (14\text{-}1)$$

Therefore, upon employment of the relation $$Qvt2 - Qvt1 = \Delta c21 \quad (12\text{-}1)$$

the relation as follows may be established $$-\log_2(2^{+Qvt1} + 2^{-Qvt2}) = Qvt2 - \log_2(2^{\Delta c21} + 1)$$

Accordingly, in FIG. 3, the calculation of the equation (12-1) is effected in the subtraction circuit 37 for working out the data for Δc21, which data are converted into the data for $\log_2(2^{\Delta c21}+1)$ by a ROM 46. Based on the above data and the data Qvt2 from the addition circuit 34, a subtraction circuit 47 coupled to the circuit 34 works out $$Qvt2 - \log_2(2^{\Delta c21} + 1)$$

and since 1 is added to the above data by an addition circuit 48 connected to the circuit 47, the result of the following equations are obtained, $$\overline{Qvt} = 1 + Qvt2 - \log_2(2^{\Delta c21} + 1)$$

$$= 1 - \log_2(2^{-Qvt1} + 2^{-Qvt2}) \quad (14\text{-}1)$$

$$= \log_2\left(\frac{2}{\tfrac{1}{2}Q^{vt1} + \tfrac{1}{2}Q^{vt2}}\right) \quad (14)$$

and thus, the value in the APEX system of the average light amount on the harmonic average may be regarded as obtained.

Figure 4:
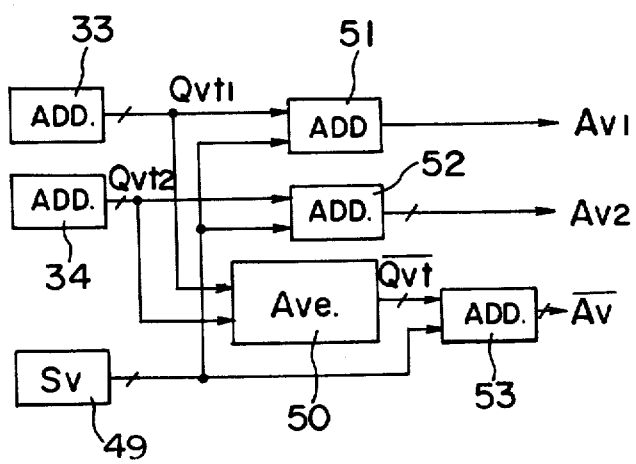
FIG. 4 is an electrical block diagram illustrating the construction of a circuit portion for calculating aperture values to obtain proper exposure based on the light amount at two spots and the average light amount as obtained in the circuit arrangement of FIG. 1, 2, or 3.

Referring further to FIG. 4 showing a block diagram for working out aperture values to achieve optimum exposures or proper exposures based on the light amounts for the two portions and the average light amount as obtained in the arrangements of FIG. 1, FIG. 2 or FIG. 3, the addition circuits 33 and 34 are coupled to a block 50 which is equivalent to the blocks 35 and 36 of FIG. 1 or to the block producing the average light amount Qvt of the arrangement of FIG. 2 or FIG. 3 and which is further coupled to an addition circuit 53. The circuits 33 and 34 also connected to addition circuits 51 and 52, while a film speed output circuit 49 for producing data for the film speed Sv is further connected to the addition circuits 51 and 52 and also to the addition circuit 53.

To the addition circuit 51, the data Qvt1 from the addition circuit 33 and the data Sv from the film speed output circuit 49 are applied for the calculation of an equation $$Qvt1 + Sv = Av1 \quad (15\text{-}1)$$

which represents the APEX value of the aperture value for achieving the optimum exposure at the first portion. Moreover, in the addition circuit 52, the relation $$Qvt2 + Sv = Av2 \quad (15\text{-}2)$$

is worked out based on the data Qvt2 from the addition circuit 34 and the data Sv from the film speed output circuit 49. The resultant value is the aperture value in the APEX system for obtaining the optimum exposure at the second portion. Furthermore, in the addition circuit 53, the relation $$\overline{Qvt} + Sv = \overline{Av} \quad (15\text{-}3)$$

is calculated based on the data $\overline{Qvt}$ from the average value calculation block 50 and the data Sv from the film speed output circuit 49. The resultant value is the aperture value in the APEX system for achieving the optimum exposure on the whole scene to be photographed.

Figure 5:
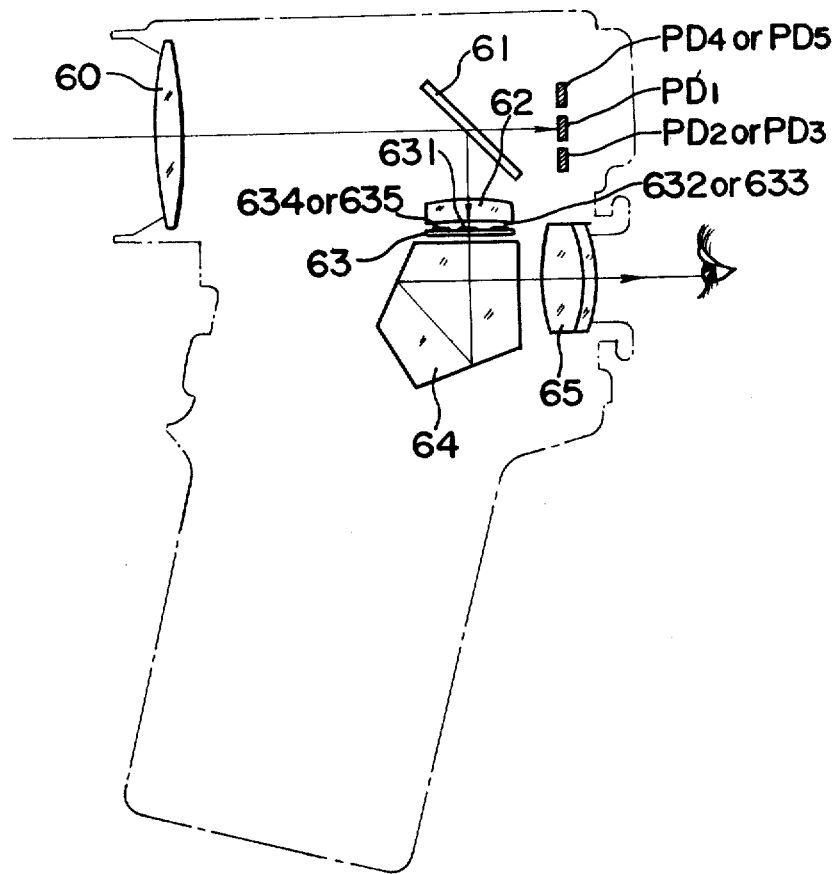
FIG. 5 is a schematic side sectional view of a light measuring meter showing an optical system thereof to which the present invention is applied.
Figure 6:
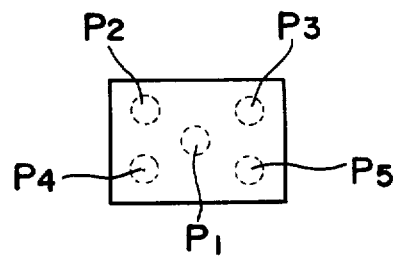
FIG. 6 is a schematic top plan view illustrating light receiving portions of respective photoelectric elements employed in the arrangement of FIG. 5.

Referring to FIG. 5 schematically showing an optical system of a light measuring meter to which the present invention is applied, and also to FIG. 6 showing, on an enlarged scale, a light receiving portion of each of photoelectric elements, the optical system of FIG. 5 includes an objective lens 60, a half-mirror 61 for dividing light so disposed in the optical axis of the lens 60 as to lead one portion of the divided light towards photoelectric elements PD1 to PD5 and the other portion thereof towards a finder system through a condenser lens 62, a focusing screen 63, a pentagonal roof prism 64 and an eye piece 65, while index marks 631, 632, 633, 634 and 635 are disposed on the focusing screen 63 for informing an observer of light measuring portions or spots P1, P2, P3, P4 and P5 (FIG. 6). By the employment of the optical system as described above, five portions or spots in the scene to be photographed surrounded by solid lines in FIG. 6, i.e. the central portion P1, upper left portion P2, upper right portion P3, lower left portion P4 and lower right portion P5 may be subjected to the spot light measurements.

Figure 7:
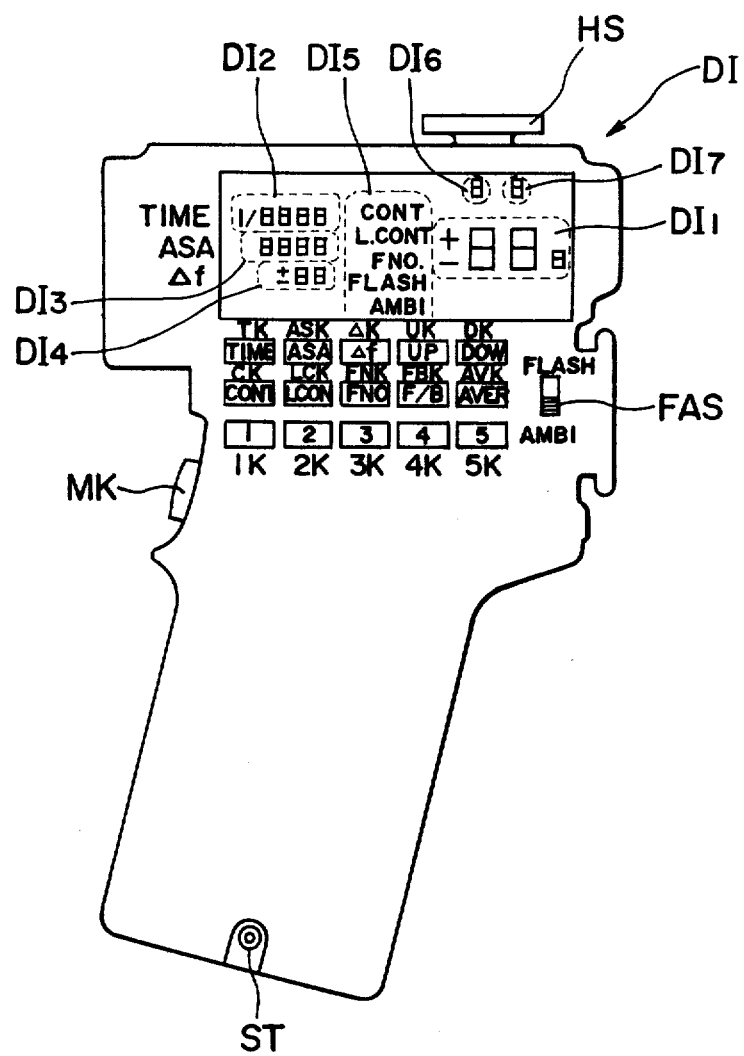
FIG. 7 is a schematic side elevational view of the light measuring meter of FIG. 5.

Referring also to FIG. 7 showing a general appearance of the light measuring meter applied with the present invention, functions of respective operating portions and a display portion DI thereof will be described hereinbelow.

The light measuring meter of FIG. 7 has a hot shoe HS provided at its top portion for mounting a flash light emitting device such as an electronic flash (not shown here), a terminal ST for a trigger cord of the flash light emitting device provided adjacent to the bottom edge, a key or push button MK for light measuring provided at the front edge thereof and arranged, upon depression, to start firing or light emission of the flash light emitting device and also the light measurement, an exposure time setting key TK provided at one side face of the meter and so arranged that, when depressed simultaneously with an up key UK or a down key DK provided side by side on the same one side face of said meter, the set exposure time indicated in a display portion DI2 of a display section DI starts varying in a unit of one Ev for each predetermined period of time until the set exposure time reaches a limit value, an ASA sensitivity setting key ASK provided next to the exposure time setting key TK and so arranged that, when being depressed simultaneously with the up key UK or down key DK, the ASA sensitivity displayed in a display portion DI3 is varied at a step of ⅓Ev, and another key ΔK for setting the change in guide number of the flash light emitting device, provided next to the key ADK and adapted, when being depressed simultaneously with the up key UK or down key DK, the set value displayed in a display portion DI4 is varied at a step of 0.5 Ev. With respect to the setting of the ASA sensitivities and alteration amounts also, the data stop varying upon reaching of the set value to the limit value. It is to be noted that the up key UK is depressed for increasing the APEX value of the set data, while the down key DK is depressed for reducing the same.

The light measuring meter of FIG. 7 further includes a contrast key CK provided below the key TK and arranged, when depressed, to indicate an indication "CONT" among the indications "CONT", "L.CONT", "F. NO", "FLASH" and "AMBI" for a display portion DI5, and also, to indicate in display portions DI6 and DI7, numbers showing the two spots, with further indication of the contrast value as worked out based on the measured value in a display portion DI1 in a unit of 0.1 Ev, a lighting contrast key LCK provided next to the key CK and adapted, when depressed, to display "L.CONT" in the display portion DI5 and number of the light measuring portions in the display portion DI6, without any indication in a display portion DI7, but with indication of the worked out lighting contrast value in the display portion DI1.

Further included in the light measuring meter of FIG. 7 are an F No. key FNK, a F/B key FBK, and a key AVK which are aligned with the keys CK and LCK, and keys 1K, 2K, 3K, 4K and 5K provided in a line below the keys CK, LCK, FNK, FBK and AVK, and a slide switch FAS provided at the right side of the above keys in FIG. 7.

Upon depression of the F No. key FNK, the number of the light measuring spot is displayed in the display portion DI6, and the display portion DI7 is kept blank, while the display portion DI1 displays the F number, with the value less than 0.1 Ev being indicated in a unit of 0.1 Ev. Meanwhile, upon depression of the F/B key FBK, when the slide switch FAS is at the side FLASH, the display portion DI5 indicates "FLASH", and the display portion DI6 indicates the number of the measuring spot, with the display portion DI7 kept blank, while the display portion DI1 displays the reflected light amount due to firing of the flash light emitting device upon photographing in the value of the APEX system. On the other hand, when the slide switch FAS is set to the AMBI side, the display portion DI5 displays "AMBI", and the display portion DI1 indicates the scene brightness, while the display portion DI6 shows the number of the measuring spot, with the display portion DI7 kept blank. The keys AVK and 1K to 5K are intended to designate the light measuring position of the measured value to be indicated in the display portion DI1, and the key AVK designates the average value of the five light measuring spots, while the key 1K designates the spot P1, key 2K the spot P2, key 3K the spot P3, key 4K the spot P4, and key 5K the spot P5, respectively.

Hereinbelow, operation of the light measuring meter of FIG. 7 will be described.

Upon depression of the light measuring key MK, the flash light emitting device is fired for effecting the light measuring, and subsequently, calculation is carried out by taking-in the measured value. The set values are displayed in the display portions DI2, DI3 and DI4, while the display mode is indicated in the display portion DI5, with the calculated value being displayed at the portion DI1. In the case of the contrast display, the measuring spots are indicated by the portions DI6 and DI7, while in the cases other than the contrast display, the measuring spots are indicated only by the display portion DI6. For the average value, the indication is given in the form of "$\bar{A}$".

If the key operation is not made for a predetermined period of time after effecting the indication, all the indications of the display section DI are automatically erased. Meanwhile, when any one of the keys TK, ASK and ΔK, and the key UK or DK are depressed, the set value is altered together with the alteration of the indicated value at the display portion DI1. After a predetermined period of time from the above key operation, all the indications at the section DI are erased. If the light measuring key MK is kept depressed, the measured value based on the ambient light is continuously taken-in, and the indicated value at the display portion DI1 is varied, following the variation of the scene brightness. On the other hand, when the key CK, LCK, FNK, or FBK is actuated for changing over the mode, or the keys AVK, or 1K to 5K are operated for changing over the measuring points, the contents of indications are also changed over, and if the key operations are not effected by a predetermined period of time, all the indications are erased. In the case where the light measuring is effected without using the flash light emitting device, indications based only on the ambient light are effected.

Figure 8:
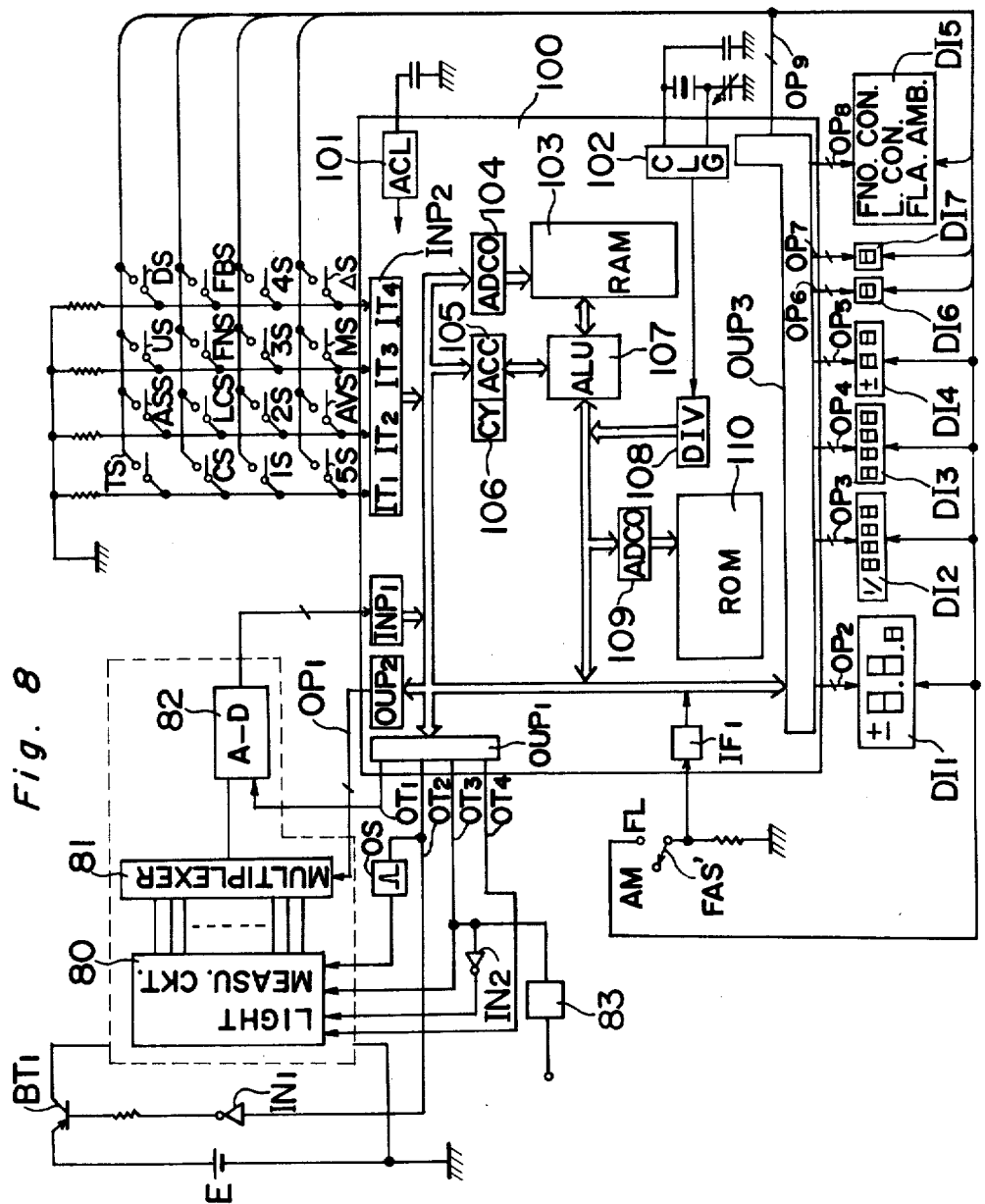
FIG. 8 is an electrical circuit diagram showing the internal circuit construction of the light measuring meter of FIG. 7.

Reference is also made to FIG. 8 showing an electrical circuit diagram of the light measuring meter of FIG. 7, which generally includes a circuit portion surround by dotted lines and having a light measuring circuit 80 coupled to an A-D converter 82 through a multiplexer 81 so as to be supplied with power from a power source battery E through the emitter-collector circuit of a transistor BT1, and a micro-computer 100 (referred to as μ-com hereinbelow) whose output terminal OT2 is connected to the base of the transistor BT1 through an inverter IN1 and a suitable resistor, so that the power feeding transistor BT1 is controlled through the output terminal OT2 of the μ-com 100 and the inverter IN1.

Referring also to FIG. 9 showing specific circuit constructions of the light measuring circuit 80 and multiplexer 81 in FIG. 8, photoelectric elements PD1 to PD5 corresponding to the light measuring portions P1 to P5 are respectively coupled, through diodes D1 to D5 for the logarithmic compression, to operational amplifiers OA1 to OA5 whose output terminals produce potentials corresponding to the logarithmically compressed value of light intensities received by the photoelectric elements PD1 to PD5 and are coupled to the bases of transistors BT11 to BT15 for logarithmic expansion through field effect transistors or FET FT21 to FT25 for analog switches, while the transistors BT11 to BT15 whose collectors are respectively connected to the bases of current mirror transistors BT21 to BT25 are further coupled to known circuits composed of diodes D11 to D15 and D21 to D25 and capacitors C11 to C15, etc. disclosed, for example, in Japanese Patent Publication Tokkosho No. 50-28038 and arranged to produce voltages obtained by subjecting the integrated values of currents flowing thereinto, at opposite sides of said capacitors C11 to C15, to which FET FT31 to FT35 are connected for resetting said capacitors. The output terminals of the operational amplifiers OA1 to OA5 are further coupled to analog switches of FET FT61 to FT65 through analog switches of FET FT11 to FT15 and through analog switches of FET FT41 to FT45, FT11 to FT15 constitute sample-and-hold circuits in combination with capacitors C21 to C25 connected thereto, respectively. FET FT51 to FT55 respectively connected to lines leading to the circuits including the diodes D11 to D15, and D21 to D25 and capacitors C11 to C15, the FET FT61 to FT65 for analog switches described earlier and a decoder DE, constitute the multiplexer 81 in FIG. 8. Based on the data from the output port OP1 of the μ-com 100, the decoder DE renders any one of its output terminal d1 to d10 to be "High" so as to turn ON corresponding one of the FET FT51 to FT55, and FT61 to FT65 for applying an analog signal from one of the capacitors C11 to C15 and C21 to C25 to the A-D converter 82.

The relationship between the data for the output port OP1 of the μ-com 100 and input data are shown in Table 1 below.

TABLE 1

| Output port OP1 | "High" terminal of decoder | FET turned ON | Input data |
|---|---|---|---|
| 0110 | d1 | FT51 | Qv1 |
| 0111 | d2 | FT52 | Qv2 |
| 1000 | d3 | FT53 | Qv3 |
| 1001 | d4 | FT54 | Qv4 |
| 1010 | d5 | FT55 | Qv5 |
| 1011 | d6 | FT61 | Bv1 |
| 1100 | d7 | FT62 | Bv2 |
| 1101 | d8 | FT63 | Bv3 |
| 1110 | d9 | FT64 | Bv4 |
| 1111 | d10 | FT65 | Bv5 |

Referring back to FIG. 8, the μ-com 100 of a single chip type includes a power on/clear circuit 101, a clock generator 102, a RAM 103, an address controller 104 for the RAM 103, an accumulator 105, a carry flag 106, an ALU 107, a divider 108, a ROM 110, an address controller 109 for the ROM 110, an input flip-flop IF1, input ports INP1 and INP2, and output ports OUP1, OUP2 and OUP3, etc. The features of the above μ-com 100 are such that, when power is first supplied to the μ-com 100 following replacement of the power source battery E and the like, functioning is started from the particular address of the ROM 110 through actuation of the power on/clear circuit 101. Meanwhile, under the state of clock end or CEND, instructions are not executed, and the clock generator 102 and divider 108 start functioning, for executing the instruction from the particular address of the ROM 110, upon receipt of one second (sec.) signal from the divider 108 or of any key input. For the μ-com 100 as described above, for example, a model SM-4 (trade mark) micro-computer sold by Sharp Corporation, Japan may be suitably employed.

Subsequently, the functions of respectively labelled registers and flags in the RAM 103 will be described hereinbelow, which include a flag SFJ for judgement as to whether or not the firing signal for the flash light emitting device should be produced, a flag IFJ for determining the completion of the reception of all light measuring data, a flag MCJ for determining whether or not the light measuring is being effected, a flag DFJ for determining whether or not the calculation for indication data is completed, and a flag QJF for determining whether or not the reflected flash light amount Qvfm caused by only the flash light emitting device firing upon the light measuring is worked out, and a register DIR for selection of taken-in data, the contents of which register DIR are produced from the output port OP1. The relation between the contents of the register DIR and taken-in data is shown in Table 1'.

There are further provided a register COR for counting the time from the termination of the key operation to the de-energization of the display, a register DSR in which the data of Δf is set, a register TVR in which the set exposure time Tvs is set, a register SVR in which the specific film speed is set and a register BDR in which the data corresponding to the display mode are set. The relation of the contents and display modes for the register BDR is shown in Table 2.

TABLE 1'

| DIR | Data |
|---|---|
| 0110 | Qv1 |
| 0111 | Qv2 |
| 1000 | Qv3 |
| 1001 | Qv4 |
| 1010 | Qv5 |
| 1011 | Bv1 |
| 1100 | Bv2 |
| 1101 | Bv3 |
| 1110 | Bv4 |
| 1111 | Bv5 |

NDR1 and NDR2 are registers in which data indicating the light measuring portions corresponding to the light measuring spots P1 to P5 and the average are set, and in the cases other than "contrast", the portion corresponding to the content of the register NDR1 is set as the light measuring portion. Meanwhile, in the case of "contrast", this will be the contrast between the portions corresponding to the contents of the registers NDR1 and NDR2. The relations between the contents of the registers NDR1 and NDR2, and the light measuring portions are shown in Table 3 below.

TABLE 2

| BDR | Display mode (display contents) | |
|---|---|---|
| 0001 | Contrast | (CO) |
| 0010 | Lighting contrast | (LC) |
| 0100 | Aperture value (F No.) | (F) |
| 1000 | Reflected light amount caused by only flash light emitting device upon photographing | (Qvf) |
| 1001 | Brightness due to ambient light | (Bv) |

TABLE 3

| NDR1 NDR2 | Light measuring portion |
|---|---|
| 0001 | P1 |
| 0010 | P2 |
| 0011 | P3 |
| 0100 | P4 |
| 0101 | P5 |
| 0110 | Average |

DPR1 is a register in which display data for the display portion DI1 are set, DPR2 is a register in which data obtained by decoding the content of the register BDR, i.e. display data for the display portion DI5 are set, DPR3 is a register in which data obtained by decoding the content of the register NDR1, i.e. display data for the display portion DI6 are set, and DPR4 is a register in which data obtained by decoding the content of the register NDR2, i.e. display data for the display portion DI7 are set, DPR5 is a register in which data obtained by decoding the content of the register TVR are set, which data are output from an output port OP3, DPR6 is a register in which data obtained by decoding the contents of a register SVR are set, which data are output from an output port OP4, and DPR7 is a register in which data obtained by decoding the contents of the register DFR are set, and the content thereof is output from an output port OP5. Registers QVR1 to QVR5, and BVR1 to BVR5 are the registers in which the light measuring data taken-in from the A-D converter 82 are set, and data Qv1 are set in the register QVR1, data Qv2 in the register QVR2, data Qv5 in the register QVR5, data Bv1 in the register BVR1, data Bv4 in the register BVR4, and data Bv5 in the register BVR5. Registers QFR1 to QFR5, and QFRA are the registers in which the reflected light amounts caused by only the flash light emitting device during the light measuring are set, and data Qvfm1 are set in the register QFR1, data Qvfm2 in the register QFR2, data Qvfm5 in the register QFR5, and data $\overline{Qvfm}$ in the register QFRA. Furthermore, in the RAM 103, there are provided a register for calculation, and registers for temporarily memorizing other data, etc., although not particularly shown.

Still referring to FIG. 8, the output terminal OT1 of the output port OUP1 coupled to the A-D converter 82 feeds an A-D conversion starting signal for the A-D converter 82, while the output terminal OT2 thereof connected to the base of the transistor BT1 through the inverter IN1 and suitable resistance for providing a power feed signal for the circuit portion surrounded by the dotted lines in FIG. 8, furthermore the output terminal OT2 thereof connected to an input terminal of a one shot circuit OS, for providing the reset signals for the integrating capacitors C11 to C15. The terminal OT3 of the output port OUP1 is connected to the light measuring circuit 80 directly, and also to said light measuring circuit 80 through an inverter IN2, and further to a trigger circuit 83 of the flash light emitting device so as to supply a change-over signal between the integration during flash light emission and light measuring of the ambient light, and the flash light emitting signal. Meanwhile, the terminal OT4 is connected to the light measuring circuit 80 for providing the sample-and-hold.

From the output port OUP2, the content of the take-in data selection register DIR is output as described earlier. The data for the display are produced from output terminals OP2 and OP3 of the output port OUP3, while a strobe signal for the display and key scanning is developed from the output terminal OP9 thereof. There are further provided the input port INP1 for taking-in the digital data from the A-D converter 82 and another input port INP2 to which the key signal is applied.

The relations between the key switches of FIG. 8 and the key buttons in FIG. 7 are such that, the switch TS corresponds to the key TK, the switch ASS to the key ASK, the switch US to the key UK, the switch DS to the key DK, the switch CS to the key CK, the switch LCS to the key LCK, the switch FNS to the key FNK, the switch FBS to the key FBK, the switch 1S to the key 1K, the switch 2S to the key 2K, the switch 3S to the key 3K, the switch 4S to the key 4K, the switch 5S to the key 5K, the switch AVS to the key AVK, the switch MS to the key MK, and the switch ΔS to the key ΔK, respectively. The switch FAS' is associated with the slide switch FAS in FIG. 7, and arranged to be connected to a terminal FL at the "FLASH" side, and to a terminal AM at the "AMBI" side.

FIGS. 10(A), 10(B), 11(A), 11(B), 12(A), 12(B), and 12(C), and FIGS. 13 and 14 are flow charts showing functioning of the μ-com 100, on the basis of which functions of the circuit arrangement of FIGS. 8 and 9 will be explained hereinbelow.

Figure 10:
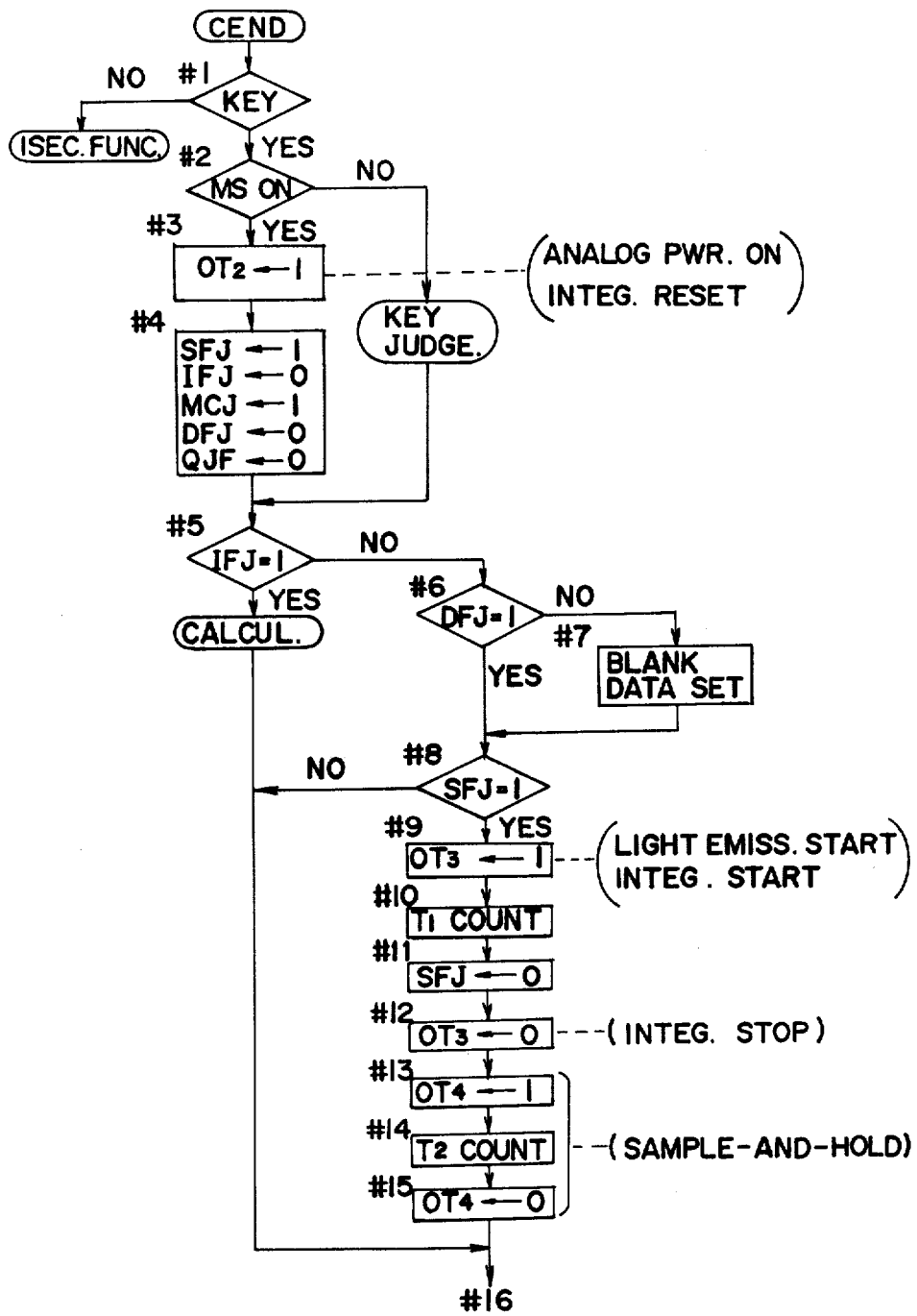
Figure 10B:
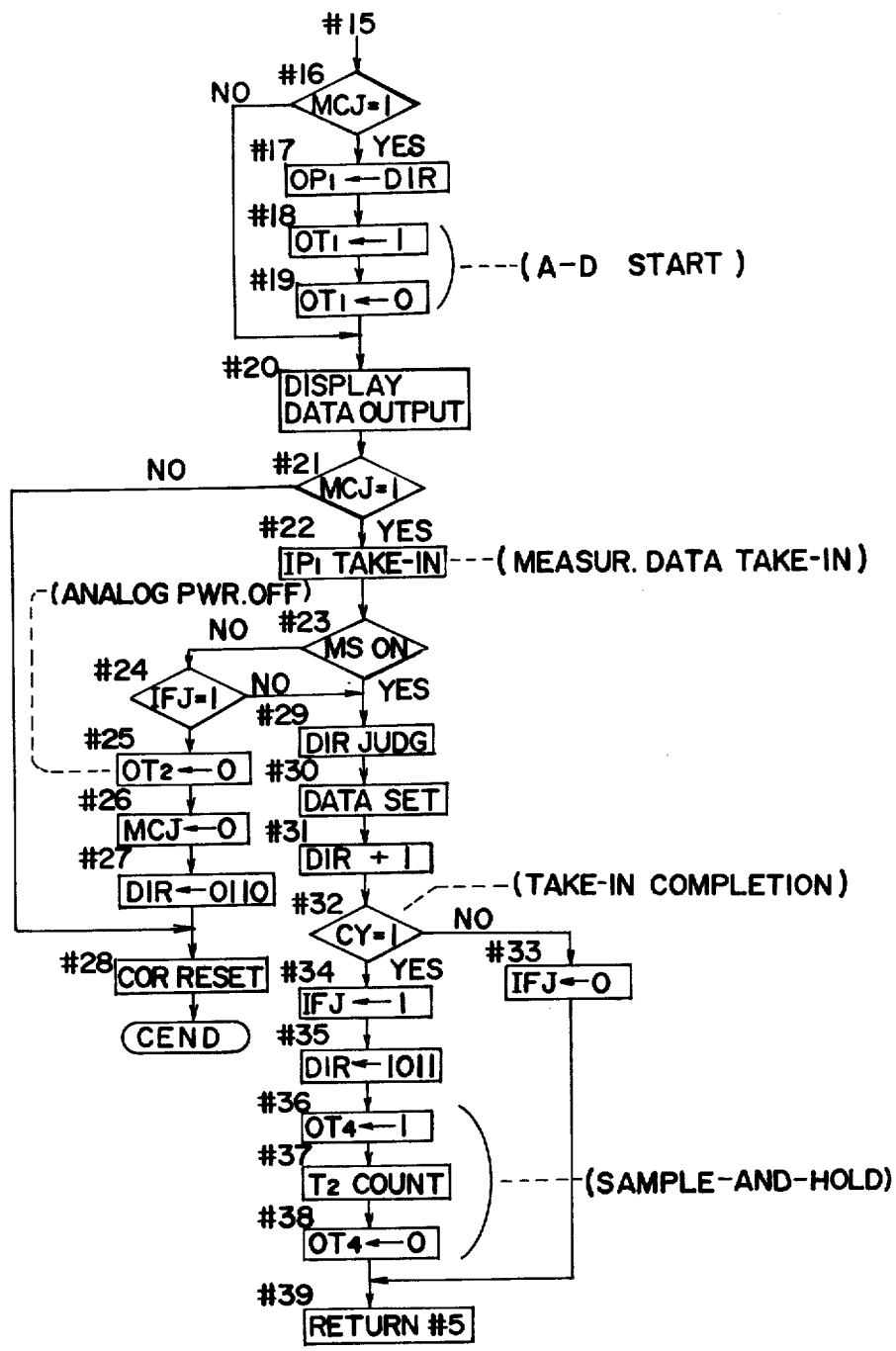
Figure 12A:
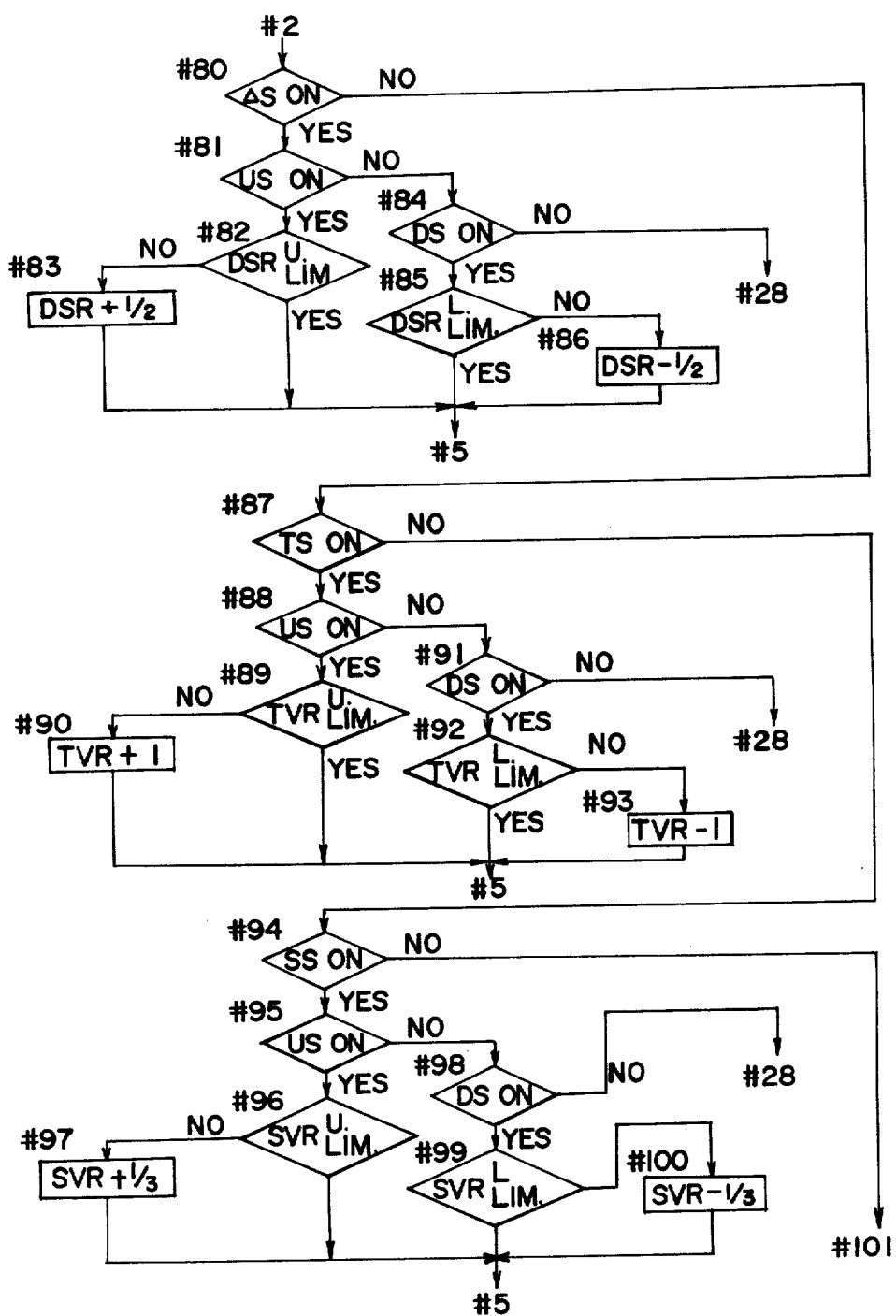
Figure 12B:
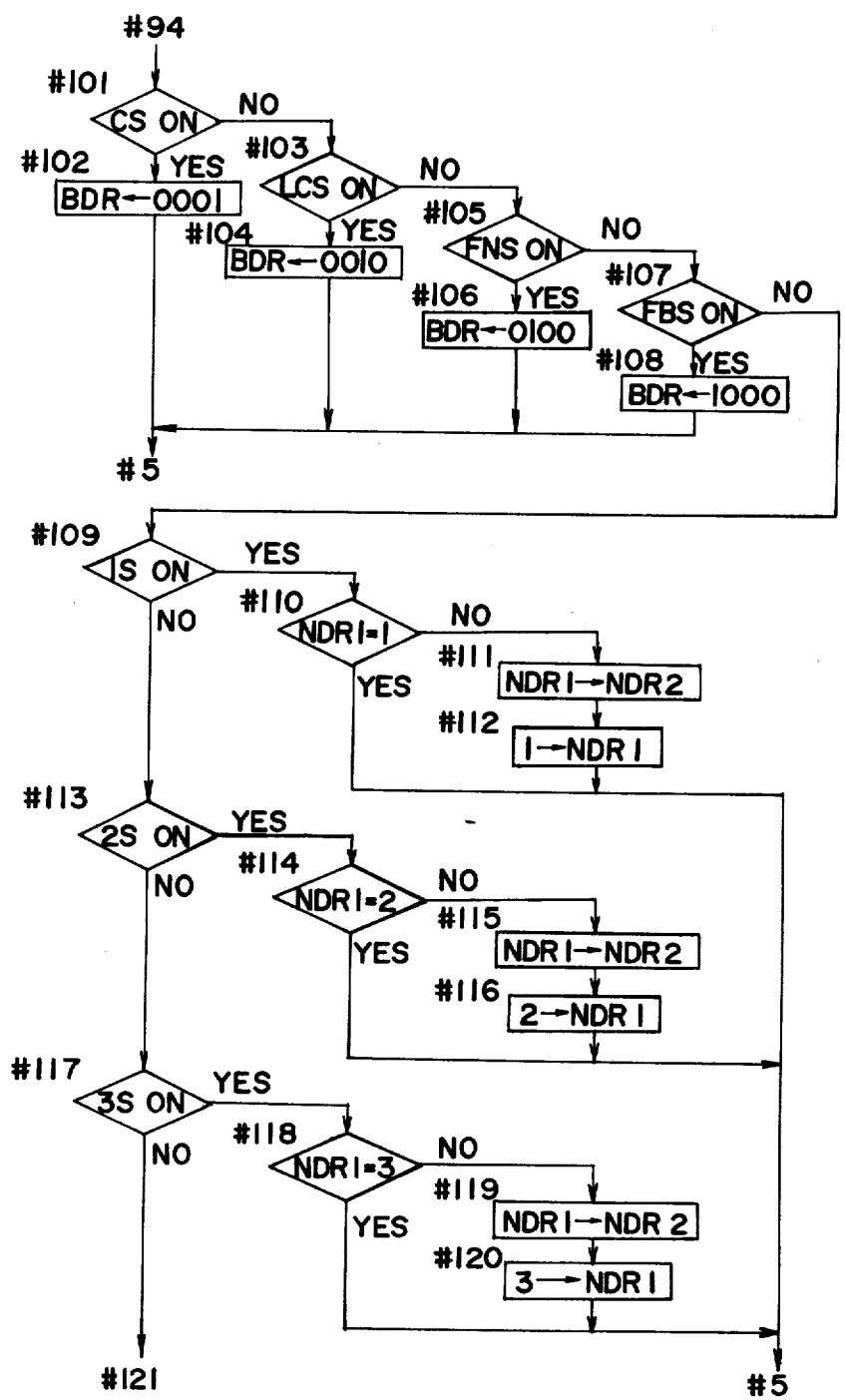
Figure 12:
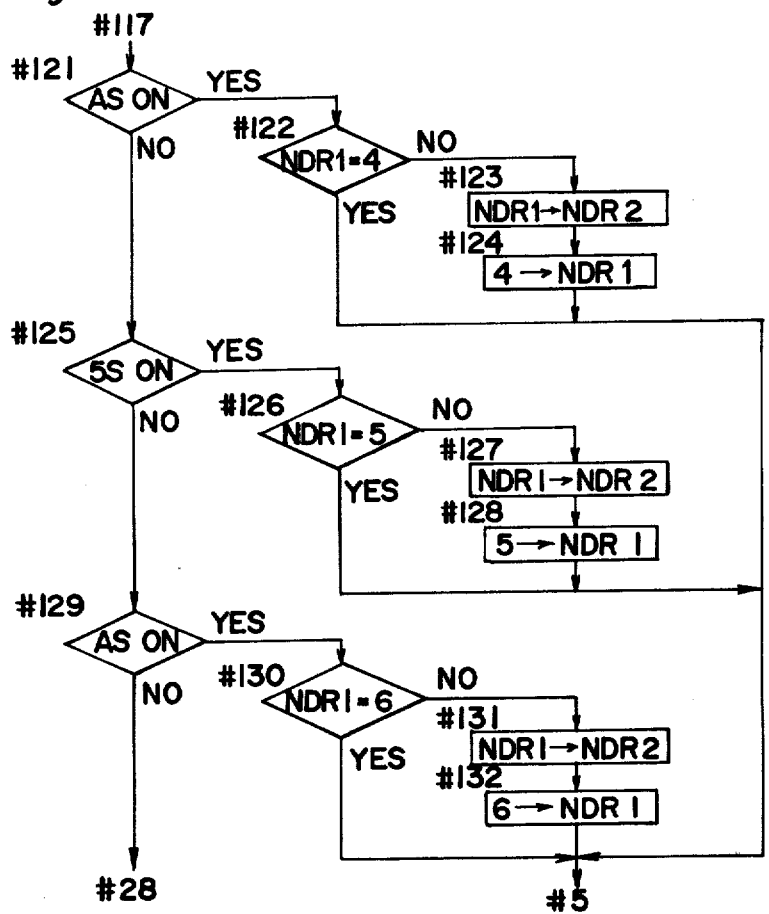
Figure 13:
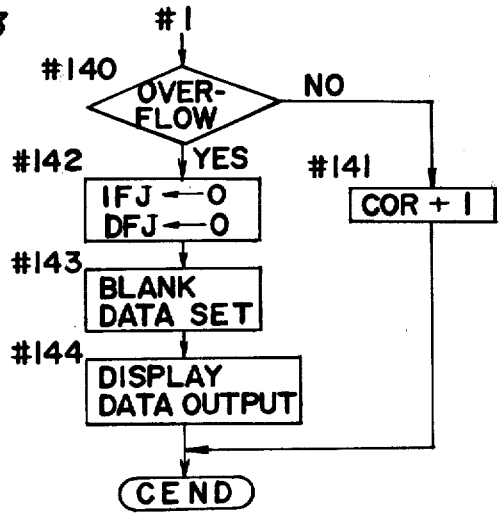

In the flow charts of FIGS. 10(A) and 10(B) illustrating the overall functioning, upon input of a 1 sec. signal or key signal in the CEND state, the μ-com 100 starts functioning according to the instruction from the particular address of the ROM 110. In a step #1, judgement is made as to whether the signal is the 1 sec. signal or key signal, and in the case of the 1 sec. signal, 1 sec. function as shown in FIG. 13 is effected. Meanwhile, in the case of the key signal, judgement is made as to whether or not the light measuring switch MS is "ON". If the light measuring switch MS is not "ON", the operation of the μ-com 100 is shifted to a step #5 after effecting the key judging function as shown in FIGS. 12(A), 12(B) and 12(C). On the contrary, if the light measuring switch MS is ON, the terminal OT2 is rendered to be "High", and then, "High" pulses are produced from the one shot circuit OS for a predetermined period of time for turning ON the FET FT31 to FT35 and resetting the capacitors C11 to C15. Simultaneously, the output of the inverter IN1 is rendered to be "Low", and thus, the transistor BT1 starts feeding the power. In the above case, since the output terminal OT3 is "Low", the FET FT21 to FT25 are rendered to be non-conductive, without charging of the capacitors C11 to C15.

At a step #4, "1" is set in the light emission judging flag SFJ, while "0" is set in each of the data take-in judging flag IFJ, light measuring state judging flag MCJ, display data completion judging flag DFJ, and Qvfm calculation completion judging flag QJF. Subsequently, at the step #5, judgement is to be made as to whether or not the take-in of the display data is completed, but since the take-in is not finished yet at the time point when the light measuring switch MS is depressed, the operation of the μ-com 100 is shifted to a step #6 so as to judge whether or not the calculation of the data for display is completed. If the calculation of the display data is not finished, data for "blank" (i.e. data for cancelling the display) are set in the display registers DPR1 to DPR7 at a step #7, and judgement is made as to whether or not the flash light is to be subsequently emitted. When the light measuring switch MS is closed, it is necessary to fire the flash light emitting device, and the operation of the μ-com 100 is shifted to a step #9 so as to render the terminal OT3 to be "High", so that the trigger signal for the flash light emitting device is developed from the trigger circuit 83, while, at the same time, the FET FT11 to FT15 are rendered to be non-conductive, and FT21 to FT25 are rendered conductive in FIG. 9, and thus, charging of the capacitors C11 to C15 is started. After setting "0" in the light emission judging flag SFJ through counting of a predetermined period of time T1, the terminal OT3 is again rendered to be "Low", whereby the FET FT21 to FT25 are rendered to be non-conductive, with the charging of the capacitors C11 to C15 being suspended to sample and hold the integrated value at this time.

The time period required from the step #3 to the step #9 is arranged to be longer than the time period from starting of the power supply to the light measuring circuit 80 up to the stabilization of said circuit. Meanwhile, the time period required from the step #9 to the step #12 is adapted to be longer than the time period required for the ordinary flash light emitting device to fully fire, and is equivalent to Tvc in the APEX value.

In a step #13, the terminal OT4 is rendered to be "High", with the transistors FT41 to FT45 in FIG. 9 turned ON for counting a predetermined time T2. Subsequently, at a step #15, the output terminal OT4 is again rendered to be "Low" so as to turn OFF the FET FT41 to FT45. Therefore, outputs of the operational amplifiers OA1 to OA5 are sampled and held in the capacitors C21 to C25.

At a step #16, judgement is made as to whether or not this step is reached by the closing of the light measuring switch MS, and when this step is reached by the key judging function as described later, the operation of the μ-com 100 is jumped over to a step #20.

In a step #17, the content of the take-in data designation register DIR is developed from the output port OP1, and fed to the multiplexer 81. At the time point when the light measuring switch MS is depressed, the content of the register DIR is at 0110 as mentioned later, and the decoder DE in FIG. 9 renders the terminal d1 thereof to be "High" for conduction of the FET FT51, and the integrated voltage Qv1 of the capacitor C11 is input to the A-D converter 82. In steps #18 and #19, pulses of "High" are produced from the terminal OT1 to start the converting function of the A-D converter 82, and at a step #20, the contents of the registers DPR1 to DPR7 for the display are output to the output ports OP2 to OP8. In the above case, if the key judging function described later or calculation of the display data has been completed, predetermined indications are effected in the display portions DI1 to DI7, and when this step has been reached through the step #7, nothing is displayed in the display portions DI1 to DI7. It is to be noted that the output ports OP2 to OP7 have latch functions and maintain the existing output data until such data are altered.

In a step #21, judgement is made as to whether or not the light measuring is under way, and if not, the operation of the μ-com 100 is shifted to a step #28 so as to reset the register for the display time counting and the μ-com 100 becomes the CEND state. If it is judged in the step #21 that the light measuring is under way, the data from the A-D converter 82 are taken-in from the input port IP1. The time period required from the step #18 to a step #22 is arranged to be longer than a time period required for the A-D conversion.

Subsequently, in a step #23, it is judged whether or not the light measuring switch MS is closed, and if not, judgement is further made as to whether or not the data take-in has been completed at a step #24. If the data take-in has been finished, the terminal OT2 is rendered to be "Low", with the power feeding transistor BT1 turned OFF, and "0" is set in the light measuring proceeding judging flag MCJ, while the data 0110 designated Qv1 are set in the take-in data selecting register DIR, and the counter register COR is reset and the μ-com 100 becomes the CEND state.

If the light measuring switch MS is closed or data have not been taken-in at a step #23 or #24, the operation of the μ-com 100 is shifted to a step #29. In the step #29, the content of the register DIR is judged, on the basis of which the data taken-in are set in the register corresponding to said data. More specifically, if the content of the register DIR is 0110, the data are of Qv1 and set in the register QVR1, and if 1001, the data are of Qv4 and set in the register QVR4, and if 1101, the data are of Bv3 and set in the register BVR3, while if 1111, the data are Bv5 which are set in the register BVR5. Meanwhile, the contents of the register DIR increases by one at a step #31. And a judgement is made as to whether or not the carry flag 106 is rendered to be "1" at a next step #32 (i.e. whether or not the result of the calculation has become 10000), and if it is not of "1", "0" is set in the take-in judging flag IFJ, and the operation of the μ-com 100 is shifted to a step #5 in FIG. 10(A). When the carry flag 106 has become "1", it may be regarded that the content of the register DIR before the addition at a step #30 was 1111, and thus, taking-in of ten data has been completed. Accordingly, "1" is set in the take-in completion judging flag IFJ, with subsequent setting of 1011 in the register DIR, and at steps #36 to #38, the outputs of the operational amplifiers OA1 to OA5 in FIG. 9 are sampled and held on the capacitors C21 to C25, and the operation of the μ-com 100 is returned to the step #5.

The taking-in of the light measuring data will be described again more in detail hereinbelow.

Upon closing of the light measuring switch MS, the flash light is emitted, at a first time, for effecting the integrating function, and the light measuring value of the ambient light is successively sample and held. Subsequently, the content 0110 of the register DIR is output to take-in the data Qv1 through A-D conversion for setting in the register QVR1. Then, "1" is added to 0110, which data are output so as to subject the data Qv2 to A-D conversion for setting in the register QVR2, and by the addition of "1" to 0111, similar functioning as described earlier is subsequently repeated, and when the result of calculation for adding "1" to the register DIR is overflowed (carry is "1"), taking-in of all the data has been completed. Thereafter, the light measuring value of the ambient light is again sampled and held so as to follow the variation of the ambient light, while 1011 is set in the register DIR so that only the data of the ambient light are subsequently taken-in.

Figure 11A:
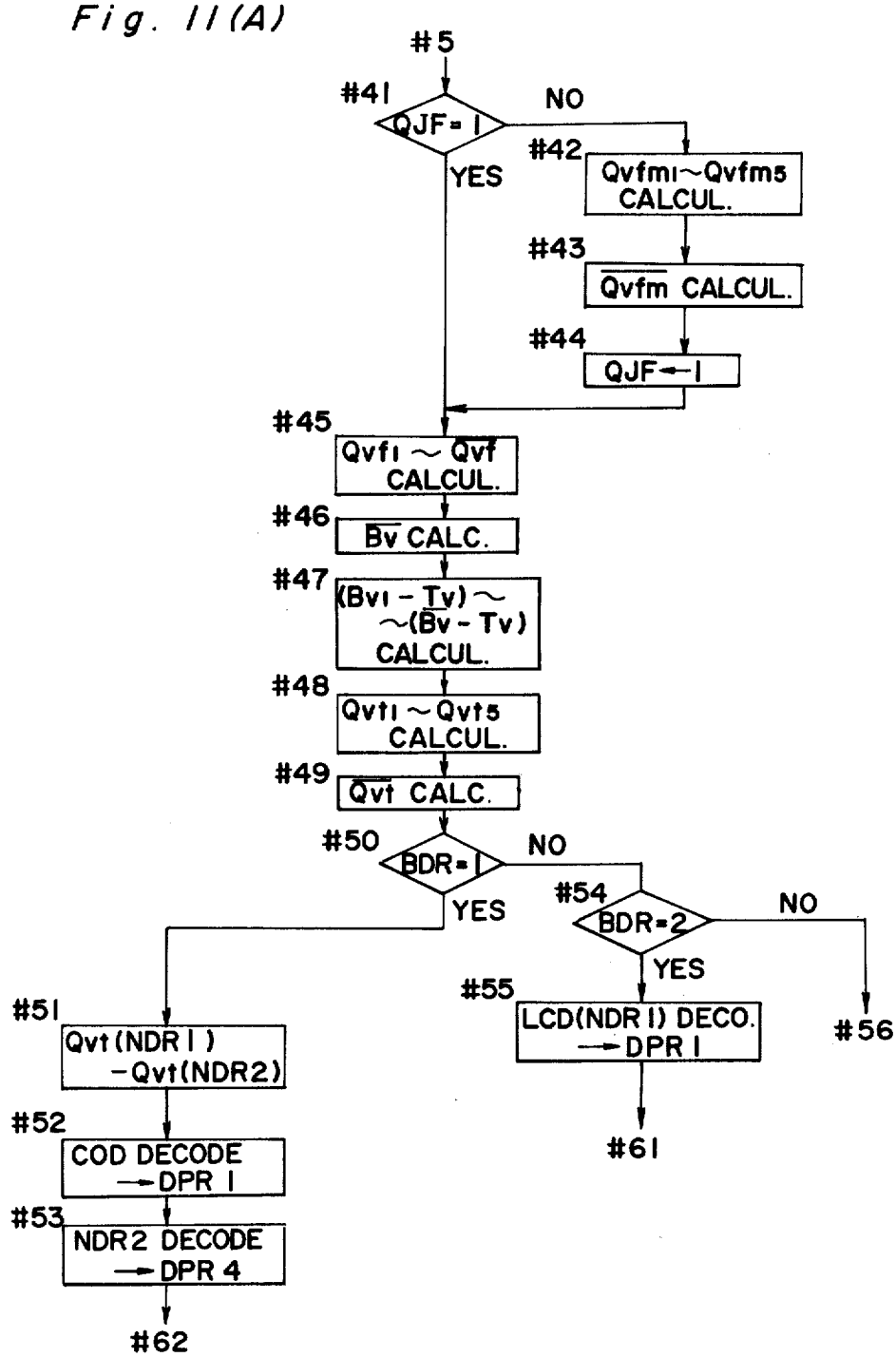
Figure 11B:
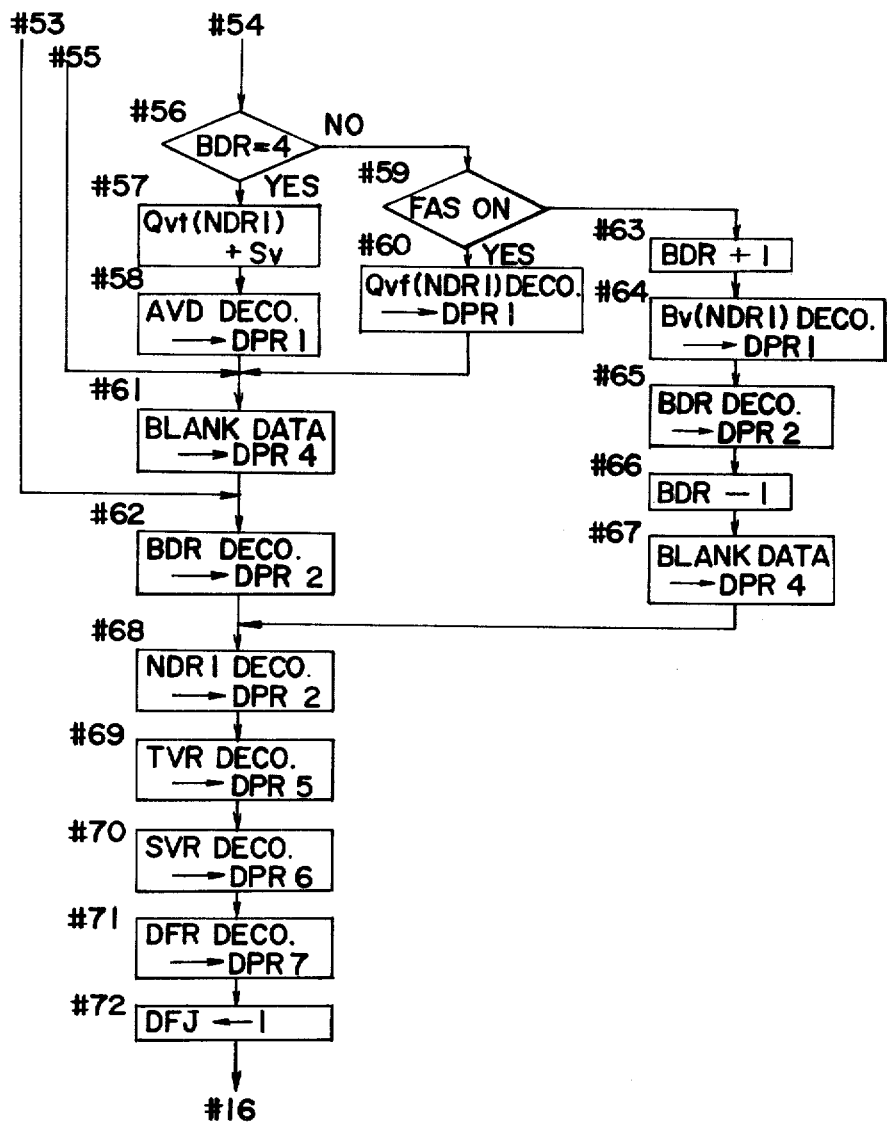

Then, the operation of the μ-com 100 is reverted to the step #5, and after effecting the calculation as shown in FIGS. 11(A) and 11(B), the data Bv1 are again subjected to A-D conversion, with the calculated value being indicated for taking-in the data for Bv1, and if the light measuring switch MS is open at this time, the state of CEND is established through the steps subsequent to the step #24. In the case where the light measuring switch MS has been closed in the above case, the data taken-in are set in the register BVR1, with "1" added to the register DIR, and the register IFJ is further rendered to be "0" and the operation of the μ-com 100 is returned to the step #5, and thereafter, functionings similar to those described earlier are repeated. Accordingly, if the light measuring switch MS has been opened at the time point when the first data taking-in is completed, calculations and indications are effected based on the take-in data at this time. Meanwhile, if the light measuring switch MS remains closed, the display also remains as before until the second taking-in of the light measuring value based on the ambient light has been completed, and upon completion thereof, the calculations and display of the second data are effected again. Meanwhile, when the first data take-in loop is started, the taking-in is repeated until the data have been completely taken-in, even if the light measuring switch MS is opened during such time period, and at the time point where the taking-in has been completed, the state of CEND is established.

Referring also to FIGS. 11(A) and 11(B) showing the flow charts for the calculation functions illustrated in FIG. 10(A), at a step #41, judgement is made as to whether or not the calculation of the light emitting amount Qvfm only for the flash light emitting device during the light measuring period has been completed. Since the calculation is not yet finished at the time point where the first data taking-in has been completed, the operation of the $\mu$-com 100 is shifted to a step #42, and if the step #41 is reached, upon completion of the data taking-in subsequent to the second time or by the key judging function, the operation of the $\mu$-com 100 is shifted to a step #45. At the step #42, calculations as follows are effected.

The light measuring data set in the registers QVR1 to QVR5 are represented by $$Qv1 = \log_2(2^{Bv1-Tvc} + 2^{Qvfm1}) \quad (4\text{-}1)$$

$$\vdots$$

$$Qv5 = \log_2(2^{Bv1-Tvc} + 2^{Qvfm5}) \quad (4\text{-}5)$$

Therefore, based on the above data, the data of the registers BVR1 to BVR5 and the fixed data Tvc, equations as follows are calculated.

$$Qv1 - (Bv1 - Tvc) = \Delta 11 \quad (5\text{-}1)$$

$$\vdots$$

$$Qv5 - (Bv5 - Tvc) = \Delta 15 \quad (5\text{-}5)$$

The data $\Delta 11$ to $\Delta 15$ thus worked out are converted into data for $\log_2(2^{\Delta 11}-1) \sim \log_2(2^{\Delta 15}-1)$, and by adding these data to the data of $(Bv1-Tvc) \sim (Bv5-Tvc)$, the following equations are worked out.

$$Qvfm1 = (Bv1 - Tvc) + \log_2(2^{\Delta 11} - 1) \quad (6\text{-}1)$$

$$\vdots$$

$$Qvfm5 = (Bv5 - Tvc) + \log_2(2^{\Delta 15} - 1) \quad (6\text{-}5)$$

At a step #43, the data for the average value $\overline{Qvfm}$ are obtained, based on the data Qvfm1 to Qvfm5 worked out at the step #42. In this embodiment, description will be made with reference to the case of the weighted average, with the weighting of the light measuring value at the portion P1 being set to be 1 and that at the portions P2 to P5 set to be 0.4. Accordingly, the light measuring in this case is equivalent to the center-weighted averaged light measurement. The average value $\overline{Qvfm}$ is represented by $$\overline{Qvfm} = \quad (16\text{-}1)$$

-continued $$\log_2\left(\frac{2^{Qvfm1} + 0.4(2^{Qvfm2} + 2^{Qvfm3} + 2^{Qvfm4} + 2^{Qvfm5})}{1 + 0.4 \times 4}\right)$$

Upon transformation of the above equation, $$\overline{Qvfm} = \log_2(2^{Qvfm1} + 2^{Qvfm2-1.3} + 2^{Qvfm3-1.3} + 2^{Qvfm4-1.3} + 2^{Qvfm5-1.3}) - 0.7 \quad (16\text{-}2)$$

where the relations $\log_2 0.4 = -1.3$, $\log_2 2.6 = 0.7$ are utilized.

Subsequently, the equation $$Qvfm1 - (Qvfm2 - 1.3) = \alpha 1$$

is worked out and transformed into $\log_2(2^{\alpha 1}+1)$ for the calculation of $$Qvfm12 = (Qvfm2 - 1.3) + \log_2(2^{\alpha 1} + 1)$$

and the data Qvfm12 in the relation as follows are obtained.

$$2^{Qvfm12} = 2^{Qvfm1} + 2^{Qvfm2-1.3}$$

Thereafter, the equation $$Qvfm12 - (Qvfm3 - 1.3) = \alpha 2$$

is calculated and transformed into $\log_2(2^{\alpha 2}+1)$ for the calculation of $$Qvfm13 = (Qvfm3 - 1.3) + \log_2(2^{\alpha 2} + 1)$$

and the data Qvfm13 in the relation as follows are worked out.

$$2^{Qvfm13} = 2^{Qvfm12} + 2^{Qvfm3-1.3}$$

Subsequently, in the similar manner as above, the data Qvfm15 in the following relations are obtained.

$$Qvfm15 = \log_2(2^{Qvfm1} + 2^{Qvfm2-1.3} + 2^{Qvfm3-1.3} + 2^{Qvfm4-1.3} + 2^{Qvfm5-1.3})$$

Upon subtraction of 0.7 from the above data, the value $\overline{Qvfm}$ is obtained as is clear from the equation (16-2).

Meanwhile, when the light measurement is effected without firing the flash light emitting device or the object to be measured for the light intensity is located at a long distance, or the reflected light flash amount is extremely small as compared with the light amount of the ambient light, the reflected light amount $2^{Qvfm}$ by the flash light during the light measurement undesirably becomes 0 as represented by $$Qv - (Bv - Tvc) = \Delta 1 = 0$$

In the above case, the value Qvfm becomes $-\infty$, but when the data $\Delta 11$ to $\Delta 15$ become the data corresponding to values less than predetermined values (for example 0.1), data corresponding to $-\infty$ are set in the register where the value Qvfm is to be set. Furthermore, even in the process of calculating the average value $\overline{Qvfm}$, if $\alpha$ becomes the data corresponding to the value less than the predetermined value (for example $-3.8$), the minuend is arranged to be output as it is. More specifically, for example, in the relation $\alpha 2 \leq -3.8$, the data are so arranged that Qvfm12=Qvfm13. Similarly, for example, when Qvfm2 is of data corresponding to $-\infty$, the relation is so arranged as Qvfm1=Qvfm12.

In the step #45, based on the data $\Delta f$ in the register DFR and the calculated data Qvfm1 to Qvfm5 and $\overline{\text{Qvfm}}$, the equations as follows are calculated so as to work out the reflected flash light amounts Qvf1 to Qvf5 and $\overline{\text{Qvf}}$ of the flash light during photographing $$Qvf1 = Qvfm1 - \Delta f \quad (7\text{-}1)$$
$$\vdots$$
$$Qvf5 = Qvfm5 - \Delta f \quad (7\text{-}5)$$
$$\overline{Qvf} = \overline{Qvfm} - \Delta f \quad (7\text{-}6)$$

In the above case also, when the data Qvfm are corresponding to $-\infty$, the data Qvf are arranged to remain as corresponding to $-\infty$. Subsequently, at a step #46, the average value $\overline{Bv}$ is obtained based on the light measuring data Bv1 to Bv5 taken-in the registers BVR1 to BVR5. In this case, the average value $\overline{Bv}$ is represented by the following relation in the similar manner as in the average value $\overline{Qvfm}$, and may be worked out in the similar fashion to the calculation in the step #43.

$$\overline{Bv} = \log_2\left( \frac{2^{Bv1} + 0.4(2^{Bv2} + 2^{Bv3} + 2^{Bv4} + 2^{Bv5})}{1 + 0.4 \times 4} \right) \quad (17)$$

At a step #47, based on the contents Bv1 to Bv5 of the resisters BVR1 to BVR5, the data Tvs for the exposure time set in the register TVR, and the data Bv calculated in the step #46, calculations are made as follows.

$$Bv1 - Tvs$$
$$\vdots$$
$$Bv5 - Tvs$$
$$\overline{Bv} - Tvs$$

Subsequently, in a step #48, following calculations are effected for working out the data $\Delta L1$ to $\Delta La$ corresponding to the lighting contrast.

$$Qvf1 - (Bv1 - Tvs) = \Delta L1 \quad (8\text{-}1)$$
$$\vdots$$
$$Qvf5 - (Bv5 - Tvs) = \Delta L5 \quad (8\text{-}5)$$
$$\overline{Qvf} - (\overline{Bv} - Tvs) = \Delta La \quad (8\text{-}6)$$

In the above case, if the value Qvf is of the data corresponding to $-\infty$, $\Delta L$ is also set for the data corresponding to $-\infty$. Thereafter, the data worked out are converted into data corresponding to $\log_2(2^{\Delta L1}+1)$~$\log_2(2^{\Delta La}+1)$, and by adding these data to (Bv1−Tvs)~(Bv5−Tvs), calculations as follows are effected.

$$Qvt1 = (Bv1 - Tvs) + \log_2(2^{\Delta L1} + 1) \quad (9\text{-}1)$$
$$\vdots$$
$$Qvt5 = (Bv5 - Tvs) + \log_2(2^{\Delta L5} + 1) \quad (9\text{-}5)$$

In other words, it may be regarded that the light amount owing to the ambient light during the photographing and flash light has been worked out. In the above case, when the value $\Delta L$ is of the data corresponding to those less than the predetermined value (for example $-3.8$) or of the data corresponding to $-\infty$, the relation is as follows.

$$Qvt = Bv - Tvs$$

Subsequently, in a step #49, the average value Qvt is worked out based on the data Qvt1 to Qvt5 calculated at the step #48. The value $\overline{Qvt}$ is represented by $$\overline{Qvt} = \log_2\left( \frac{2^{Qvt1} + 0.4(2^{Qvt2} + 2^{Qvt3} + 2^{Qvt4} + 2^{Qvt5})}{1 + 0.4 \times 4} \right) \quad (18)$$

The above calculation is effected in the similar manner as in the steps #43 and #46.

In a step #50, it is judged whether or not the content of the display mode judging register BDR is "1". If it is "1", the mode is for displaying the contrast.

Meanwhile, at a step #51, data Qvt corresponding to the register NDR2 are subtracted from the data Qvt corresponding to the register NDR1 in which the data corresponding to the light measuring portion are set, and thus, the contrast between the light measuring portion corresponding to the data of the register NDR1 and that corresponding to the data of the register NDR2 is worked out as follows.

$$\Delta C = Qvt(NDR1) - Qvt(NDR2) \quad (3)$$

The data $\Delta C$ (represented by COD in the flow chart) thus worked out are converted into data for display so as to be set in the register DPR1 and further, the data of the register NDR2 are also decoded and set in the register DPR4.

In the case where the data for the register BDR are not of "1" in the step #50, it is judged whether or not the register BDR is of "2" at a step #54. If it is of "2", the mode is for the display of lighting contrast as shown in Table 2. In a step #55, based on the lighting contrast $\Delta L$ obtained in the calculation at the step #48, the data for the lighting contrast (represented by LCD (NDR1) in the flow chart) of the light measuring portion corresponding to the content of the register NDR1 are decoded into the display data for setting in the register DPR1. In the above case, when the data for the lighting contrast $\Delta L$ correspond to $-\infty$, display data by which, for example, the indication $-\square$ is effected at the display portion DI1, are set in the register DPR1.

In the case where the content of the register BDR is not of "2" in the step #54, judgement is subsequently made in a step #56 as to whether or not the content is of "4". If it is of "4", the mode is for indication of the aperture value which provides the optimum exposure. In this case, the equation as follows is worked out, based on the data Qvt (NDR1) of the light amount at the light measuring portion corresponding to the content of the register NDR1 and the film speed Sv set in the register SVR.

$$Qvt(NDR1) + Sv = Av(NDR1) \tag{15}$$

The data thus worked out (represented by AVD in the flow chart) are decoded into the data necessary for indication in F number and set in the register DPR1.

When the content of the register BDR is not of "4" in a step #56, the content is of "8" as is seen from Table 2, which is the mode for displaying the reflected light amount Qvf due to the flash light emitting device firing upon photography or the brightness Bv due to the ambient light. In a step #59, it is judged whether or not the input flip-flop IF1 is set, with the switch FAS connected to the terminal FL. If the switch FAS is connected to the terminal FL, the data Qvf corresponding to the reflected light amount of the light measuring portion which corresponds to the content of the register NDR1 are decoded into display data for setting in the register DPR1.

In a step #61, since no display is given at the display portion DI7 except for the case of the display mode for contrast, blank data are set in the register DPR4. Meanwhile, in a step #62, the content of the register BDR is decoded so as to be set in the register DPR2, which data serve as the display data for the display portion DI5.

In the case where the input flip-flop IF1 is not set in the step #59, the switch FAS has been connected to the terminal AM, and the mode is for the display of the scene brightness due to the ambient light. In the above case, the content of the register BDR is made to be "9" through addition of "1" thereto, and simultaneously, the data Bv for the scene brightness at the light measuring portion corresponding to the content of the register NDR1 are decoded so as to be set in the register DPR1, while the content of the register BDR is decoded for setting in the register DPR2, and then, "1" is subtracted from the content of the register BDR, with data for blank being set in the register DPR4, and thus, the operation of the μ-com 100 is shifted to a step #68.

In the step #68, the data of the register NDR1 are decoded so as to be set in the register DPR3. In the above case, the data to be set are such that, for the display at the light measuring portions P1 to P5, ordinary indications of 1 to 5 are effected, while for the indication of the average value, the display "A" is made. In a step #69, the data of the register TVR are decoded into data necessary for displaying the exposure time and set in the register DPR5. Furthermore, in a step #70, decoding is effected into data necessary for indicating ASA sensitivity based on the data of the register SVR and set in the register DPR6. In a step #71, decoding is also effected, based on the data of the register DFR, into data necessary for displaying Δf so as to be set in the register DPR7, and subsequently, after setting "1" in the flag DFJ for judging whether or not the setting of the indication data has been completed, the operation of the μ-com 100 is shifted to the step #16 (FIG. 10(B)).

The functions related to the flow-charts of FIGS. 11(A) and 11(B) will be summarized as follows.

When the flow is first entered upon effecting the light measurement, the reflected light flash amounts Qvfm1 to Qvfm5 and $\overline{Qvfm}$ are calculated. Meanwhile, with the light measuring key MS being kept depressed, when the light measuring data Bv1 to Bv5 are again taken-in and the operation of the —com 100 has entered this flow, the calculations of the reflected light amounts Qvfm1 to Qvfm5 and $\overline{Qvfm}$ are not effected, $\overline{Qvfm}$ of the flash light emitting device are not effected, but calculations subsequent to the step #45 are performed, based on the data previously worked out. Subsequently, the data Qvf1 to Qvf5, $\overline{Qvf}$, $\overline{Bv}$, ΔL1 to ΔL5, ΔLa, Qvt1 to Qvt5 and $\overline{Qvt}$ are calculated, and thus, the data corresponding to the set display modes are set in the display registers DPR1 to DPR7.

For displaying the contrast, the difference between the data Qvt corresponding to the position which corresponds to the content of the register NDR1 and the data Qvt corresponding to the position which corresponds to the content of the register NDR2 is displayed at the display portion DI1, and the position corresponding to the register NDR1 is displayed at the display portion DI6, while the position corresponding to the register NDR2 is displayed at the display portion DI7. The display portion DI5 is indicated with "C ON", and the set exposure time is displayed at the display portion DI2, the film speed, at the display portion DI3, and Δf, at the display portion DI4.

In the case where the lighting contrast is to be displayed, the lighting contrast at the position corresponding to the content of the register NDR1 is displayed at the display portion DI1 in the value of APEX system, and the position which corresponds to the content of the register NDR1 is displayed at the display portion DI6, while nothing is displayed at the display portion DI7. Meanwhile, "L.CON" is displayed at the display portion DI5, with set values being displayed at the display portions DI2 to DI4.

For displaying the data for Qvt, the Qvt at the spot corresponding to the register NDR1 is indicated at the display portion DI1 in the value of the APEX system, and other indications are the same as for the lighting contrast. Meanwhile, in the case of displaying aperture values for obtaining the optimum exposure, the F number is displayed at the display portion DI1, with "F NO." displayed at the display portion DI5, while other indications are the same as for the lighting contrast. For the indications of the reflected light amount due to the flash light emitting device and the brightness due to the ambient light, the data Qvf and Bv are respectively displayed in the APEX values, with simultaneous indications of "FLA" or "AMB".

It should be noted here that the values to be indicated in the above case need not necessarily be in the APEX system, but the contrast, lighting contrast and Δf may be arranged to be displayed by the linear system, and that, with respect to the reflected light amount, it may be so arranged as to work out the equation Qvf + Sv = Avf for displaying the aperture value which provides the proper exposure only by the light emitting amount, or that aperture values corresponding to Ev = Bv + Sv or Av = Bv + Sv − Tv may be arranged to be displayed instead of Bv.

Reference is further made to flow-charts in FIGS. 12(A), 12(B) and 12(C) illustrating the key judging functions.

In the case where the light measuring switch MS is not closed at the step #2 in FIG. 10(A), the operation of the μ-com 100 is shifted to a step #80, in which, it is judged whether or not the switch S is closed, and if not closed, the operation of the μ-com 100 is further shifted to a step #87, while on the contrary, if the switch ΔS is closed, judgement is made as to whether or not the up switch US is closed. If it is closed, judgement is made as to whether or not the content of the Δf setting register DSR is at an upper limit, and if at the upper limit, the operation of the μ-com 100 is shifted to the step #5, but if the content of the register DSR is not at the upper limit, the data corresponding to ⅛Ev is added to the content of the register DSR, and the step is shifted to the step #5. Upon judgement that the up switch US is not closed at the step #81, it is judged whether or not the down switch DS is closed at the step #84. If the above switch DS is closed, judgement is further made as to whether or not the content of the register DSR is at a lower limit, and if it is at the lower limit, the operation of the μ-com 100 is shifted to the step #5, while on the contrary, if the content of the register DSR is not at the lower limit, the operation of the μ-com 100 is shifted to the step #5 after subtraction of the data corresponding to ⅛Ev from the content of the register DSR. If it is judged at the step #84 that the switch DS is not closed, either, the operation of the μ-com 100 is moved on to the step #28, and after resetting the display time counting register COR, and the μ-com 100 is brought into the CEND state.

Accordingly, if the switches ΔS and US or DS are kept closed during the display of data, Δf is altered, and data newly worked out based on the altered data are displayed. When both of the above switches are kept closed, the value Δf is altered at each predetermined period of time, and the calculated value is also altered for the display. Meanwhile, when the two switches are closed during the period not for the display, no display is effected, although the content of the register DSR is altered.

Steps #87 to #93 relate to the flow for the exposure time setting function, similar to the setting of the value Δf. In the above case, the content of the register TVR is altered at a unit of 1Ev. Meanwhile, steps #94 to #100 relate to the flow for setting the film speed, similar to the setting of the value Δf. In this case, the content of the register SVR is altered at a unit of ⅛Ev.

When the film speed setting switch ASS is not kept closed at the step #94, the operation of the μ-com 100 is shifted to a step #101. Steps #101 to #108 relate to the flow for the display mode setting, and if the switch CS is kept closed, the mode is for displaying the contrast, with 0001 set in the register BDR. When the switch LCS is kept closed, the mode is for displaying the lighting contrast, and 0010 is set in the register BDR. Meanwhile, if the switch FNS is kept closed, the mode is for displaying the aperture value, with 0100 set in the register BDR, and when the switch FBS is kept closed, the mode is for displaying the reflected light amount due to the flash light emitting device or the brightness, with 1000 set in the register BDR, and the operation of the μ-com 100 is shifted to a step #5 for effecting a new indication.

In the step #107, the operation of the μ-com 100 is shifted to a step #109 when the switch FBS is not closed. Steps #109 to #132 relate to the flow for setting data corresponding to the light measuring portions in the registers NDR1 and NDR2. In the above case, judgement is first made as to whether or not the data for the portion corresponding to the closed switch are in agreement with the content of the register NDR1, and if such data are in agreement therewith, the operation of the μ-com 100 is shifted to the step #5, with the contents of the registers NDR1 and NDR2 left as they are, while on the contrary, if these data are not in agreement therewith, the content of the register NDR1 is transferred into the register NDR2, and the data for the portion corresponding to the closed switch are set in the register NDR1 and the operation of the μ-com 100 is shifted to the step #5, and thus, fresh data are displayed at the steps subsequent to the step #5. In the step #129, if the switch AS is not kept closed, the operation of the μ-com 100 is shifted to the step #28, and the display time counting register is reset, and the μ-com 100 becomes the CEND state.

Referring to FIG. 13 showing a flow-chart for the 1 sec. function, if it is judged that the signal is of the 1 sec. signal at the step #1 of FIG. 10(A), the operation of the μ-com 100 is shifted to a step #140. In the step #140, it is judged whether or not the display time counting register COR is overflowing, i.e. whether or not a predetermined period of time is lapsed after resetting of the register COR. If the register COR is not overflowing, "1" is added to the content of the register COR and the μ-com 100 becomes the CEND state, while, if it is overflowing, "0" is set in the data taken-in completion judging flag IFJ and the display data calculation completion judging flag DFJ so that no display is effected even if any key function (except for that of the light measuring switch) is performed thereafter, with the blank data set in the display register so as to be output, and the μ-com 100 becomes the CEND state. Therefore, when the predetermined period of time is lapsed after the register COR has been reset (i.e. the light measuring switch MS is opened or other key operations are effected), the display is erased and subsequently, remains erased, unless the light measuring switch MS is closed for effecting the light measuring calculation again.

Figure 14:
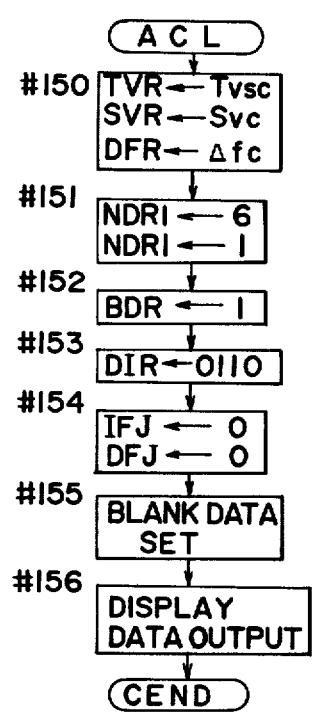

Referring further to FIG. 14 showing a flow-chart for the power on/clear functions upon starting of power supply to the μ-com 100 due to replacement of the power source battery E, etc., when the power feeding to the μ-com 100 is initiated, the μ-com 100 starts functioning following the instruction from the specific address of the ROM 110 based on the function of said power on/clear circuit 101. In a step #150, specific exposure time Tvsc (for example, 1/60 sec.) is set in the register TVR, the film sensitivity Svc (for example, ASA 100) is set in the register SVR, and the value Δfc (for example, 0) is set in the register DFR. Subsequently, the data 6 corresponding to the average are set in the register NDR1, while the data 1 corresponding to the central light measuring portion P1 are set in the register NDR2. At a step #152, the data 0001 corresponding to the contrast display mode are set in the display mode selecting register BDR, and the data 0110 for taking-in Qv1 are set in the take-in data selecting register DIR. Thereafter, for arranging that the display is not effected when the key operations other than that of the light measuring switch MS is made, "0" is set in the take-in completion judging flag IFJ and display data calculation completion judging flag DFJ, with blank data being set in the display data setting register so as to be output and the μ-com 100 becomes the CEND state.

It is to be noted here that, although in the foregoing embodiment, the weighted average is described to be obtained for the average value, the average value obtained need be limited to the weighted average, but may be of a harmonic average or geometrical average. In the first place, the geometrical average is represented by $$\bar{x} = \log_2\left(\sqrt[5]{2^{x_1} \cdot 2^{x_2} \cdot 2^{x_3} \cdot 2^{x_4} \cdot 2^{x_5}}\right)$$

which will be converted into $$x = (x_1 + x_2 + x_3 + x_4 + x_5)/5$$

which may be worked out by the normal calculating capacity of the μ-com 100. On the other hand, the harmonic average is represented by $$\bar{x} = \log_2\left(\frac{5}{\frac{1}{2^{x_1}} + \frac{1}{2^{x_2}} + \frac{1}{2^{x_3}} + \frac{1}{2^{x_4}} + \frac{1}{2^{x_5}}}\right)$$

and, since $\log_2 5 = 2.3$, further transformed into $$x = 2.3 - \log_2(2^{-x_1} + 2^{-x_2} + 2^{-x_3} + 2^{-x_4} + 2^{-x_5})$$

Here, upon definition that $$2^{-x_{15}} = 2^{-x_1} + 2^{-x_2} + 2^{-x_3} + 2^{-x_4} + 2^{-x_5}$$

for obtaining x15, the relation as follows may be established $$\bar{x} = 2.3 + x_{15}$$

Firstly, on the assumption that $$x_1 - x_2 = \beta_1$$

the relation will be $$2^{-x_{12}} = 2^{-x_1} + 2^{-x_2} = 2^{-x_2} \cdot (1 + 2^{-\beta_1})$$

and thus, the following relation will be obtained $$x_{12} = x_2 - \log_2(1 + 2^{-\beta_1})$$

Subsequently, on the assumption that $$x_{12} - x_3 = \beta_2$$

the relation as follows will be established $$x_{13} = x_3 - \log_2(1 + 2^{-\beta_2})$$

Thereafter, the relations will be $$x_{13} - x_4 = \beta_3$$

$$x_{14} = x_4 - \log_2(1 + 2^{-\beta_3})$$

$$x_{14} - x_5 = \beta_4$$

$$x_{15} = x_5 - \log_2(1 + 2^{-\beta_4})$$

and thus, x15 and also $\bar{x}$ are obtained.

In the above instance, although description is not given on the case where the data have exceeded the display limits, in such cases were the data goes over the display limits, it may be so arranged, for example, as disclosed in Japanese Patent Application No. 54-154753, that data for critical values and blank data are alternately output upon judgement that the data have exceeded the display limits, so as to turn on and off the critical values for display.

Figure 15:
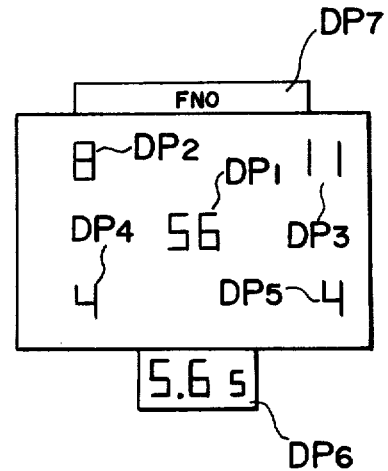
FIG. 15 is a fragmentary side elevational view showing, on an enlarged scale, a modification of a display portion of the light measuring meter of FIG. 7.

Referring to FIG. 15 showing a modified display system according to the present invention, at display portions DP1 to DP5 corresponding in positions to the respective light measuring portions P1 to P5, the data obtained based on the light measuring values of the respective light measuring portions are displayed, while the average value is indicated in a display portion DP6, with a display portion DP7 arranged to indicate the display modes. These display portions as described above may be constituted by liquid crystal panels for indication in a view finder (not shown).

For displaying the contrast by the above display device, the display portion DP6 is kept blank, while in the display portions DP1 to DP5, the contrast between the average and each of the light measuring portions is displayed. By the above arrangement, the contrast between the respective light measuring portions P1 to P5 may be directly read, since they are equivalent to the difference between the respective indicated values.

Figure 16:
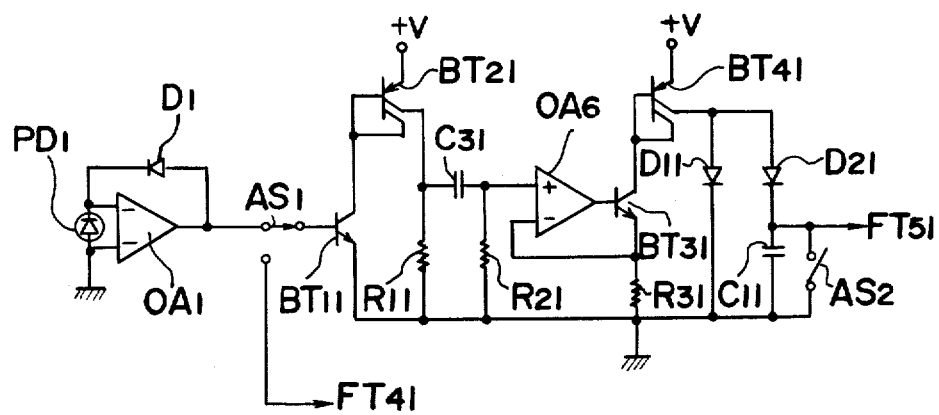
FIG. 16 is an electrical block diagram showing a modification of the light measuring circuit of FIG. 9.

Reference is made to FIG. 16 showing a modification of the light measuring circuit described with reference to FIG. 9. In this modification, during the integrating function, the output of the transistor BT21 is converted into a voltage through a resistor R11 coupled thereto and to the emitter of the transistor BT11, and only the variation of the above voltage is taken out by a high pass filter constituted by a series connection of a capacitor C31 and a resistor R21, which is coupled to opposite ends of the resistor R11. More specifically, to a positive input terminal of an operational amplifier OA6 connected to the capacitor C31, a potential corresponding only to the variation of the output current of the photoelectric element PD1 due to the reflected light intensity by the flash light emitting device is impressed, and is converted into a current by a circuit constituted by the operational amplifier OA6 whose output is connected to a base of a transistor BT31, a resistor R31 connected to the emitter of the transistor BT31 which is further connected to a negative input terminal of the amplifier OA6, and a transistor BT41 whose base and collector are connected to the collector of the transistor BT31, and the converted current thus obtained is caused to flow into the circuit constituted by the diodes D11 and D21 described earlier with reference to FIG. 9. Accordingly, the integrated voltage of the capacitor C11 may be regarded as corresponding to Qvfm1, and thus, it becomes unnecessary to work out Qvfm1 from the values Qv1 and Bv1.

It should be noted that the concept of the light measuring device according to the present invention may be applied to an exposure control device of a photographic camera. In the above case, it may be so arranged, for example, that, before starting of the exposure control, the flash light emitting device is preliminarily caused to emit flash light. And the light measuring device obtains the light amount to work out the contrast and exposure control values for the indication of the contrast, and that the actual exposure control is effected after a photographer has checked such indication. In the above case, the exposure may be adapted to be controlled by the calculated exposure control value.

As is clear from the foregoing description, according to the light measuring device of the present invention, if the set value is successively altered while watching the contrast measured and displayed so as to take the photograph at the set value when the contrast reaches the desired value, it becomes possible to obtain photographs with desired contrast values through quantitative control of the contrast, which has been considered impossible up to the present.

SECOND EMBODIMENT

In a second embodiment of the present invention which is to be described hereinbelow with reference to FIGS. 17 to 29, the basic concept is to control the contrast in the scene to be photographed through employment of the auxiliary light source, for example, the flash light emitting device such as an electronic flash and the like.

More specifically, when the brightness at two portions are denoted by $2^{Bv1}$ and $2^{Bv2}$, and the reflected light amounts from the two portions by the auxiliary light are represented by $2^{Qvf1}$ and $2^{Qvf2}$ respectively, it may be so arranged that the value Tvx satisfying the equation $$(2^{Bv1-Tvx}+2^{Qvf1})/(2^{Bv2-Tvx}+2^{Qvf2})=2^{\Delta cs} \quad (1\text{-}1)$$

is obtained so as to control the exposure time to $2^{-Tvx}$, with the auxiliary light source being fired at the light emitting amount during the light measuring, whereby the contrast at the two portions reproduced on a photosensitive member is controlled to Δcs.

Figure 17:
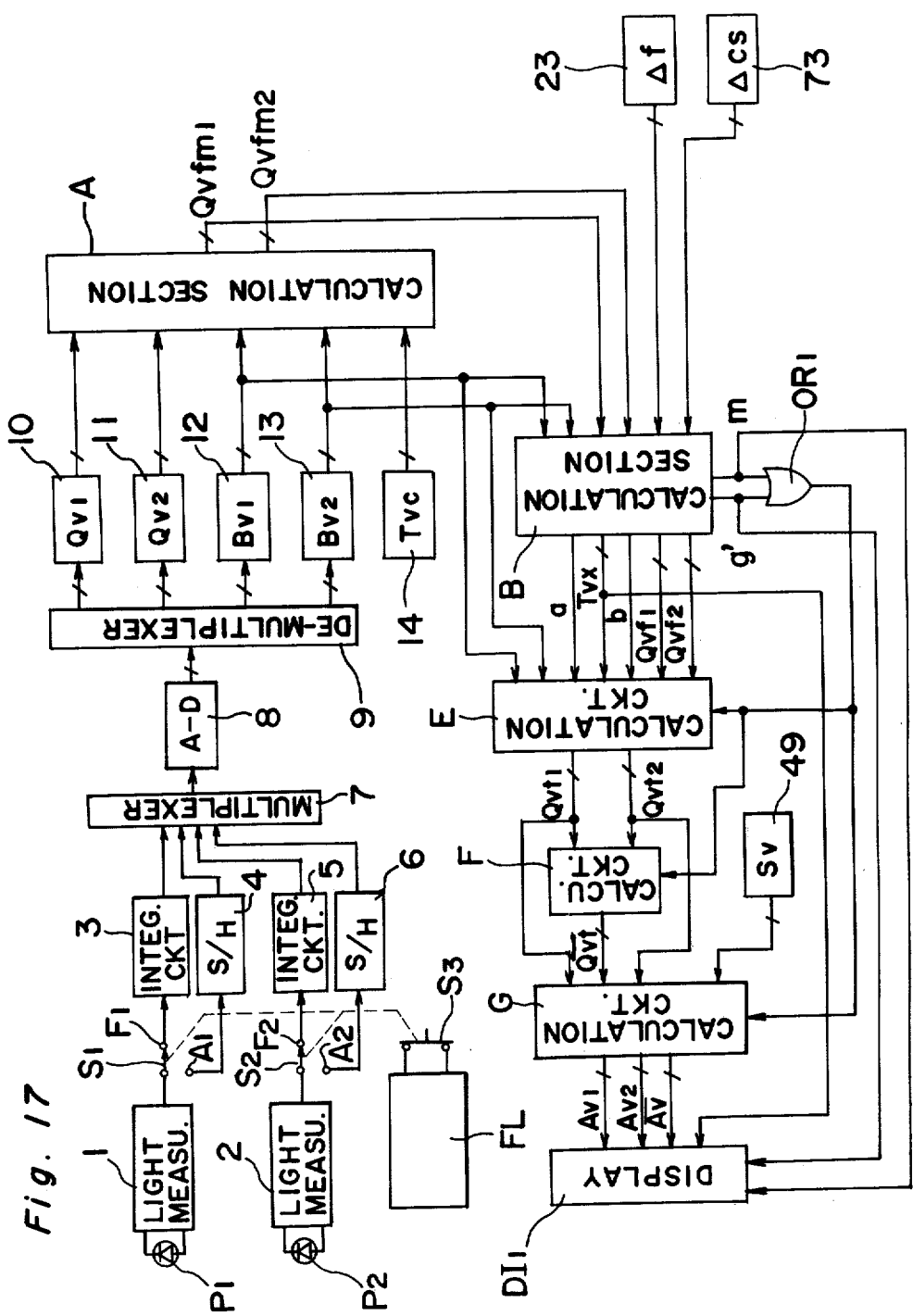
FIG. 17 is an electrical block diagram showing the construction of a light measuring device according to a second embodiment of the present invention.

Reference is made to an electrical block diagram of FIG. 17 showing the construction of the light measuring device according to the second embodiment of the present invention in which the hatched signal lines represent those which deal with signals of a plurality of bits.

In FIG. 17, the light measuring circuits 1 and 2 respectively for measuring different portions in the scene to be photographed have specific constructions as already described in detail with reference to FIG. 9 for the first embodiment. The change-over switches S1 and S2 are adapted to switch over the outputs of the light measuring circuits 1 and 2 between the integration circuits 3 and 5 and sample-hold circuits 4 and 6, and arranged to be connected to the terminals F1 and F2 by the light measuring starting signal (not shown) and kept connected to said terminals F1 and F2 for the predetermined period of time $2^{-Tvc}$ which is longer than the time period required for the full light emission by an ordinary flash light emitting device, while the switches S1 and S2 are kept connected to the terminals A1 and A2 during the periods other than the above. The switch S3 is closed by the light measuring starting signal (not shown) so as to fire the flash light emitting device FL. The output of the integration circuit 3 has the value Qv1 which satisfies the equation $$2^{Bv1-Tvc}+2^{Qvfm1}=2^{Qv1} \quad (4'\text{-}1)$$

wherein Bv1 is the scene brightness due to the ambient light, $2^{-Tvc}$ is the integrating time, and $2^{Qvfm1}$ is the reflected light amount by the flash light emitting device during the light measuring as also described earlier.

Similarly, the output of the integration circuit 5 is of the value Qv2 which satisfies the equation $$2^{Bv2-Tvc}+2^{Qvfm2}=2^{Qv1} \quad (4'\text{-}2)$$

The sample-and-hold circuits 4 and 6 are arranged to simultaneously sample and hold the outputs Bv1 and Bv2 of the light measuring circuits 1 and 2 at every predetermined period of time after the switches S1 and S2 have been connected to the terminals A1 and A2. The sample-and-hold is effected, in its timing, immediately after completion of the integrating function and maintained thereafter to such an extent that the display does not flicker after elapse of a predetermined period of time subsequent to the termination of the calculation and display functions.

Upon completion of the first sample-and-hold, the analog multiplexer 7 first applies the signal for Qv1 to the A-D converter 8, and subsequently, develops the signal for Qv2, and then, produces signals in the order of Bv1 and Bv2. Meanwhile, upon completion of the sample-and-hold subsequent to the second time, the multiplexer 7 outputs only the signals for Bv1 and Bv2. The A-D converter 8 connected to the analog multiplexer 7 is arranged to subject the analog signal from the analog multiplexer 7 to the A-D conversion. The digital de-multiplexer 9 coupled to the A-D converter 8 is further connected to the register 10 where the data of Qv1 are set, the register 11 where the data for Qv2 are set, the register 12 where the data for Bv1 are set and the register 13 where the data for Bv2 are set. Upon termination of the first sample-and-hold, the above digital de-multiplexer 9 respectively applies the first A-D conversion value Qv1 to the register 10, the second A-D conversion value Qv2, to the register 11, the third A-D conversion value Bv1, to the register 12, and the fourth A-D conversion value Bv2, to the register 13, and upon termination of the sample-and-hold subsequent to the second time, also applies the first A-D conversion value Bv1 to the register 12, and the second A-D conversion value Bv2, to the register 13. Accordingly, the contents Qv1 and Qv2 of the registers 10 and 11 are not altered once set, unless integration is again effected by the operation of the light measuring button, etc. (not shown). The data output circuit 14 from which the APEX value Tvc of the integration time is output is connected to a calculation section A to be mentioned below.

It is to be noted that the circuit portion of the light measuring device of FIG. 17 so far described is generally similar to that in the circuit arrangement in FIG. 1, with like parts being designated by like reference numerals.

The calculation section A coupled to the registers 10 to 13 and data output circuit 14 is intended to calculate the light amounts Qvfm1 and Qvfm2 reflected from the object to be photographed to the respective light measuring portions of the light measuring circuits 1 and 2, owing to the light emission by the flash light emitting device FL based on the data from the registers 10 to 13 and the circuit 14, and is arranged to function upon completion of the data take-in to the registers 10, 11, 12 and 13, and upon termination of the calculations of the data Qvfm1 and Qvfm2, not to function unless the data in the registers 10 and 11 are altered, i.e. unless the integration function is effected by the operation of the light measuring button, etc. (not shown).

Figure 18:
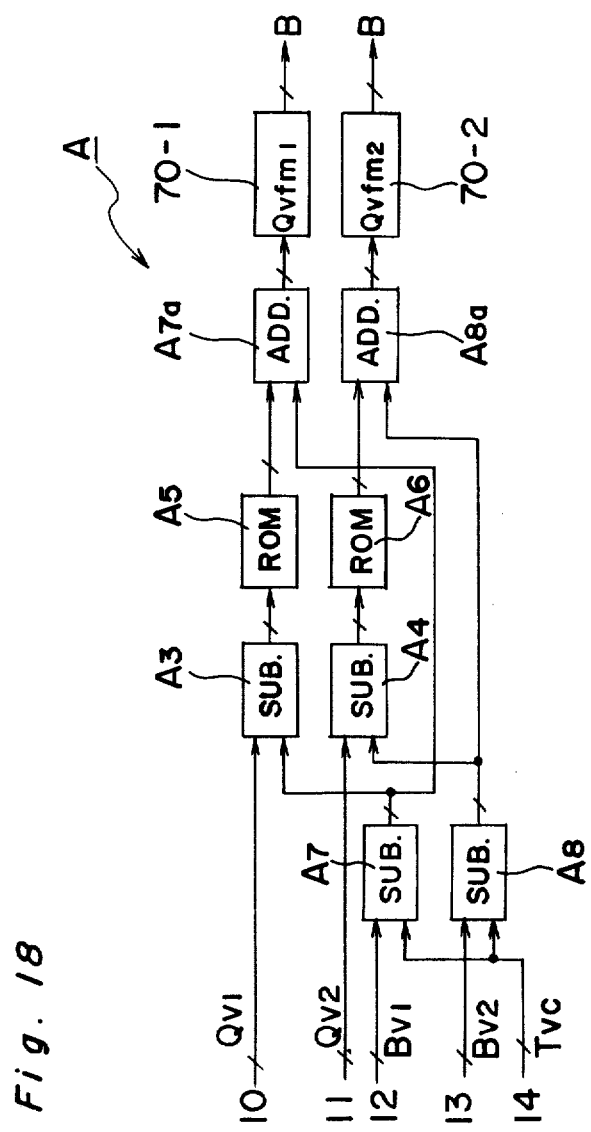
FIG. 18 is an electrical block diagram explanatory of the contents of calculation at a calculating section A employed in the circuit arrangement of FIG. 17.

Referring to the block diagram of FIG. 18 specifically showing the contents of calculation in the calculation section A, the calculation contents thereof will be described hereinbelow.

The subtraction circuits A7 and A8, the data Bv1 and Bv2 from the registers 12 and 13, and the data Tvc from the data output circuit 14 are applied so as to work out Bv1−Tvc and Bv2−Tvc, the data of which are respectively input to subtraction circuits A3 and A4 coupled to said circuits A7 and A8, and based on the data therefrom and the data Qv1 to Qv2 from the registers 10 and 11, following equations are worked out.

$$Qv1-(Bv1-Tvc)=\Delta 11 \quad (5\text{-}1)$$

$$Qv2-(Bv2-Tvc)=\Delta 12 \quad (5\text{-}2)$$

The data $\Delta 11$ and $\Delta 12$ thus obtained are applied to data converting ROM A5 and A6 connected to the subtraction circuits A3 and A4 so as to be converted into data for $\log_2(s^{\Delta 11}-1)$ and $\log_2(2^{\Delta 12}-1)$, and these data and the data from subtraction circuits A7 and A8 are applied to addition circuits A7a and A8a connected to the ROM A5 and A6 to work out the following equations.

$$(Bv1-Tvc)+\log_2(2^{\Delta 11}-1)=Qvfm1 \quad (6\text{-}1)$$

$$(Bv2-Tvc)+\log_2(2^{\Delta 12}-1)=Qvfm2 \quad (6\text{-}2)$$

and the data thus worked out are set in registers 70-1 and 70-2 coupled to the addition circuits A7a and A8a. The contents of these registers are not altered unless the integration function is effected again, since the calculation thereof is not performed so far as the integration is not effected again.

The process how the data Qvfm1 and Qvfm2 are worked out by the above equations 6-1 and 6-2 is described hereinbelow.

Upon elimination of Qv1 and Qv2 from the equations 4'-1 and 4'-2, and 5-1 and 5-2, the relations will be $$2^{Qvfm1}=2^{Bv1-Tvc}(2^{\Delta 11}-1)$$

$$2^{Qvfm2}=2^{Bv2-Tvc}(2^{\Delta 12}-1)$$

and by taking the logarithm of both sides of each of the equations to the base of two, the equations 6-1 and 6-2 are obtained.

In FIG. 17, circuit 23 for producing the data $\Delta f$ by which the light emission amount of the flash light emitting device FL during the photographing should be altered from the light emission amount upon light measuring, and a contrast data output circuit 73 for producing the data corresponding to the set contrast $\Delta cs$, are coupled to a calculation section B which works out the light amounts Qvf1 and Qvf2 reflected from the object to be photographed to the two light measuring portions following light emission by the flash light emitting device FL during the actual photographing and the exposure time Tvx necessary for obtaining the set contrast $\Delta cs$, on the basis of the data from the circuit 23, the contrast data output circuit 73, the data from the registers 70-1 and 70-2 provided in the calculation section A (FIG. 18), and the data from the registers 12 and 13.

Figure 19:
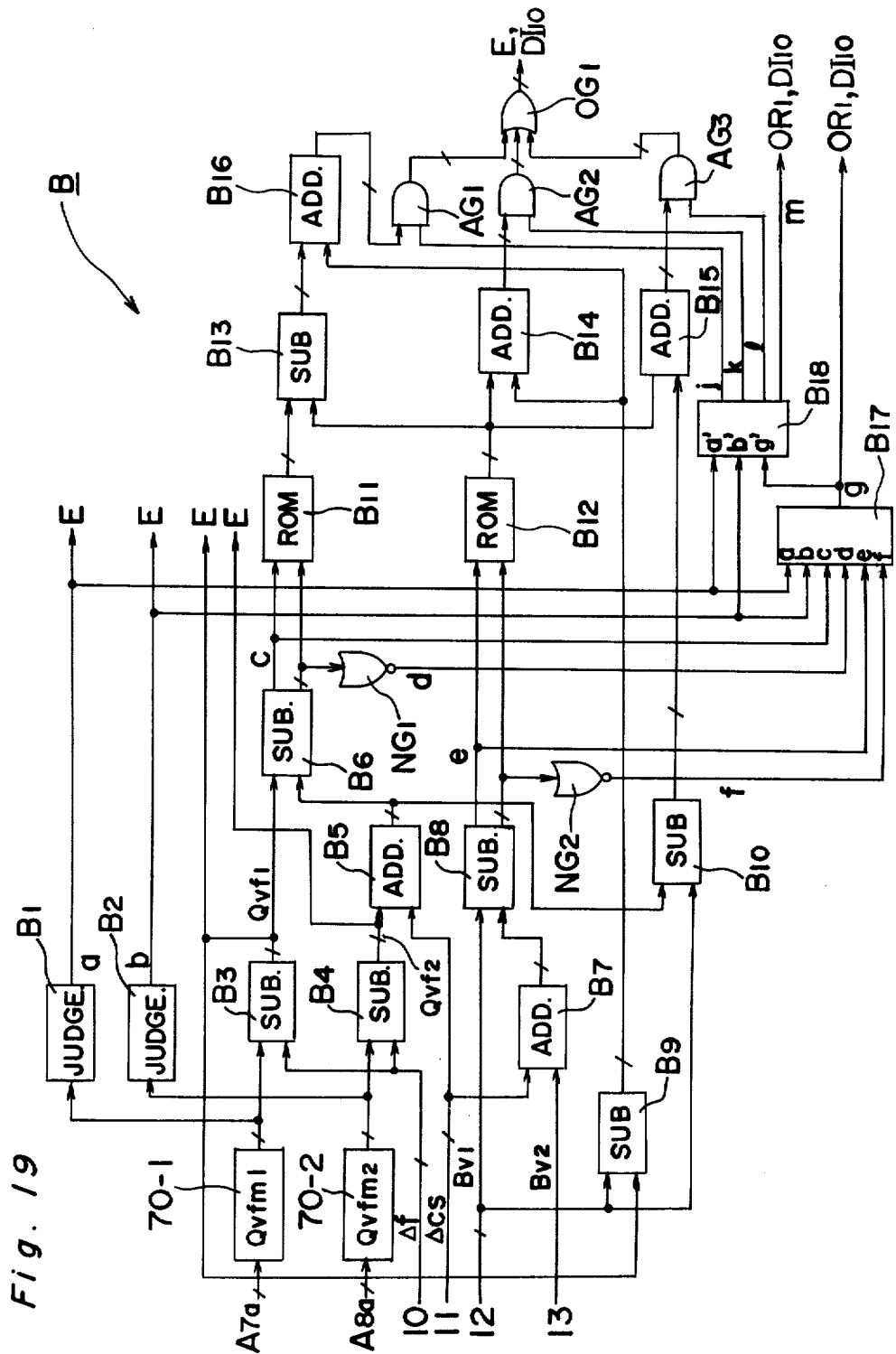
FIG. 19 is a diagram similar to FIG. 18, which particularly explains the contents of calculation at a calculating section B employed in the circuit arrangement of FIG. 17.

FIG. 19 shows a block diagram showing specific calculation contents of the calculation section B. Before the description with reference to FIG. 19 proceeds, calculations to be effected in this case will be explained hereinbelow based on formulas.

The equation (1-1) may be transformed as follows.

$$2^{Bv1-Tvx}+2^{Qvf1}=2^{Bv2+\Delta cs-Tvx}+2^{Qvf2+\Delta cs} \quad (20)$$

Upon consideration based on these equations, on the assumption that, when the relations are (i)

$$Bv1-(Bv2+\Delta cs)=\alpha>0 \quad (21)$$

$$Qvf2+\Delta cs-Qvf1=\beta>0 \quad (22)$$

$$2^{Qvt1}=2^{Bv1-Tvx}+2^{Qvf1} \quad (2\text{-}1)$$

$$2^{Qvt2}=2^{Bv2-Tvx}+2^{Qvf2} \quad (2\text{-}2)$$

there exist the data Tvx which satisfy the relations $$2^{Qvt1}=2^{Qvt2+\Delta cs}$$

Upon elimination of $Bv2+\Delta cs$ and $Qvf2+\Delta cs$ from the equations (20), (21) and (22), the relation will be $$2^{Bv1-Tvx}(1-2^{-\alpha})=2^{Qvf1}(2^{\beta}-1)$$

When the above equation is arranged by taking the logarithm of opposite sides thereof to the base of two, the relation will be represented by $$Tvx=Bv1+\log_2(1-2^{-\alpha})-Qvf1-\log_2(2^{\beta}-1) \quad (23)$$

and thus, the value Tvx is obtained.

(ii) On the assumption that $\alpha>0$ and $\beta>0$, the relation will be $2^{Qvt1}>2^{Qvt2+\Delta cs}$ irrespective of the value of Tvx, and therefore, the value Tvx is not obtained, and thus, it becomes impossible to take the photograph at the set contrast.

(iii) In the case where $\alpha<0$ and $\beta<0$, there exists the value Tvx which satisfies $2^{Qvt1}=2^{Qvt2+\Delta cs}$ in the similar manner as in the item (i). Therefore, upon elimination of $Bv2+\Delta cs$ and $Qvf2+\Delta cs$ from the equations (20), (21) and (22), the relation will be $$2^{Bv1-Tvx}(2^{-\alpha}-1)=2^{Qvf1}(1-2^{\beta})$$

and when the above equation is arranged by taking $\log_2$ at the opposite sides thereof, the relation as follows is established.

$$Tvx=Bv1+\log_2(2^{-\alpha}-1)-Qvf1-\log_2(1-2^{\beta}) \quad (24)$$

and thus, the value Tvx is obtained.

(iv) In the relation $\alpha<0$ and $\beta>0$, the relation necessarily becomes $2^{Qvt1}<2^{Qvt2+\Delta cs}$, in the similar manner as in the item (ii), and the value Tvx can not be obtained.

(v) In the case where $\alpha=0$, the relation becomes $2^{Qvt1}<2^{Qvt2+\Delta cs}$ or $2^{Qvt1}>2^{Qvt2+\Delta cs}$ in the similar manner as in the items (ii) and (iv) according to the value of $\beta$ and irrespective to the value Tvx, and the value Tvx is not obtained.

(vi) If the relation is $\beta=0$, the value Tvx is not similarly obtained.

(vii) When the relation is $\alpha>0$, with the reflected light amount due to the flash light emitting device being $2^{Qvf1}=0$, the equation (20) will be $$2^{Bv1-Tvx}=2^{Bv2+\Delta cs-Tvx}+2^{Qvf2+\Delta cs} \quad (20\text{-}1)$$

Upon elimination of $Bv2+\Delta cs$ from the equations (20-1) and (21), the relation will be represented by $$2^{Bv1-Tvx}(1-2^{-\alpha})=2^{Qvf2+\Delta cs}$$

and when the above equation is arranged by taking $\log_2$ at both sides thereof, the relation will be $$Tvx=Bv1+\log_2(1-2^{-\alpha})-(Qvf2+\Delta cs) \quad (25)$$

and thus, the value Tvx is obtained.

(viii) In the case where $\alpha<0$ at $2^{Qvf1}=0$, the relation is always $2^{Bv1-Tvx}<2^{Qvf2+\Delta cs}$, and the value Tvx can not be obtained.

(ix) When the relation is $\alpha<0$ at $2^{Qvf2}=0$, the equation (20) will be $$2^{Bv1-Tvx}+2^{Qvf1}=2^{Bv2+\Delta cs-Tvx} \qquad (20\text{-}2)$$

and upon arrangement of the above equation by eliminating Bv2+Δcs with the employment of the equations (21) and (20-2), the relation will be $$Tvx=Bv1+\log_2(2^{-\alpha}-1)-Qvf1 \qquad (26)$$

and thus, the value Tvx is obtained.

(x) In the case where $\alpha>0$ at $2^{Qvf2}=0$, the relation will be $2^{Qvf1}>2^{Bv2+\Delta cs-Tvx}$ at all times, and the value Tvx can not be obtained.

(xi) In the relation where $2^{Qvf1}=2^{Qvf2}=0$, the photographing is to be effected based only on the ambient light (i.e. although the flash light emitting device is fired, the flash light emitted therefrom does not actually reach the object to be photographed due to a large distance therebetween), and thus, it is impossible to control the contrast and consequently, to obtain the value Tvx.

As is seen from the above, there are cases where the value Tvx is obtained as in the above items (i), (iii), (vii) and (ix), and cases where the value Tvx can not be obtained as in the above items (ii), (iv), (v), (vi), (viii), (x) and (xi). Therefore, in the first place, in judging circuits B1 and B2 (FIG. 19) coupled to the registers 70-1 and 70-2 of FIG. 18, it is judged whether or not the output data of the registers 70-1 and 70-2 correspond to $-\infty$, i.e. whether or not the output data are below predetermined values, and if they are below the predetermined values, the terminals a and b thereof are rendered to be "High". Meanwhile, in subtraction circuits B3 and B4 also coupled to the registers 70-1 and 70-2, based on the data from said registers 70-1 and 70-2, and the data from the data output circuit 23 (FIG. 17), the following equations are worked out.

$$\text{Qvfm1}-\Delta f=\text{Qvf1} \qquad (7\text{-}1)$$

$$\text{Qvfm2}-\Delta f=\text{Qvf2} \qquad (7\text{-}2)$$

In an addition circuit B5 connected to the subtraction circuit B4, the value Qvf2+Δcs (where Δcs is the data from the contrast data output circuit 73) is worked out so as to calculate the following equation at a subtraction circuit B6 coupled to the circuit B5

$$(\text{Qvf2}+\Delta cs)-\text{Qvf1}=\beta \qquad (22)$$

The subtraction circuit B6 is arranged to render its terminal C "Low" at the relation $\beta<0$, and to render said terminal C "High" at the relation $\beta>0$, and to further develop the data for $|\beta|$. On the other hand, in an addition circuit B7 coupled to the circuit 13, the value Bv2+Δcs is calculated so as to work out the following equation in a subtraction circuit B8 connected to said addition circuit B7.

$$Bv1-(Bv2+\Delta cs)=\alpha \qquad (21)$$

The subtraction circuit B8 renders its terminal e "High" at the relation $\alpha>0$, and "Low" at the relation $\alpha<0$, and further produces the data for $|\alpha|$.

NOR circuits NG1 and NG2 respectively coupled to the subtraction circuits B6 and B8 are circuits for detecting that the values $|\alpha|$ and $|\beta|$ are 0, and in the relation $|\alpha|=0$, the output terminal f of the NOR circuit NG2 develops the "High" signal, while in the relation $|\beta|=0$, the output terminal d of the NOR circuit NG1 produces the "High" signal.

Based on the signals of the terminals a to f described above, judgement is made at a judging circuit B17 to be described later with respect to the cases (i) to (x) stated earlier.

The relation between the inputs and outputs of the judging circuit B17 is shown in Table 4 below, in which the symbol $\phi$ shows that both 0 and 1 will do. Accordingly, in the case where the value Tvx can not be obtained, the output terminal g of the judging circuit B17 is rendered to be "High", and the relation between the terminal g and terminals a to f will be represented by a logic formula as follows.

$$g=\bar{a}\cdot\bar{b}(c\oplus e)+a\cdot\bar{b}\cdot\bar{e}+\bar{a}\cdot b\cdot e+f+d$$

Figure 20:
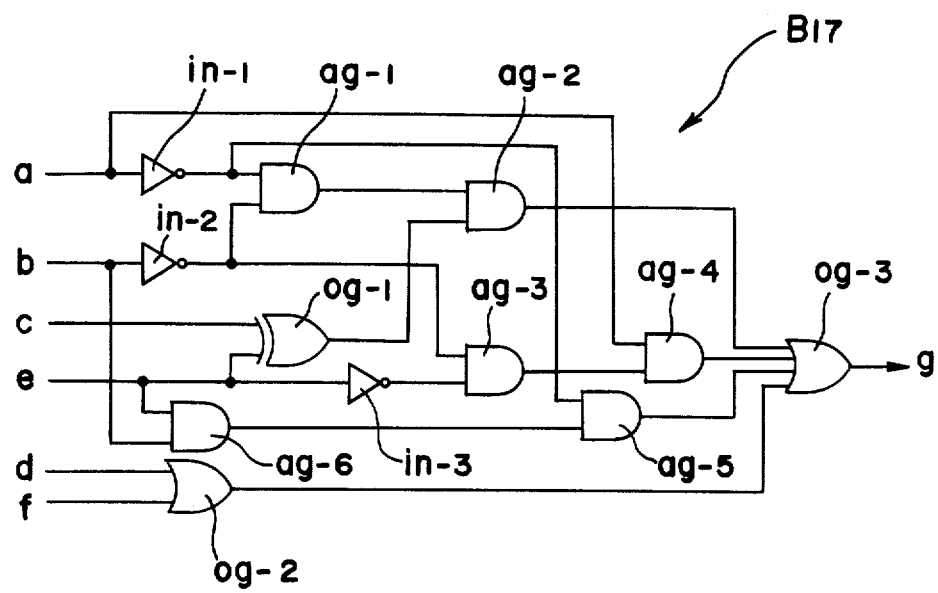
FIG. 20 is an electrical block diagram showing a specific example of a logic circuit B17 which may be employed in the circuit arrangement of FIG. 19.

A specific example of the circuit arrangement for the judging circuit B17 is shown in FIG. 20.

Figure 21:
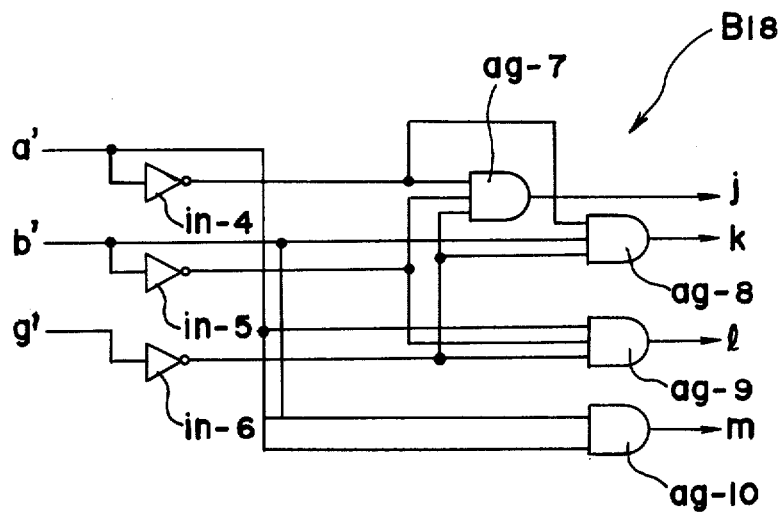
FIG. 21 is a diagram similar to FIG. 20, particularly showing a specific example of a logic circuit B18 which may be employed in the circuit arrangement of FIG. 19.

More specifically, in FIG. 20, the judging circuit B17 includes, for example inverters in-1, in-2 and in-3, AND gates ag-1, ag-2, ag-3, ag-4, ag-5 and ag-6, and OR gates og-1, og-2 and og-3 respectively coupled to the input terminals a to f which are connected to the judging circuits B1 and B2, subtraction circuit B6, NOR gate NG1, subtraction circuit B8 and NOR gate NG2 (FIG. 19). The output terminal g of the OR gate og-3 is connected to a corresponding terminal g' of a judging circuit B18 whose input terminals a' and b' are respectively connected to the judging circuits B1 and B2 and the corresponding terminals a and b of the circuit B17. The output terminals j, k and l of the circuit B18 are respectively coupled to AND gates AG1, AG2 and AG3 which are connected to an OR circuit OG1 (FIG. 19), while the output terminal m thereof is coupled to an OR gate OR1 (FIG. 17). For example, the circuit B18 includes inverters in-4, in-5, and in-6 connected to the terminals a', b' and g' and coupled to AND gates ag-7, ag-8, ag-9 and ag-10 which are respectively connected to the output terminals j, k, l and m as shown in FIG. 21.

TABLE 4

|       | a | b | c | d | e | f | g |
|-------|---|---|---|---|---|---|---|
| (i)   | 0 | 0 | 1 | φ | 1 | φ | 0 |
| (ii)  | 0 | 0 | 0 | φ | 1 | φ | 1 |
| (iii) | 0 | 0 | 0 | φ | 0 | φ | 0 |
| (iv)  | 0 | 0 | 1 | φ | 0 | φ | 1 |
| (v)   | φ | φ | φ | φ | φ | 1 | 1 |
| (vi)  | φ | φ | φ | 1 | φ | φ | 1 |
| (vii) | 1 | 0 | φ | φ | 1 | φ | 0 |
| (viii)| 1 | 0 | φ | φ | 0 | φ | 1 |
| (ix)  | 0 | 1 | φ | φ | 0 | φ | 0 |
| (x)   | 0 | 1 | φ | φ | 1 | φ | 1 |

In FIG. 19, ROM B11 coupled between the subtraction circuits B6 and B13 outputs data corresponding to $\log_2(2^\beta-1)$ in the relation $\beta>0$, and data corresponding to $\log_2(1-2^\beta)$ in the relation $\beta<0$, based on the data from the subtraction circuit B6. Meanwhile, ROM B12 connected between the subtraction circuit B8 and an addition circuit B14 produces data corresponding to $\log_2(1-2^{-\alpha})$ in relation $\alpha > 0$, and also data corresponding to $\log_2(2^{-\alpha}-1)$ in the relation $\alpha < 0$, based on the data from the subtraction circuit B8.

In the case of the item (i) earlier described, since the relations are $\alpha > 0$ and $\beta > 0$, the data corresponding to $\log_2(2^\beta-1)$ and $\log_2(1-2^{-\alpha})$ are respectively produced from the ROM B11 and B12, and these two data are applied to the subtraction circuit B13 for working out $\log_2(1-2^{-\alpha})-\log_2(2^\beta-1)$, and the resultant data and the data Bv1−Qvf1 from a subtraction circuit B9 are applied to an addition circuit B16 coupled to the subtraction circuit 13 for working out the equation as follows.

$$Tvx = Bv1 + \log_2(1-2^{-\alpha}) - Qvf1 - \log_2(2^\beta-1) \qquad (23)$$

In the above case, since all the terminals a', b' and g' are of "Low", the terminal j of the circuit B18 coupled to the judging circuits B1 and B2 and the judging circuit B17 is rendered to be "High" so as to open the AND gate AG1, and thus, the data Tvx from the addition circuit B16 are output through an OR gate OG1 (FIGS. 19 and 21).

In the case of the item (iii) earlier referred to, since the relations are $\alpha < 0$ and $\beta < 0$, the data corresponding to $\log_2(1-2^\beta)$ and $\log_2(2^{-\alpha}-1)$ are respectively produced from the ROM B11 and B12, and subsequently, in the similar manner as in the item (i), the data from the addition circuit B16 represented by $$Tvx = Bv1 + \log_2(2^{-\alpha}-1) - Qvf1 - \log_2(1-2^\beta) \qquad (24)$$

are produced through the AND gate AG1 and OR gate OG1 (FIG. 19).

In the case of the item (vii), the relation is $\alpha > 0$, and the data for $\log_2(1-2^{-\alpha})$ are produced from the ROM B12, and the above data and the data Bv1−(Qvf2+Δcs) from a subtraction circuit B10 coupled to the circuits B5, B6, B8 and B9 are applied to the addition circuit B15 so as to work out the equation as follows.

$$Tvx = Bv1 + \log_2(1-2^{-\alpha}) - (Qvf2+\Delta cs) \qquad (25)$$

In this case, since the relation is $2^{Qvf1}=0$, the terminal a' is of "High", while the terminals b' and g' are of "Low". Accordingly, as shown in FIG. 21, the terminal l of the circuit B18 is rendered to be "High", with an AND gate AG3 opened, and the data from the addition circuit B15 are output through the OR gate OG1 (FIG. 19).

On the other hand, in the case of the item (ix), since the relation is $\alpha < 0$, data for $\log_2(2^{-\alpha}-1)$ are produced from the ROM B12, and these data and the data for Bv1-Qvf1 from the subtraction circuit B9 are applied to the addition circuit B14 to work out the following equation $$Tvx = Bv1 + \log_2(2^{-\alpha}-1) - Qvf1 \qquad (26)$$

In the above case, since the relation is $2^{Qvf2}=0$, the terminal b' is of "High", and the terminals a' and g' are of "Low". Accordingly, as is seen from FIG. 21, the terminal k of the circuit B18 is rendered to be "High", with the AND gate AG2 opened, and the data from the addition circuit B14 are developed from the OR gate OG1.

Meanwhile, in the case of the item (xi), since the relation is $2^{Qvf1}=2^{Qvf2}=0$, the state is equivalent to the photographing only by the ambient light, and in this case, both of the terminals a' and b' become high, and consequently, the terminal m of the circuit B18 is rendered to be "High" as is seen from FIG. 21.

Referring back to FIG. 17, when the terminals g' and m are of "High", the output of the OR circuit OR1 becomes "High", and this signal is fed to a circuit E for working out Qvt1 and Qvt2, to a circuit F for working out the average value $\overline{Qvt}$, and to a circuit G for working out the aperture value which are to be described later, to render these circuits inoperative. Meanwhile, in the case where the terminal g' is "High", it is warned by the display device DI that the value Tvx can not be obtained. Furthermore, in the case where the terminal m is of "High", warning is given for indicating that the photographing is based only on the ambient light.

In FIG. 17, the calculation circuit E for calculating the light amounts $2^{Qvt1}$ and $2^{Qvt2}$ in the respective portions contributing to the exposure during the photographing, is coupled to the circuits 12 and 13, circuit section A and circuit section B. Specific contents of the calculation of the above circuit E are shown in a block diagram of FIG. 22. In the first place, at subtraction circuits E1 and E2, calculations for Bv1−Tvs and Bv2−Tvx are effected, with subsequent calculations of the following equations in subtraction circuits E3 and E4 which are connected to the circuits E1 and E2 and the circuit section B, and in turn to ROM E5 and E6.

$$(Bv1-Tvx)-Qvf1 = \Delta 11 \qquad (8-3)$$

$$(Bv2-Tvx)-Qvf2 = \Delta 12 \qquad (8-4)$$

The resultant data are converted into data for $\log_2(2^{\Delta 11}+1)$ and $\log_2(2^{\Delta 12}+1)$ by the ROM E5 and E6, and the data thus obtained and the data for Qvf1 and Qvf2 are applied to the addition circuits E7 and E8 coupled to said ROM E5 and E6 so as to work out the following equations.

$$Qvt1 = Qvf1 + \log_2(2^{\Delta 11}+1) \qquad (9-3)$$

$$Qvt2 = Qvf2 + \log_2(2^{\Delta 12}+1) \qquad (9-4)$$

The process how the data for Qvt1 and Qvt2 are worked out by the above equations (9-3) and (9-4) is such that, upon elimination of (Bv1−Tvx) and (Bv2−Tvx) by the use of the equations (2-1), (2-2), (8-3) and (8-4), the relations will be represented by $$2^{Qvt1} = 2^{Qvf1} \cdot (2^{\Delta 11}+1)$$

$$2^{Qvt2} = 2^{Qvf2} \cdot (2^{\Delta 12}+1)$$

and when $\log_2$ in the both sides are taken, the equations (9-3) and (9-4) are obtained.

Figure 22:
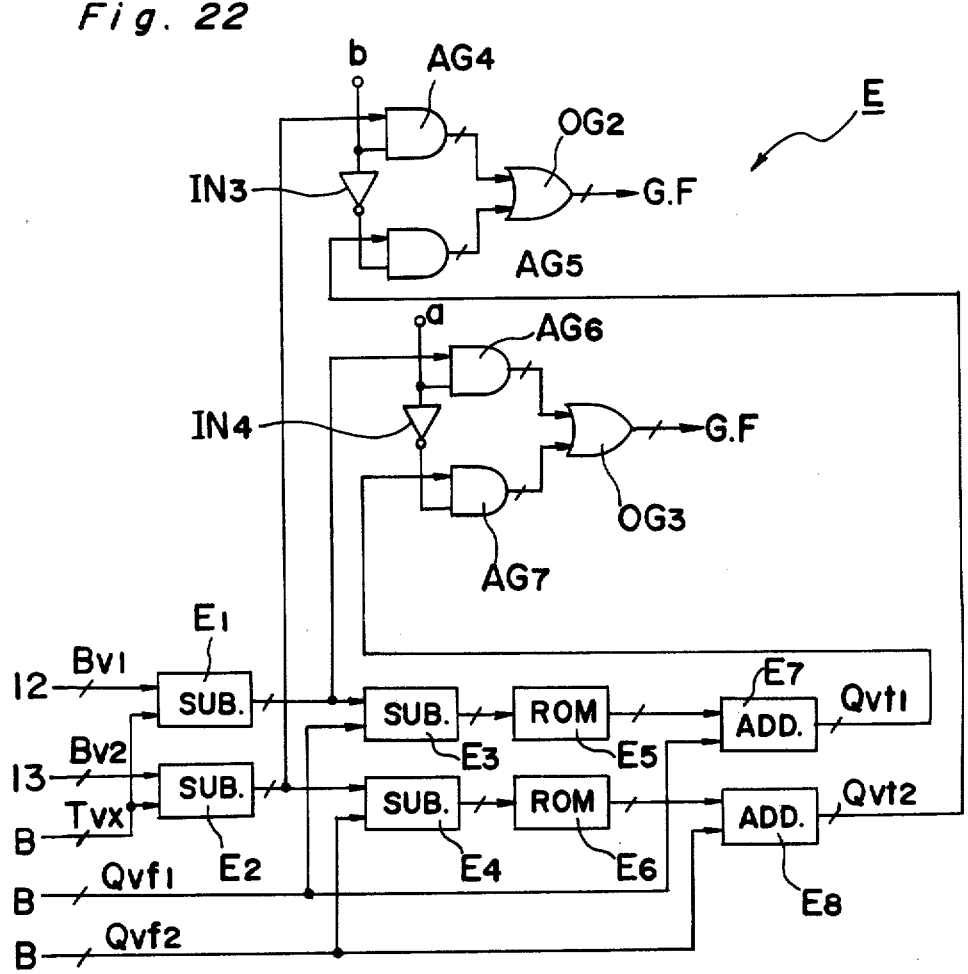
FIG. 22 is an electrical block diagram explaining the contents of calculation at a calculating section E employed in the circuit arrangement of FIG. 17, FIGS. 23, 24 and 25 are electrical block diagrams explaining the contents of calculations at a calculating section F employed in the circuit arrangement of FIG. 17.

In FIG. 22, the subtraction circuits E1 and E3 are connected to an AND gate AG6, and the addition circuit E7 is connected to an AND gate AG7, while the AND gates AG6 and AG7 coupled to each other through an inverter IN4 are further connected to an OR gate OG3. Similarly, the subtraction circuits E2 and E4 are connected to an AND gate AG4, and the addition circuit E8 is connected to an AND gate AG5, while the AND gates AG4 and AG5 coupled to each other through an inverter IN3 are further connected to an OR gate OG2.

When the terminal a is of "Low", i.e. in the case where the relation is $2^{Qvf1} \neq 0$, the AND gate AG7 is opened, with the AND gate AG6 closed, and the data Qvt1 from the addition circuit E7 are output from the OR gate OG3, while, when the terminal a is of "High", since the relation is $2^{Qv1}=0$, the data Bv1-Tvx from the subtraction circuit E1 is produced from the OR gate OG3. Similarly, when the terminal b is of "High", the data Qvt2 are produced from the OR gate OG2, and if said terminal b is of "Low", the data for Bv2-Tvx are developed from the OR gate OG2.

Figure 24:
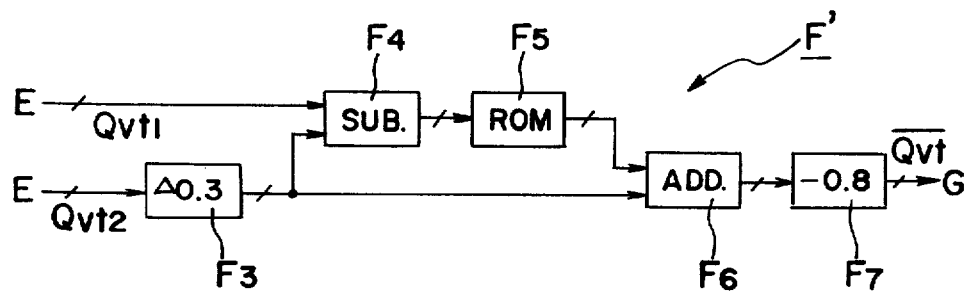
Figure 25:
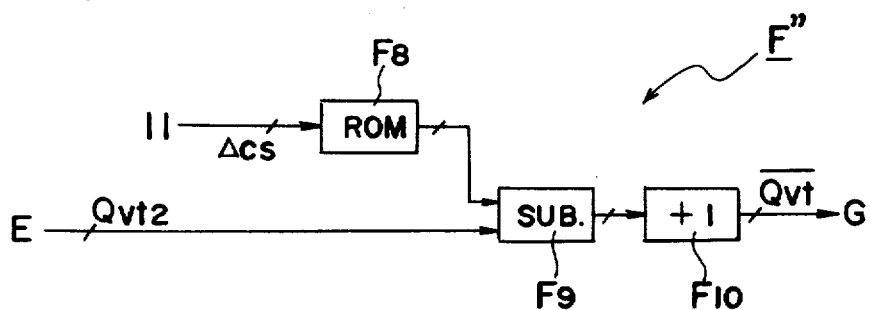

Subsequently, a calculation circuit F for working out the average value $\overline{Qvt}$ based on the data Qvt1 and Qvt2 is coupled to the calculation circuit E. The specific contents of calculation of the calculation circuit F are shown in FIGS. 23, 24 and 25.

Figure 23:
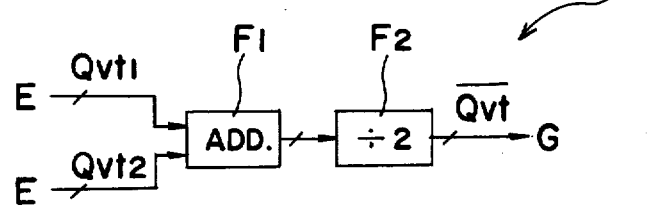

FIG. 23 shows the circuit arrangement for working out the geometrical average (or density average) in the relation of $$2^{\overline{Qvt}} = \sqrt{2^{Qvt1} \cdot 2^{Qvt2}}$$

and upon taking log$_2$ at opposite sides $$\overline{Qvt} = \tfrac{1}{2}(Qvt1+Qvt2)$$

and such calculations are effected by an addition circuit F1 and a division circuit F2 which are coupled to each other.

FIG. 24 illustrates the circuit arrangement F' for obtaining the weighted average.

In this case, the relation is represented by $$2^{\overline{Qvt}} + (2^{Qvt1}+0.8\times 2^{Qvt2})/(1+0.8)$$

and upon utilization of $\log_2 0.8 = -0.3$ and $\log_2 1.8 = 0.8$, the relation will be $$2^{\overline{Qvt}} = (2^{Qvt1}+2^{Qvt2-0.3}) \cdot 2^{-0.8}$$

In the above case, on the assumption that $$Qvt1-(Qvt2-0.3)=\Delta 2$$

the relation will be shown by $$2^{\overline{Qvt}} = 2^{Qvt2-0.3}(2^{\Delta 2}+1) \cdot 2^{-0.8}$$

and thus, the average is obtained as follows.

$$\overline{Qvt}=(Qvt2-0.3)+\log_2(2^{\Delta 2}+1)-0.8$$

Therefore, in the circuit arrangement F' of FIG. 24, the calculation for Qvt2−0.3 is first effected by a subtraction circuit F3, and then, the data for Qvt1−(Qvt2−0.3)=Δ2 is obtained in a subtraction circuit F4 coupled to the circuit F3, and the resultant data are converted into data for $\log_2(2^{\Delta 2}+1)$ by a ROM F5 connected to the circuit F4, and then, by the above data and the data from the subtraction circuit F3, data for $(Qvt2-0.3)+\log_2(2^{\Delta 2}+1)$ are calculated by an addition circuit F6 connected to the circuit F3 and ROM F5, while in a subtraction circuit F7 further connected to the addition circuit F6, by subtracting 0.8 from the output of the addition circuit F6, the weighted average is obtained.

$$\overline{Qvt}=(Qvt2-0.3)+\log_2(2^{\Delta 2}+1)-0.8$$

On the other hand, FIG. 25 shows the circuit arrangement F''' for obtaining the harmonic average. In this case, the relation is such that $$2^{\overline{Qvt}}=2/(\tfrac{1}{2}^{Qvt1}+\tfrac{1}{2}^{Qvt2})$$

and, since Qvt1−Qvt2=Δcs, the above equation may be transformed into $$2^{\overline{Qvt}}=2/2^{-Qvt2}(2^{\Delta cs}+1)$$

and upon taking log$_2$ at the both sides, the average value is obtained as follows.

$$\overline{Qvt}=1+Qvt2-\log_2(2^{\Delta cs}+1)$$

Therefore, the data Δcs from the contrast data output circuit 73 (FIG. 17) is converted into data for $\log_2(2^{\Delta cs}+1)$ by a ROM F8, and based on the data thus obtained and the data Qvt2, calculation for data $Qvt2-\log_2(2^{\Delta cs}+1)$ is effected in a subtraction circuit F9 coupled to the ROM F8, and by adding "1" to the above data at an addition circuit F10 connected to the circuit F9, the resultant average is worked out as follows.

$$\overline{Qvt}=Qvt2-\log_2(2^{\Delta cs}+1)+1$$

Figure 26:
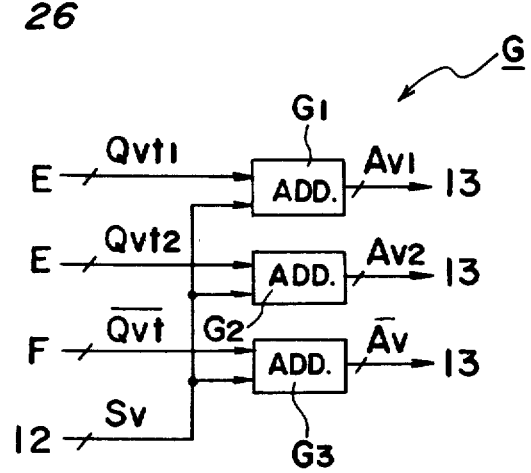
FIG. 26 is a diagram similar to FIGS. 23 to 25 which particularly shows the contents of calculation at a calculating section G employed in the circuit arrangement of FIG. 17.

In FIG. 17, a film speed output circuit 49 for producing the data for set film speed Sv is coupled to a calculation circuit G for working out aperture values Av1, Av2 and $\overline{Av}$ for achieving optimum exposures at respective portions, based on the data Sv from the film speed output circuit 49 and the data for Qvt1, Qvt2 and $\overline{Qvt}$. The specific circuit arrangement of the circuit G is shown in FIG. 26, in which respective equations as follows are adapted to be worked out by addition circuits G1, G2 and G3.

$$Qvt1+Sv=Av1 \tag{15-1}$$

$$Qvt2+Sv=Av2 \tag{15-2}$$

$$\overline{Qvt}+Sv=Av3 \tag{15-3}$$

Still referring to FIG. 17, a display device DI1 for displaying aperture values and exposure time based on the data for Av1, Av2, Av3 and Tvx, is coupled to the calculation circuits B and G. In the display device DI1, if the terminals g' and m for the circuit section B are of "High", the aperture values and exposure time are not displayed, and the warning indicating that the exposure time is unavailable, or indicating that the photographing is based only on the ambient light, is given.

It is to be noted here that, in the case where the exposure time Tvx can not be obtained, the arrangement may, for example, be so made as to work out the contrast at a predetermined exposure time for indication. Furthermore, when the worked out exposure time Tvx exceeds the display limits, it may be so arranged that the contrast at the limit exposure time is calculated for display, or that a data corresponding to the light amount emitted from the flash light emitting device which can provide the set contrast at the limit exposure time is calculated for display.

It should also be noted that the light measuring portions of the light measuring circuits 1 and 2 may be located at any positions so far as they are located in two spots in the scene to be photographed, and there may be conceived, for example, an arrangement in which one light measuring portion measures the average of the entire scene, while the other light measuring portion measures the central portion of the scene to be photographed.

Figure 27:
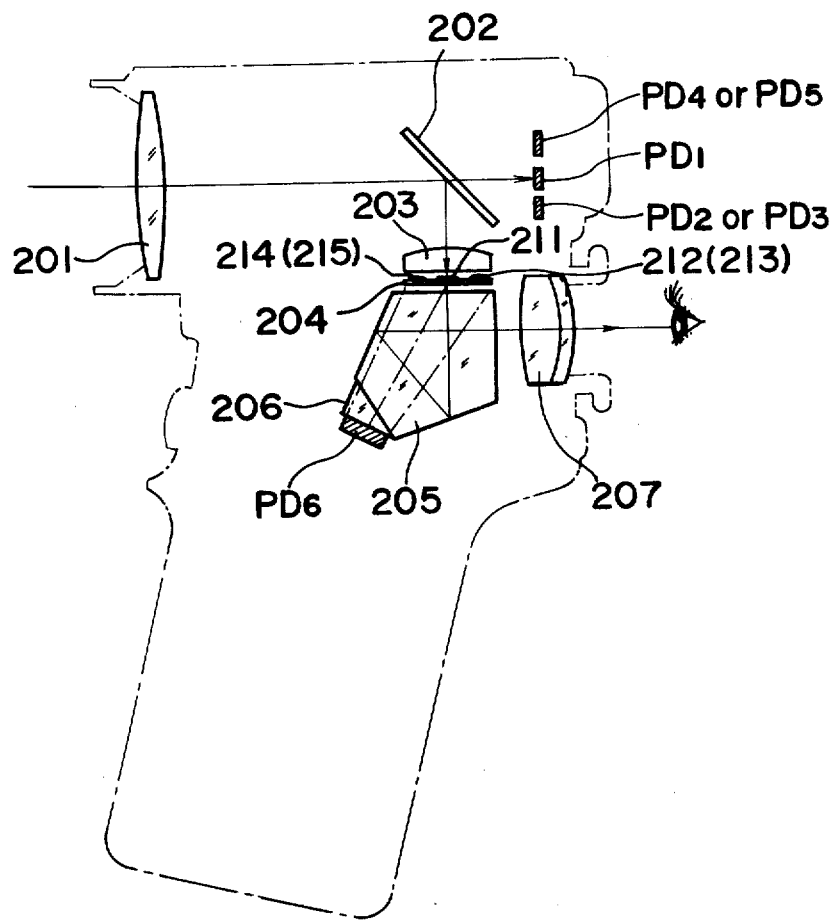
FIG. 27 is a view similar to FIG. 5, which particularly relates to the second embodiment of FIG. 17.
Figure 28:
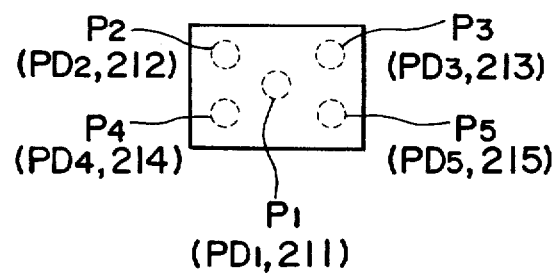
FIG. 28 is a schematic top plan view illustrating light receiving portions of respective photoelectric elements employed in the light measuring meter of FIG. 27.

Reference is made to FIG. 27 schematically showing an optical arrangement for applying the second embodiment of the present invention described so far to a light measuring instrument, and also to FIG. 28 illustrating the light measuring portion in this case in the similar manner as in FIGS. 5 and 6 for the first embodiment. The optical system of FIG. 27 includes the objective lens 201, the half-mirror 202 for dividing light so disposed in the optical axis of the lens 201 as to lead one portion of the divided light towards the photoelectric elements PD1 to PD5 and the other portion thereof towards the finder system through the condenser lens 203, the focusing screen 204, the pentagonal roof prism 205, having an optical member 206 applied to its lower portion and a photoelectric element PD6 for average light measurement further applied onto the optical member 206, and the eye piece 207, while index marks 211, 212, 213, 214 and 215 are provided on the focusing screen 204 for informing an observer of light measuring portions P1, P2, P3, P4 and P5 (FIG. 28).

In the case of the light measuring instrument having a plurality of photoelectric elements as described above, when the operator carries out the light measurement by setting the contrast and the two portions, the data for Bv1 to Bv6 and Qvf1 to Qvf6 are obtained, while the exposure time Tvx as will render the contrast of the two portions to be the set value $\Delta cs$ is available, and further, the respective aperture values Av1 to Av6 which render each portion to be of optimum exposure can be also worked out.

Figure 29:
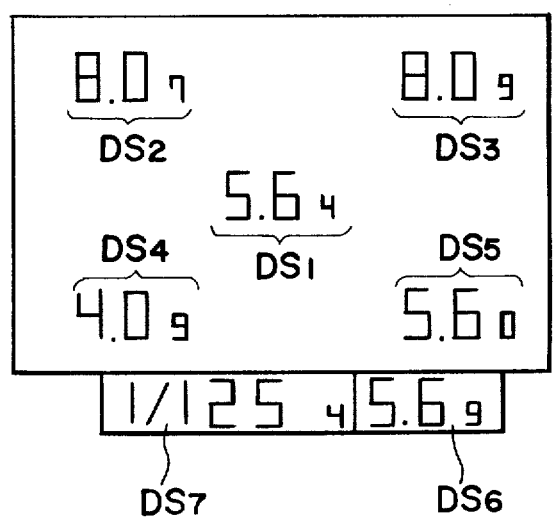
FIG. 29 is a fragmentary side elevational view showing, on an enlarged scale, a display mode in the light measuring meter of FIG. 27.

FIG. 29 shows one example of the display mode in the above case, in which the calculated exposure time Tvx is displayed at a display portion DS7, the aperture value Av1 which makes the portion of the photoelectric element P1 optimum is indicated at a display portion DS1, the aperture value Av2 for making the portion of the element P2 optimum, at a display portion DS2, the aperture value Av3 for making the portion of the element P3 optimum, at a display portion DS3, the aperture value Av4 for making the portion of the element 4 optimum, at a display portion DS4, and the aperture value Av5 for making the portion of the element P5 optimum, at a display portion DS5, while the aperture value Av6 which achieves an averaged optimum exposure for the whole scene to be photographed is indicated at the display portion DS6. It is to be noted that the small sized number after each of the indicated values in FIG. 29 is intended to give an indication in the unit of 0.1Ev, and for example, if Av=5.4, the F number 5.6, and 0.4 are displayed.

It should also be noted here that, in the embodiment of FIG. 17, if it is so arranged that the calculating sections B, E, F and G carry out calculations every time the fresh data Bv1 and Bv2 are taken-in, the calculated values may be adapted to be altered so as to follow any variations of the ambient light even when the ambient light is varying.

It is to be further noted that the switches S1, S2 and S3 may be constituted by analog switches, and that, in the foregoing embodiments, although controllers for controlling the functioning of the switches, timing of the sample-and-hold operation, and functionings of the multiplexer, de-multiplexer, A-D converter, calculating sections, display sections, etc. are omitted for brevity, formation of such controllers for effecting the above functionings as literally described so far is apparent to those skilled in the art, and in actual products, microcomputers may be employed for the controllers.

Meanwhile, for applying the light measuring device of the present invention to a photographic camera, it may be so arranged that the light amount contributing to the exposure at each portion by the flash light emitting device is calculated based on the distance signal at each portion and guide number of the flash light emitting device, with brightness at each portion being also measured, while the exposure time and aperture value are further worked out based on the set contrast and set signal of the two portions, so that the flash light photographing is effected by controlling the aperture value and shutter speed on the basis of the above signal. The light amount contributing to the exposure by the flash light emitting device may also be obtained by a preliminary flash light emission. As is clear from the foregoing description, according to the present invention, since it is so arranged that the exposure time necessary for obtaining the set contrast is worked out, photographing through quantitative control of contrast, which is conventionally considered to be impossible has been made possible.

THIRD EMBODIMENT

The fundamental concept of a third embodiment according to the present invention is such that, when the brightness at two portions are respectively denoted by $2^{Bv1}$ and $2^{Bv2}$, and reflected light amounts from the two portions during the measurement are represented by $2^{Qvfm1}$ and $2^{Qvfm2}$, with exposure time being denoted by $2^{-Tvs}$, for controlling the contrast between the two portions to $\Delta cs$, it may be so arranged that, the value $\Delta fx$ satisfying the equation $$(2^{Bv1-Tvs}+2^{Qvfm1+\Delta fx})/(2^{Bv2-Tvs}+2^{Qvfm2+\Delta fx})=2^{\Delta cs} \qquad (1\text{-}2)$$

is obtained, while the auxiliary light source is fired, with the light emitting amount thereof during photographing being varied by $2^{\Delta fx}$ as compared with the light emitting amount during measurement, and thus, the contrast for the two portions reproduced on the photosensitive member is controlled to $\Delta cs$.

Figure 30:
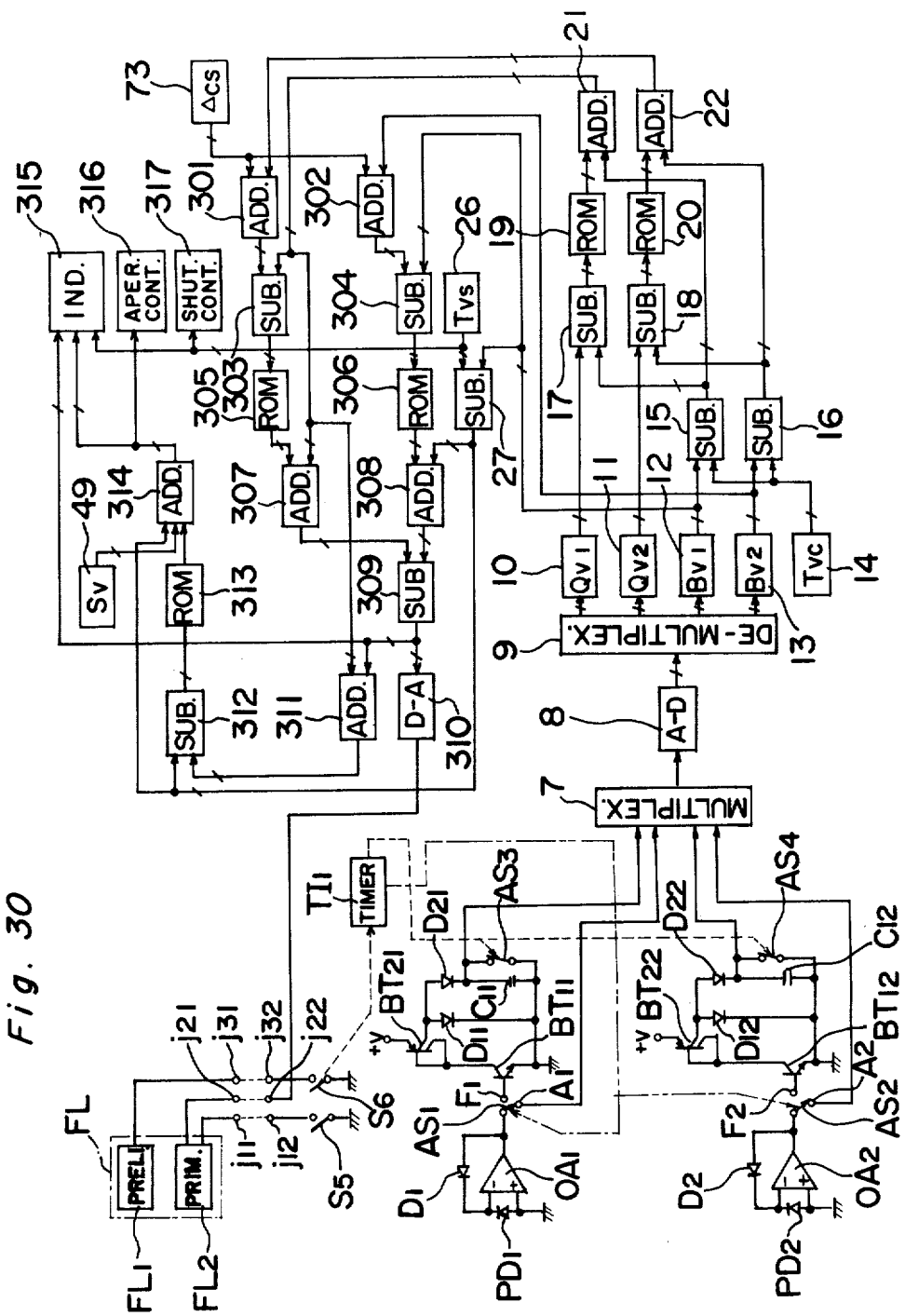
FIG. 30 is a block diagram similar to FIG. 1, which particularly shows a third embodiment thereof.

Reference is made to FIG. 30 showing an electrical block diagram of a light measuring device according to the third embodiment of the present invention, in which signal lines marked with dashes show that digital signals of a plurality of bits are dealt with, while similar parts to those in the circuit arrangement of FIG. 9 are designated by like symbols, with detailed description of the connections thereof being abbreviated here for brevity.

The circuit of FIG. 30 generally includes the photoelectric elements PD1 and PD2 respectively measuring different portions in a scene to be photographed, diodes D1 and D2 for logarithmic compression, operational amplifiers OA1 and OA2, logarithmic expansion transistors BT11 and BT12, current-mirror transistors BT21 and BT22, known logarithmic compression integration circuits respectively composed of the diodes D11 and D21 and capacitor C11, and the diodes D12 and D22 and capacitor C12, the flash light emitting device FL for the auxiliary light source, and a light emitting portion FL1 for preliminary light emitting purpose.

The preliminary light emitting portion FL1 as described above is arranged to be fired upon receipt of a closing signal of a switch S6 at the side of a photographic camera (not shown) through terminals j32 and j31. The above switch S6 is adapted to be closed according to the depression of a light measuring button or by a shutter release signal (not shown). The flash light emitting device FL further includes a primary flash light emitting portion FL2 which is arranged to be fired upon receipt of a closing signal of a switch S5 at the side of the photographic camera. The above switch S5 is a synchronous switch which is closed at a fully opened state of a shutter (not shown). The light emitting amount of the primary light emitting portion FL2 is arranged to be larger than the light emitting amount of the preliminary light emitting portion FL1 by the value $\Delta fx$ to be input through the terminals j32 and j31. It is to be noted here that, since the relation is $\Delta fx \geq 0$, the light emitting amount of the preliminary light emitting portion FL1 is equivalent to the minimum light emitting amount of the primary light emitting portion FL2.

Upon closure of the switch S6, the preliminary light emitting portion FL1 starts emitting light, with simultaneous functioning of a timer TI1 associated therewith, and switches AS1 and AS2 inserted respectively between the amplifier OA1 and transistor BT11 and between the amplifier OA2 and transistor BT12, are connected to terminals F1 and F2, while switches AS3 and AS4 connected in parallel with the capacitors C11 and C12 are opened. Accordingly, in the capacitors C11 and C12, currents from the transistors BT21 and BT22 corresponding to the output currents from the photoelectric elements PD1 and PD2 are subjected to logarithmic compression integration. The timer TI1 connects the switches AS1 and AS2 to terminals A1 and A2 after a predetermined period of time (after $2^{-Tvc}$ sec.) subsequent to initiation of the preliminary light emission, and thus, integration into the capacitors C11 and C12 is suspended. Therefore, the integration voltages of the capacitors C11 and C12 in the above case may be represented by $$Qv1 = \log_2(2^{Bv1-Tvc} + 2^{Qvfm1}) \quad (4\text{-}1)$$

$$Qv2 = \log_2(2^{Bv2-Tvc} + 2^{Qvfm2}) \quad (4\text{-}2)$$

and the above voltages are to be retained.

Subsequently, from the multiplexer 7, analog signals from the capacitor C11, terminal A1, capacitor C12, and terminal A2 are successively input into the A-D converter 8, and the data thus subjected to the A-D conversion are sequentially set in the registers 10, 11, 12 and 13 through the de-multiplexer 9. More specifically, the data Qv1 corresponding to the output of the capacitor C11 are set in the register 10, the data Qv2 corresponding to the output of the capacitor C12 in the register 11, the data Bv1 corresponding to the signal from the terminal A1 in the register 12 and the data Bv2 corresponding to the signal from the terminal A2 in the register 13. Upon completion of setting of the data into the registers 10 to 13, the switches AS3 and AS4 are closed by the output of the timer circuit TI1, and the integrated charge in the capacitors C11 and C12 are discharged in preparation for the subsequent light measurement.

Still referring to FIG. 30, calculations by the blocks 15, 16, 17, 18, 19, 20, 21 and 22 which are respectively coupled to the registers 10 to 13 and block 14 will be described hereinbelow.

To the subtraction circuits 15 and 16, the APEX value Tvc of the integrated time from the block 14 and the data from the registers 12 and 13 are input to work out the values for $Bv1-Tvc$ and $Bv2-Tvc$. Subsequently, equations as follows are calculated in the subtraction circuits 17 and 18

$$Qv1 - (Bv1 - Tvc) = \Delta 11 \quad (5\text{-}1)$$

$$Qv2 - (Bv2 - Tvc) = \Delta 12 \quad (5\text{-}2)$$

and the ROM 19 and 20 convert the data from the subtraction circuits 17 and 18 into data corresponding to $\log_2(2^{\Delta 11} - 1)$ and $\log_2(2^{\Delta 12} - 1)$, while in the addition circuits 21 and 22 values represented by $$Qvfm1 = (Bv1 - Tvc) + \log_2(2^{\Delta 11} - 1) \quad (6\text{-}1)$$

$$Qvfm2 = (Bv2 - Tvc) + \log_2(2^{\Delta 12} - 1) \quad (6\text{-}2)$$

are worked out for calculating the reflected light amounts Qvfm1 and Qvfm2 due to the flash light emission during the preliminary light emission.

The process how the reflected light amount Qvfm is worked out from the addition circuits 21 and 22 is such that, upon elimination of Qv from the equation $$2^{Qv} = 2^{Bv - Tvc} + 2^{Qvfm} \quad (4')$$

and the equations (5), the relation will be $$2^{Qvfm} = 2^{Bv - Tvc}(2^{\Delta} - 1)$$

and thus, the equations (6) may be obtained, when $\log_2$ at both sides are taken.

Subsequently, calculations for working out the data $\Delta fx$ corresponding to the light emitting amount during the primary light emission as obtained according to the equation (1-2) employing blocks 301 to 309 will be explained hereinbelow.

A block 73 for outputing the data $\Delta cs$ corresponding to the contrast between two portions is coupled to the addition circuits 301 and 302 where the data for $Qvfm2 + \Delta cs$ and $Bv2 + \Delta cs$ are worked out. In the subtraction circuits 303 and 304 coupled to said addition circuits 301 and 302 and also to the ROM 305 and 306, equations as follows are worked out $$Qvfm1 - (Qvfm2 + \Delta cs) = \alpha \quad (30)$$

$$(Bv2 + \Delta cs) - Bv1 = \beta \quad (31)$$

and the ROM 305 and 306 convert the data $\alpha$ and $\beta$ from the subtraction circuits 303 and 304 into data corresponding to $\log_2(1 - 2^{-\alpha})$ and $\log_2(2^{\beta} - 1)$. In the block 26, data corresponding to the synchronized exposure time Tvs for the flash light photographing is output, while in the subtraction circuit 27 coupled to the block 26, the data for $Bv1 - Tvs$ are worked out. In addition circuits 307 and 308 connected to the ROM 305 and 306 and the subtraction circuit 27, calculations are effected to work out $$Qvfm1 + \log_2(1 - 2^{-\alpha})$$

$$(Bv1 - Tvs) + \log_2(2^{\beta} - 1)$$

Meanwhile, in a subtraction circuit 309 connected to the addition circuits 307 and 308, an equation as follows is worked out $$\Delta fx = (Bv1 - Tvs) + \log_2(2^\beta - 1) - Qvfm1 - \log_2(1 - 2^{-\alpha}) \quad (32)$$

so as to obtain the ratio of the preliminary light emitting amount to the primary light emitting amount in the APEX value, and the data thus obtained is converted into an analog signal by a D-A converter 310 inserted between the primary light emitting portion FL2 and the subtraction circuit 309, and fed to the primary light emitting portion FL2 through the terminals j22 and j21.

Hereinbelow, the process how the ratio in the APEX value $\Delta fx$ of the preliminary light emitting amount to the primary light emitting amount is worked out by the equation (32) will be explained.

Upon transformation of the equation (1-2), the relation will be $$2^{Qvfm1 + \Delta fx} - 2^{Qvfm2 + \Delta cs + \Delta fx} = 2^{Bv2 + \Delta cs - Tvs} - 2^{Bv1 - Tvs} \quad (33)$$

and when $(Qvfm2 + \Delta cs)$ and $(Bv2 + \Delta cs)$ are eliminated from the above equation (33) with the use of the equations (30) and (31), the relation will be represented by $$2^{\Delta fx} \cdot 2^{Qvfm1} \cdot (1 - 2^{-\alpha}) = 2^{Bv1 - Tvs} \cdot (2^\beta - 1)$$

and thus, the value $\Delta fx$ as shown by the equation (33) is obtained through arrangement by taking $\log_2$ at the both sides.

Therefore, the light emitting amount of the primary light emitting portion FL2 is increased upon firing, by the value $2^{\Delta fx}$ corresponding to $\Delta fx$ input through the terminal j21 as compared with that of the preliminary light emitting portion FL1.

In an addition circuit 311 coupled to the subtraction circuit 309 and a subtraction circuit 312, an equation as follows is worked out $$Qvfm1 + \Delta fx = Qvf1 \quad (7'-1)$$

so as to obtain the reflected light amount in the APEX value Qvf1 from the subject to be photographed, by the primary light emission toward the portion at which light is received by the photoelectric element PD1, upon light emission by the primary light emitting portion FL2. The above data Qvf1 from the addition circuit 311 and the data $(Bv1 - Tvs)$ from the subtraction circuit 27 are applied to the subtraction circuit 312 to work out an equation $$Qvf1 - (Bv1 - Tvs) = \Delta L1 \quad (8-1)$$

and the data $\Delta L1$ thus worked out are converted into data corresponding to $\log_2(2^{\Delta L1} + 1)$ by a ROM 313 coupled to the subtraction circuit 312. The block 49 connected to an addition circuit 314 which is coupled to the ROM 313 is a block which outputs data corresponding to the film speed in the APEX value Sv of a film to be employed, and the data Sv from said block 49, data $\log_2(2^{\Delta L1} + 1)$ from the ROM 313, and data $(Bv1 - Tvs)$ from the subtraction circuit 27 are applied to the addition circuit 314 to work out the following equation.

$$Av1 = (Bv1 - Tvs) + \log_2(2^{\Delta L1} + 1) + Sv \quad (34)$$

The above value Av1 represents the aperture value in the APEX system that will render the light receiving portion of the photoelectric element PD1 to be of the optimum exposure, when the light emitting amount of the primary light emitting portion FL2 is increased by $2^{\Delta fx}$ as compared with that of the preliminary light emitting portion FL1, with the exposure time set as Tvs.

The process how the APEX value Av1 of the aperture value is obtained by the equation (34) will be explained hereinbelow.

The conditions for obtaining the optimum exposure during the flash light photographing are represented by $$(2^{Qvf1} + 2^{Bv1 - Tvs}) \cdot 2^{Sv} = 2^{Av1} \quad (35)$$

Accordingly, upon elimination of Qvf1 from the equations (35) and (8-1), the relation will be $$2^{Bv1 - Tvs}(1 + 2^{\Delta L1}) \cdot 2^{Sv} = 2^{Av1}$$

and upon taking of $\log_2$ at the both sides, the equation (34) is obtained. A known indication circuit 315 coupled to the subtraction circuit 309, the addition circuit 314 and the block 26, is arranged to indicate the light emitting amount of the primary light emitting portion FL2 based on the data $\Delta fx$ from the circuit 309, and the aperture value based on the data Av1 from the circuit 314, and also the synchronized exposure time based on the data Tvs from the block 26, while a known aperture control circuit 316 connected to the addition circuit 314 controls the aperture value on the basis of the data from the circuit 314. There is also provided a known shutter control circuit 317 which is coupled to the block 26 for controlling the exposure time based on the data Tvs from said block 26.

In the foregoing description of the arrangement of FIG. 30, explanation has been given only with reference to the case where the light emitting amount $\Delta fx$ necessary for unconditionally reaching the contrast $\Delta cs$ may be worked out, but in the actual practice, there are often cases where data for controllable light emitting amount can not be obtained due to various restrictions in the aperture value control range and exposure time control range of a photographic camera, upper and lower limits for the light emitting amount of the flash light emitting device, and also in the state of the subject to be photographed, etc. Accordingly, in the application of the arrangement to actual photographic cameras, there must be taken some countermeasures, when the data $\Delta fx$ for the controllable light emitting amount can not be obtained.

Hereinbelow, description will be given with respect to the calculation contents in the case where such countermeasures as referred to above are taken with reference to FIG. 31.

Figure 31:
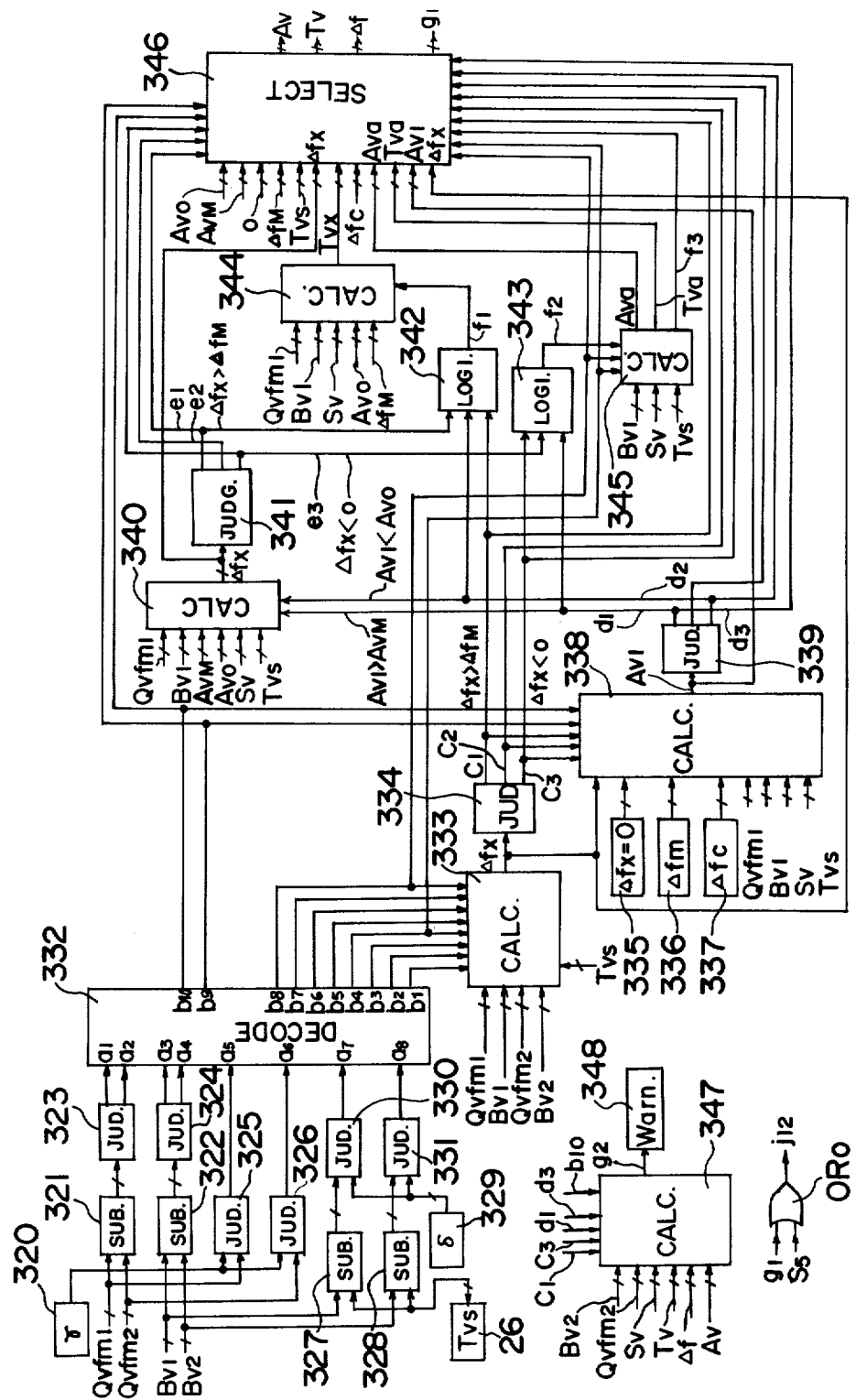
FIG. 31 is also a block diagram similar to FIG. 30, which particularly shows a modification thereof.

It is to be noted that in the modified arrangement of FIG. 31, the description relates to the calculation in the case where the relation is $2^{\Delta cs} = 1 (\Delta cs = 0)$, i.e. where it is intended to control so that two different portions may have the same brightness.

In the first place, symbols to be employed hereinbelow will be briefly explained for better understanding.

$\Delta fm$ is equivalent to the maximum light emitting amount and therefore, in the case where the relation is $0 \leq \Delta fx \leq \Delta fM$, it is possible to control the light emitting amount. Avo represents the fully open aperture value, while AvM denotes the minimum aperture value, and thus, in the relation Avo≦Av1≦AvM, the aperture control becomes possible.

The relations between the inputs and outputs for the decoder 332 are shown in Table 5 below.

TABLE 5

|      | a1 | a2 | a3 | a4 | a5 | a6 | a7 | a8 | b1 | b2 | b3 | b4 | b5 | b6 | b7 | b8 | b9 | b10 |
|------|----|----|----|----|----|----|----|----|----|----|----|----|----|----|----|----|----|-----|
| I    | 1  | 0  | 1  | 0  | 0  | 0  | 0  | 0  | 1  | 0  | 0  | 0  | 0  | 0  | 0  | 0  | 0  | 0   |
| II   | 0  | 0  | 0  | 0  | 0  | 0  | 0  | 0  | 1  | 0  | 0  | 0  | 0  | 0  | 0  | 0  | 0  | 0   |
| III  | 1  | 0  | 1  | 0  | 0  | 1  | 0  | 0  | 0  | 0  | 1  | 0  | 0  | 0  | 0  | 0  | 0  | 0   |
| IV   | 0  | 0  | 0  | 0  | 1  | 0  | 0  | 0  | 0  | 0  | 0  | 1  | 0  | 0  | 0  | 0  | 0  | 0   |
| V    | 1  | 0  | 1  | 0  | 0  | 0  | 1  | 0  | 0  | 0  | 0  | 0  | 1  | 0  | 0  | 0  | 0  | 0   |
| VI   | 0  | 0  | 0  | 0  | 0  | 0  | 1  | 0  | 0  | 0  | 0  | 0  | 0  | 1  | 0  | 0  | 0  | 0   |
| VII  | 1  | 0  | 1  | 0  | 0  | 1  | 1  | 0  | 0  | 0  | 0  | 0  | 0  | 0  | 1  | 0  | 0  | 0   |
| VIII | 0  | 0  | 0  | 0  | 1  | 0  | 0  | 1  | 0  | 0  | 0  | 0  | 0  | 0  | 0  | 1  | 0  | 0   |
| IX   | 0  | 1  | 0  | 1  | φ  | φ  | φ  | φ  | 0  | 0  | 0  | 0  | 0  | 0  | 0  | 0  | 1  | 0   |
| X    | 1  | φ  | 0  | φ  | φ  | φ  | φ  | φ  | 0  | 0  | 0  | 0  | 0  | 0  | 0  | 0  | 0  | 1   |
| XI   | 0  | φ  | 1  | φ  | φ  | φ  | φ  | φ  | 0  | 0  | 0  | 0  | 0  | 0  | 0  | 0  | 0  | 1   |
| XII  | 0  | 1  | φ  | 0  | φ  | φ  | φ  | φ  | 0  | 0  | 0  | 0  | 0  | 0  | 0  | 0  | 0  | 1   |
| XIII | φ  | 0  | 0  | 1  | φ  | φ  | φ  | φ  | 0  | 0  | 0  | 0  | 0  | 0  | 0  | 0  | 0  | 1   |

A subtraction circuit 321 coupled to a decoder 332 through a judging circuit 323 works out the equation $$Qvfm1 - Qvfm2 = \alpha \quad (30)$$

while a subtraction circuit 322 coupled to the decoder 332 through a judging circuit 324 calculates the equation $$Bv2 - Bv1 = \alpha \quad (31)$$

The judging circuit 323 renders the terminal a1 to be "High" when the output data $\alpha$ of the subtraction circuit 321 are in the relation $\alpha > 0$, and the terminal a2 to be "High" when the output data are in the relation $\alpha = 0$. Meanwhile, the judging circuit 324 renders the terminal a3 to be "High" when the output data $\beta$ of the subtraction circuit 322 are in the relation $\beta > 0$, and the terminal a4 to be "High" when the output data $\beta$ are in the relation $\beta = 0$. Judging circuits 325 and 326 inserted between a block 320 and the decoder 332 are respectively arranged to judge whether or not the data for Qvfm1 and Qvfm2 are larger than data $\gamma$ of a predetermined value from the block 320, and, if the relations are Qvfm1, Qvfm2 < $\gamma$, render the terminals a5 and a6 to be "High". The signal is utilized as a signal for neglecting the reflected light amount due to the flash light emission, since it may be considered that the flash light does not contribute to the exposure, if the data Qvfm1 and Qvfm2 are less than the predetermined value $\gamma$.

Subtraction circuits 327 and 328 coupled to the decoder 332 through judging circuits 330 and 331 work out the data for Bv1−Tvs and Bv2−Tvs based on the data Bv1 and Bv2, and the data Tvs for the synchronizing limit exposure time from a block 26 further coupled thereto. The judging circuits 330 and 331 are respectively arranged to judge whether or not the data Bv1−Tvs and Bv2−Tvs are larger than data $\delta$ of a predetermined value from a block 329 connected thereto, and render the terminals a7 and a8 to be "High" in the relation (Bv1−Tvs), (Bv2−Tvs) < $\delta$. The above signal is utilized as a signal for neglecting the light amounts (Bv1−Tvs) and (Bv2−Tvs) due to the ambient light, since such light amounts by the ambient light are regarded as not contributing to the exposure, if the data (Bv1−Tvs) and (Bv2−Tvs) are smaller in value than the predetermined value $\delta$. The decoder 332 is so adapted as to render one of the terminals b1, b2, b3, b4, b5, b6, b7, b8, b9 and b10 thereof to be "High" according to the signals from the terminals a1, a2, a3, a4, a5, a6, a7 and a8.

In Table 5, "1" represents signals of "High" and "0" denotes signals of "Low", while "1o6" shows signals which may either be "High" or "Low".

Subsequently, the contents of calculation in the cases of I, II, III, IV, V, VI, VII, VIII, IX, X, XI, XII, and XIII as shown in Table 5 will be described with reference to FIG. 31.

In the case of I, the terminals a1 and a3 are of "High", and the terminal b1 is of "High", and the relations may be represented by $$Qvfm1 - Qvfm2 = \alpha > 0$$

$$Bv2 - Bv1 = \beta > 0$$

and thus, the equation as follows is worked out in a calculation circuit 333 coupled to the terminals b1 to b8 of the decoder 332 and applied with the data Qvfm1, Bv1, Qvfm2, Bv2 and Tvs $$\Delta fx = (Bv2 - Tvs) + \log_2(1 - 2^{-\beta}) - Qvfm2 - \log_2(2^\alpha - 1) \quad (35)$$

The process how the value $\Delta fx$ is obtained by the above equation (35) is such that, in the case where $\Delta cs = 0$ in the equation (1-2), the relation will be $$2^{Qvfm1 + \Delta fx} - 2^{Qvfm2 + \Delta fx} = a^{Bv2 - Tvs} - 2^{Bv1 - Tvs} \quad (36)$$

Therefore, upon elimination of Qvfm1 and Bv1 with the use of the equations (30) and (31), the equation will be transformed as $$2^{\Delta fx} \cdot 2^{Qvfm2} \cdot (2^{60} - 1) = a^{Bv2} \cdot (1 - 2^{-\beta}) \cdot 2^{-Tvs}$$

and upon taking of $\log_2$ from both sides, the equation (35) is obtained.

The value $\Delta fx$ obtained by the calculation circuit 333 is judged by a judging circuit 334 coupled to said circuit 333 whether or not a relation as follows is established.

$$0 \leq \Delta fx \leq \Delta fM$$

and if it is in the above relation, the terminal C2 is rendered to be "High", which serves as a signal for indicating that the control of the flash light emission is possible.

Meanwhile, if the relation is $$\Delta fx < 0$$

the terminal C3 is rendered to be "High", which serves as a signal for indicating that the light emission is excessive even at the minimum light emitting amount. In the case where the relation is $$\Delta fx > \Delta fM$$

the terminal C1 is rendered to be "High" so as to indicate that the light emitting amount is insufficient even at the maximum light emitting amount. Therefore, when the terminals C1 and C3 are of "High", these serve as signals for indicating that it is impossible to control the contrast $2^{\Delta cs}$ to "1".

When the terminal C3 is of "High", a calculation circuit 338 coupled to the circuit 334 works out an equation as follows on the assumption that $\Delta fx = 0$ $$Av1 = (Bv1 - Tvs) + \log_2(2^{\Delta L1} + 1) + Sv \quad (34)$$

Meanwhile, if the terminal C2 is of "High", the calculation circuit 338 works out the equation (34) based on the data $\Delta fx$ calculated by the calculation circuit 333. When the terminal C1 is of "High", the calculation circuit 338 works out the equation (34) on the assumption that $\Delta fx = \Delta fM$. The aperture value Av1 worked out by the calculation circuit 338 is the aperture value at which the portion to be measured by the photoelectric element PD1 is rendered to be of optimum exposure. The aperture value Av1 thus worked out is subjected to judgement at a judging circuit 339 connected to the calculation circuit 338 as to whether or not the relation Av0 $\leq$ Av1 $\leq$ AvM is established. If the relation is Av0 $\leq$ Av1 $\leq$ AvM, the terminal d2 is rendered to be "High". In this case, if the terminal C2 is also "High", the data $\Delta fx$ from the calculation circuit 333, data Av1 from the calculation circuit 338, and further, data Tvs for the synchronized limit exposure time from the block 26 are output from terminals Av, Tv and $\Delta f$ of a data selector 346 coupled to said circuits 338 and 333, etc. as shown, and thus, photographing is effected at the relation $2^{\Delta cs} = 1$.

When the terminal C3 is of "High", with the terminal d2 being also of "High", the data for $\Delta fx = 0$, data Av1 from the calculation circuit 338, and data Tvs from the block 26 are produced from the selector 346. In the above case, at a calculation circuit 347 shown at the left lower portion in FIG. 31, an equation as follows is worked out based on the data $fx = 0$, Tvs, Qvfm2, Bv2, and Sv $$Av2 = (Bv2 - Tvs) + \log_2(2^{\Delta L2} + 1) + Sv \quad (37)$$

$$(\Delta L2 = Qvfm2 - (Bv2 - Tvs))$$

The value Av2 thus worked out is the aperture value which renders the portion measured for light intensity by the photoelectric element PD2 to be of proper exposure. Incidentally, since the exposure control is effected based on the value Av1 as worked out by the calculation circuit 338 (i.e. the portion to be measured by the photoelectric element PD1 is made to be of optimum exposure), the two portions may be regarded to have the contrast represented by $$Av2 - Av1 = \Delta c21 \quad (38)$$

and upon judgement as to whether or not the relation is $$-2.7 \leq \Delta c21 \leq +2.3$$

if the above conditions are not satisfied, the terminal g2 of the circuit 347 is rendered to be "High", and it is warned by a warning device 348 coupled to the circuit 347, that the contrast between the two portions is so high that in the photographing, the portion to be measured by the photoelectric element PD2 undesirably exceeds the latitude range of a color reversal film. In the case of a color reversal film, since portions outside the range between $-2.7$ EV and $+2.3$ EV with respect to the portion of an intermediate density, are not reproduced on the film, it is necessary to give the warning as described above.

When the terminal C1 is of "High" and the terminal d2 is also of "High", the data for Av1, Tvs and $\Delta fM$ are output from the selector 346, and the exposure control is effected based on such values, while in the similar manner as previously stated, the value Av2 is worked out by the calculation circuit 347, and if the relation is not $-2.7 \leq \Delta c21 \leq +2.3$, warning is given by the warning device 348.

When the terminal C3 is of "High" (i.e., $\Delta fx < 0$) and the terminal d1 is "High" (i.e., $Av > AvM$), it may be regarded that the flash light emission is not necessary owing to excessively bright ambient light, or the reflected light amount by the flash light emission is excessive due to a short distance up to the subject to be photographed. In the case as described above, the terminal f2 of a logic circuit 343 coupled to a calculation circuit 345 becomes "High", and the calculation circuit 345 functions to effect the ordinary exposure calculation based only on the ambient light for working out the values Ava and Tva, and the terminal f3 is further rendered to be "High". The "High" signal from the above terminal f3 is output at the terminal g1 through the selector 346 and fed to one of the inputs of an OR circuit OR0 shown at the lower left in FIG. 31. The other input of the above OR circuit OR0 is applied with a signal from the switch S5 for starting the primary flash light exposure. Accordingly, when the terminal g1 is of "High", the output of the OR circuit OR0 remains "High", and the light emission starting signal is not produced from the terminal j12, and the primary flash light can not be emitted.

It should be noted here that in the above case, if the output Tva of the calculation circuit 345 is in the relation Tva < Tvs, the data for AvM, Tvs and $\Delta fx = 0$ may be output from the selector 346 so as to fire the flash light at the minimum amount. The above state relates to the case where the ambient light is comparatively dark, with the distance up to the subject to be photographed being too short. In such a case, even if the exposure may be slightly excessive, there is such an effect that the undesirable occurring of hand-blur is prevented. Also in the case where the terminals C3 and d1 become "High", it is necessary to give warning according to the results of calculation by the calculation circuit 347 based on the data Ava, Tva and Bv2 from the selector 346.

Meanwhile, when the terminal C3 is "High" ($\Delta fx < 0$) and the terminal d3 is also of "High" (Av1 < Av0) a calculation circuit 340 coupled to the calculation circuit 338 through the judging circuit 339 works out following equations on the assumption that Av1 = Av0.

$$\Delta fx = (Bv1 - Tvs) + \log_2(2^{\Delta d1} - 1) - Qvfm1 \quad (39)$$

$$\Delta d1 = (Av0 - Sv) - (Bv1 - Tvs) \quad (40)$$

The process how the value $\Delta fx$ is obtained by the equation (39) is such that, since the conditions for the portion measured by the photoelectric element PD1 to be of the optimum exposure are $$2^{Bv1-Tvs}+2^{Qvfm1+\Delta fx}=2^{Av0-Sv} \quad (41)$$

upon elimination of (Av0−Sv) from the equations (40) and (41), the equation (39) can be obtained. The data Δfx thus obtained by the calculation circuit 340 is subjected to judgement as to whether or not the relation is $0 \leq \Delta fx \leq \Delta fM$, and if the relation is $0 \leq \Delta fx \leq \Delta fM$, the terminal e2 is rendered to be "High", and the data for Av0, Δfx and Tvs are developed from the selector 346, with the value Av2 being calculated by the calculation circuit 347, while, when the contrast warning is required, such warning is given by the warning device 348.

It is when the value worked out for the aperture on the assumption that Δfx=0 becomes Av1<Av0 due to a subject to be photographed which is too dark and the value Δfx is re-calculated at Av1=Av0, that the terminals C3 and d3 are of "High" and the calculation is effected at the calculation circuit 340. Therefore, there is no possibility that the re-calculated value Δfx becomes Δfx<0 (i.e. to darken the light for the subject to be photographed) nor that the terminal e3 becomes "High".

When the terminal e1 is of "High" (in the relation of Δfx>ΔfM), the terminal d3 also becomes "High" (Av1<Av0) for the re-calculation of the value Δfx, and therefore, the optimum exposure can not be reached even if the flash light emitting device is fired to the full extent. Accordingly, in the above case, the output f1 of a logic circuit 342 coupled to the circuits 340 and 334 is rendered to be "High" for the actuation of a calculation circuit 344 applied with the data Qvfm1, Bv1, Sv and Av0, and coupled to the logic circuit 342 and selector 346 so as to work out equations as follows.

$$Tvx = Bv1 - (Qvfm1+\Delta fM) - \log_2 (2^{\Delta t1} - 1) \quad (42)$$

$$\Delta t1 = (Av0-Sv) - (Qvfm1+\Delta fM) \quad (43)$$

The above data Tvx for the exposure time are longer in the duration in seconds than the data Tvs for the synchronizing limit, and by these data, the amount of contribution to the exposure by the ambient light is increased to achieve the optimum exposure.

The process how the exposure time to achieve the optimum exposure is obtained by the equation (42) is such that, since the conditions for reaching the optimum exposure are represented by an equation $$2^{Bv1-Tvx}+2^{Qvfm1+\Delta fM}=a^{Av0-Sv} \quad (44)$$

upon elimination of the term for (Av0−Sv) from the equations (43) and (44), the equation (42) is obtained, and the data for ΔfM, Av0 and Tvx are output from the selector 346. Moreover, in the similar manner as in a conventional photographic camera, it is desirable to give a warning against occurring of hand-blur, if the value Tvx is longer in seconds than the exposure time for the hand-blur occurring limit, and also to effect the exposure in the longest time in seconds within the limit, with a warning being simultaneously given, if the value is longer than the longest time in seconds which is controllable. Meanwhile, the value Av2 is similarly worked out in the calculation circuit 347 based on the data ΔfM, Tvx, Bv2, Qvfm2 and Sv for giving the warning.

When the terminal C1 of the judging circuit 334 becomes "High" (Δfx>ΔfM), with the value Av1 being worked out by the calculation circuit 338 on the assumption that Δfx=ΔfM, and the terminal d3 of the judging circuit 339 becomes "High" (Av1>Av0), the terminal f1 of the logic circuit 342 is rendered to be "High", and the value Tvx for the equation (34) is worked out by the calculation circuit 344, and thereafter, similar functions as described previously are performed.

In the case where the terminal C1 is of "High" and the terminal d1 is also of "High" (Av1>AvM), the value Δfx is worked out by the calculation circuit 340 and judged as to whether or not the relation is Δfx≧0 by the judging circuit 341 connected to the circuit 340. If the terminal e2 of the circuit 341 is of "High" (Δfx≧0), the selector 346 produces the data Δfx, AvM and Tvs worked out by the calculation circuit 340 for carrying out the calculation for the warning at the calculation circuit 347 as stated earlier. Since the value Av1 is worked out on the supposition that Δfx=ΔfM when the terminal C1 is of "High" (Δfx>ΔfM) and the Δfx is recalculated on the assumption that Av1=AvM, with the terminal d2 becoming "High" (Av1>AvM), there is no possibility that the relation becomes Δfx>ΔfM nor the terminal e1 is rendered to be "High".

On the other hand, when the terminal e3 becomes "High" (Δfx<0), over-exposure may result, even if the minimum light emission is effected at the minimum aperture value AvM. In such a case, the output f1 of the logic circuit 342 becomes "High", and the calculation for the ambient light photographing is effected.

When the terminal C2 is of "High" (0≦Δfx≦ΔfM), with the terminal d3 becoming "High" (Av1<Av0), the value Δfx is obtained by the calculation circuit 340 according to the equation (39), and when the terminal e2 becomes "High" (Δfx≦ΔfM), the data Av0, Tvs and Δfx are output from the selector 346, and the value Av2 is worked out in the calculation circuit 347 for warning purpose. Moreover, at the relation Δfx>ΔfM, when the terminal e1 becomes "High", the output f1 of the logic circuit 342 is rendered to be "High", and the value Tvx is worked out in the calculation circuit 344 according to the equation 42, while the data Av0, Tvx and ΔfM are output from the selector 346 for working out the value Av2. In connection with the above, there is no possibility that the terminal e3 is rendered to be "High" at the relation Δfx<0.

When the terminal d1 becomes "High" (Av1>AvM), with the terminal C2 being of "High" (0≦Δfx≦ΔfM), the calculation circuit 340 works out the value Δfx according to the equation (39) at the relation Av1=AvM. When the terminal e2 is of "High" at the relation Δfx>0, the data Δfx, AvM and Tvs are output from the selector 346, and the calculation for the contrast warning is effected by the calculation circuit 347. Meanwhile, in the relation Δfx<0, when the terminal e3 becomes "High", the output f2 of the logic circuit 343 is rendered to be "High" so as to effect calculation for the ambient light. In connection with the above, there is no possibility that the value Δfx worked out by the calculation circuit 340 is brought into the relation Δfx>ΔfM, and the terminal e1 becomes "High".

Figure 32:
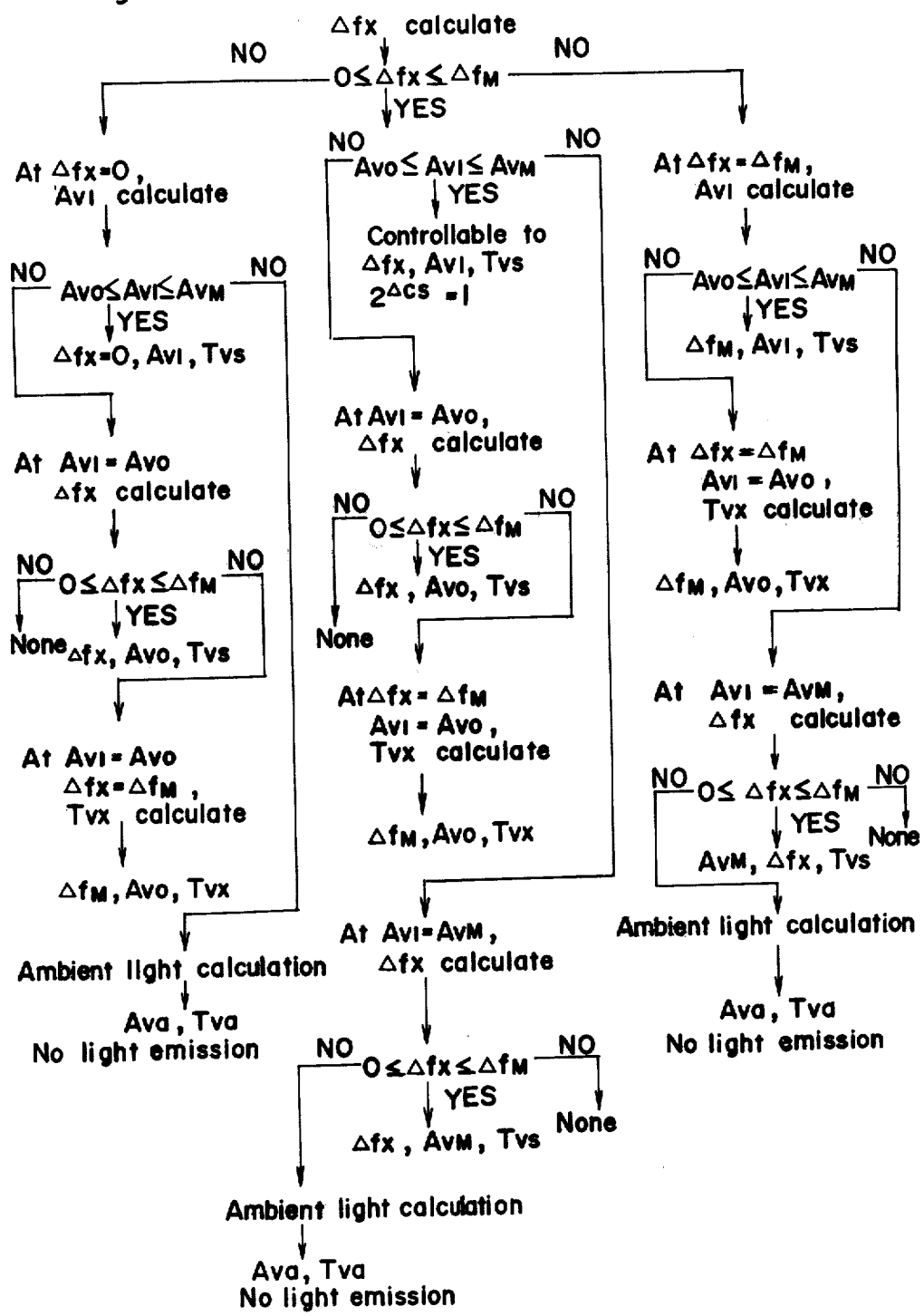
FIG. 32 is a flow-chart showing processes of calculations in the light measuring arrangement of FIG. 31.

Referring also to a flow-chart of FIG. 32 showing contents of the calculation for the case I stated previously, it is so arranged that when the respective data worked out exceed the control range, the exceeding data are regarded as the values thereof, and other data are to be re-calculated.

Subsequently, description will be made with reference to the case II referred to earlier. In this case, all of the terminals a1 to a8 are rendered to be "Low", with the terminal b2 becoming "High". In the above instance, the relations are $$Qvfm1 - Qvfm2 = \alpha < 0$$

$$Bv2 - Bv1 = \beta < 0$$

Therefore, in the calculation circuit 333, and equation as follows is calculated for working out the value $\Delta fx$.

$$\Delta fx = (Bv2 - Tvs) + \log_2 (2^{-\beta} - 1) - Qvfm2 - \log_2 (1 - 2^{\alpha}) \quad (45)$$

The process how the data $\Delta fx$ are obtained by the equation (45) is such that, in the case where the relation is $2^{\Delta cs} = 1$ in the equation (1-2), upon transformation, the equation will be $$(2^{Bv1} - 2^{Bv2}) \cdot 2^{-Tvs} = (2^{Qvfm2} - 2^{Qvfm1}) \cdot 2^{\Delta fx}$$

and upon elimination of Qvfm1 and Bv1 with employment of the above equation and the equations (30) and (31), the relation will be represented by $$2^{Bv2 - Tvs} \cdot (2^{-\beta} - 1) = 2^{\Delta fx} \cdot (1 - 2^{\alpha}) \cdot 2^{Qvfm2}$$

When the above equation is rearranged by taking $\log_2$ at both sides, the value $\Delta fx$ as shown by the equation (45) is obtained. Subsequently, calculation is effected according to the flow-chart of FIG. 32 in the similar manner as in the case I.

In the case II mentioned earlier, the terminals a1, a3 and a6 are rendered to be "High". In this instance, the relations will be represented by $$Qvfm1 - Qvfm2 = \alpha > 0$$

$$Bv2 - Bv1 = \beta > 0$$

$$Qvfm2 < \gamma$$

and, since the reflected light amount to the light measuring portion of the photoelectric element PD2 due to the flash light emission is considered not to contribute to the exposure, calculation is effected, with the data Qvfm2 being neglected. Therefore, the equation (1-2) may be transformed as $$2^{Qvfm1 + \Delta fx} = 2^{Bv2 - Tvs} - 2^{Bv1 - Tvs}$$

and upon elimination of Bv1 with the use of the equation (31), the relation as follows is obtained.

$$\Delta fx = (Bv2 - Tvs) + \log_2 (1 - 2^{-\beta}) - Qvfm1 \quad (46)$$

The value $\Delta fx$ is worked out through calculation of the above equation (46). Subsequently, in the similar manner as in the case I, calculation following the flow-chart of FIG. 32 is carried out. It is to be noted that in the calculation for warning carried out in the calculation circuit 347, the value Av2 is worked out through ordinary calculation based on the ambient light.

In the case IV referred to earlier, the terminal a5 is rendered to be "High", with the terminal b4 becoming "High". In the above case, the relation will be $$Qvfm1 - Qvfm2 = \alpha < 0$$

$$Bv2 - Bv1 = \beta < 0$$

$$Qvfm1 < \gamma$$

and since the reflected light amount to the light measuring portion of the photoelectric element PD1 due to the flash-light emission is not considered to be contributing to the exposure, the calculation is effected, with the data Qvfm1 disregarded. Hence, the equation (1-2) is transformed as $$(2^{Bv1} - 2^{Bv2}) \cdot 2^{-Tvs} = 2^{Qvfm2 + \Delta fx}$$

and upon elimination of Bv1 with the use of the equation (31), an equation as follows is obtained.

$$\Delta fx = (Bv2 - Tvs) + \log_2 (2^{-\beta} - 1) - Qvfm2 \quad (47)$$

The calculation circuit 333 works out the value $\Delta fx$ by performing the calculation of the equation (47).

In this case, since the data Qvfm1 are neglected, an equation as follows is worked out by the calculation circuit 345.

$$Bv1 + Sv - Tvs = Av1$$

and if the relation is $0 \leq \Delta fx \leq \Delta fM$ at $Av0 \leq Av \leq AvM$, the data Av1, $\Delta fx$ and Tvs are produced from the selector 346. Meanwhile, when the relation is $0 > \Delta fx$ at $Av0 \leq Av1 \leq AvM$, the data Av1, $\Delta fx = 0$ and Tvs are developed from the selector 346, and the data Av2 are worked out by the calculation circuit 347 based on the data Tvs, $\Delta fx = 0$, Qvfm2 and Bv2, with subsequent calculation of an equation $$Av2 - Av1 = \Delta c21 \quad (38)$$

and if the relation is not $-2.7 \leq \Delta c21 \leq +2.3$, the terminal g2 of the circuit 347 is rendered to be "High" for warning that the contrast between the two light measuring portions is too high by the warning device 348. On the other hand, if the relation is $\Delta fx > \Delta fM$ at $Av0 \leq Av1 \leq AvM$, the data Av1, $\Delta fM$ and Tvs are produced from the selector 346, while calculation for the warning is effected by the calculation circuit 347.

If the relation is $Av1 < Av0$, the exposure time becomes insufficient by Tvs, and therefore, in this case, on the assumption that $Av1 = Av0$, an equation as follows is worked out $$Bv1 + Sv - Av0 = Tvx$$

If the relation is $0 \leq \Delta fx \leq \Delta fM$, the data Av0, Tvx and $\Delta fx$, and if the relation is $0 > \Delta fx$, the data Av0, Tvx, and $\Delta fx = 0$, and if the relation is $\Delta fx > \Delta fM$, the data Av0, Tvx and $\Delta fM$ are respectively output from the selector 346, while the calculation for the warning is effected in the calculation circuit 347.

In the relation $Av1 > AvM$, over-exposure will result if the exposure time is of Tvs. Therefore, in this case, an equation as follows is worked out.

$$Bv1 + Sv - AvM = Tvx$$

In the above case, since the relation will be $Tvx > Tvs$, the flash light photographing can not be effected, so that the terminal f3 is rendered to be "High". Meanwhile, the data AvM and Tvx are produced from the selector 346, with the terminal g1 becoming "High", and the output j12 of the OR circuit OR0 remains to be "High", without effecting the flash-light emission. On the other hand, the calculation circuit 347 works out the equations as follows.

$$Bv2+Sv-Tvx=Av2$$

$$Av2-AvM=\Delta c21$$

and if the relation is not $-2.7 \leq \Delta c21 \leq +2.3$, the terminal g2 is rendered to be "High" for effecting the contrast warning by the warning device 348.

In the case V stated previously, the terminals a1, a3 and a7 are rendered to be "High", and in this case, the relations are represented by $$Qvfm1-Qvfm2=\alpha>0$$

$$Bv2-Bv1=\beta>0$$

$$Bv1-Tvs<\delta$$

Therefore, the light amount $Bv1-Tvs$ due to the ambient light incident upon the light measuring portion of the photoelectric element PD1 is considered not to contribute to the exposure, and thus, the term $Bv1-Tvs$ may be neglected. Accordingly, the equation (1-2) will be transformed as $$(2^{Qvfm1}-2^{Qvfm2}) \cdot 2^{\Delta fx} = 2^{Bv2-Tvs}$$

and upon rearrangement through elimination of Qvfm1 by the equation (30), the relation will be represented by $$\Delta fx = (Bv2-Tvs) - Qvfm2 - \log_2(2^{\alpha}-1) \tag{48}$$

The calculation circuit 333 works out the above equation (48), and thereafter, in the similar manner as in the case I, calculation according to the flow-chart of FIG. 32 is effected.

Meanwhile, in the case of VI, the terminal a8 is rendered to be "High" at the relation as follows.

$$Qvfm1-Qvfm2=\alpha<0$$

$$Bv2-Bv1=\beta<0$$

$$Bv2-Tvs<\delta$$

Accordingly, since the light amount $Bv2-Tvs$ due to the ambient light incident upon the light measuring portion of the photoelectric element PD2 is considered not to contribute to the exposure, calculation is effected, with the term $Bv2-Tvs$ being disregarded. Therefore, the equation (1-2) may be transformed as $$2^{Bv1-Tvs} = (2^{Qvfm2}-2^{Qvfm1}) \cdot 2^{\Delta fx}$$

and upon rearrangement through elimination of Qvfm1 with the use of the equation (30), the relation will be $$\Delta fx = (Bv1-Tvs) - Qvfm2 - \log_2(1-2^{\alpha}) \tag{49}$$

The above equation (49) is worked out by the calculation circuit 333 for the calculation of $\Delta fx$. Subsequent calculation is effected in the similar manner as in the case I.

In the vase VII, the terminals a1, a3, a6 and a7 are of "High" with consequent relations as follows.

$$Qvfm1-Qvfm2=\alpha>0$$

$$Bv2-Bv1=\beta>0$$

$$Qvfm2<\gamma$$

$$Bv1-Tvs<\delta$$

and the calculation is effected, with the terms Qvfm2 and $(Bv1-Tvs)$ neglected. In the above case, the equation (1-2) will be transformed as $$2^{Qvfm1+\Delta fx} = 2^{Bv2-Tvs}$$

and an equation as follows is worked out in the calculation circuit 333.

$$\Delta fx = (Bv2-Tvs) - Qvfm1 \tag{50}$$

Subsequent calculation contents are generally the same as in the case I.

In the case VIII, the terminals a5 and a8 are rendered to be "High", with the relations as follows.

$$Qvfm1-Qvfm2=\alpha<0$$

$$Bv2-Bv1=\beta<0$$

$$Qvfm1<\gamma$$

$$Bv2-Tvs<\delta$$

Therefore, calculation is effected by disregarding the terms Qvfm1 and $Bv2-Tvs$, and the equation (1-2) is transformed as $$2^{Bv1-Tvs} = 2^{Qvfm2+\Delta fx}$$

and thus, an equation as follows is worked out in the calculation circuit 333

$$\Delta fx = (Bv1-Tvs) - Qvfm2 \tag{51}$$

Thereafter, similar calculation as in the case IV is effected.

In the case IX, the terminals a2 and a4 are rendered to be "High", with the relation as follows.

$$Qvfm1=Qvfm2$$

$$Bv1=Bv2$$

In the above case, the value $\Delta fx$ is represented as follows irrespective of any value taken between 0 and $\Delta fM$ $$2^{Qvfm1+\Delta fx} + 2^{Bv1-Tvs} = 2^{Qvfm2+\Delta fx} + 2^{Bv2-Tvs}$$

and the two portions are necessarily controlled to one brightness. In this case, the terminal b9 of the decoder 332 is rendered to be of "High", and calculation as follows is effected. In the calculation circuit 338, an equation as follows is worked out based on the data $\Delta fx = \Delta fc$ ($\Delta fc = \Delta fM/2$) and Qvfm1, Bv1, Tvs and Sv.

$$Av1 = (Bv1-Tvs) + \log_2(2^{\Delta L1}+1) + Sv \tag{34}$$

$$\Delta L1 = (Qvfm1+\Delta fc) - (Bv1-Tvs)$$

More specifically, the aperture value Av1, which provides the optimum exposure when the light emitting amount of the flash light emitting device is brought to an intermediate amount between the minimum flash light emission and full flash light emission, is thus worked out. Furthermore, it is judged whether or not the conditions $Av0 \leq Av1 \leq AvM$ are satisfied by the judging circuit 339, and if the conditions have been satisfied, with the terminal d2 being of "High", the data for $\Delta fc$, Av1 and Tvs are output from the selector 346. When the terminal d3 is of "High" at the relation $Av1 < Av0$, under-exposure may result due to insufficient light emission, and therefore, on the assumption that $Av1 = Av0$, an equation as follows is worked out by the calculation circuit 340 for the calculation of the value $\Delta fx$.

$$\Delta fx = (Bv1 - Tvs) + \log_2 (2^{\Delta d1} - 1) - Qvfm1 \tag{39}$$

$$\Delta d1 = (Av0 - Sv) - (Bv1 - Tvs) \tag{40}$$

Meanwhile, in the judging circuit 341, judgement is made as to whether or not the relation $\Delta fx \leq \Delta fM$ is established, and if the relation is $\Delta fx \leq \Delta fM$, the terminal e2 is rendered to be "High", and the data for Av0, $\Delta fx$ and Tvs are produced from the selector 346.

On the contrary, if the relation is $\Delta fx > \Delta fM$, with the terminal e1 being of "High", even the maximum light emitting amount may be insufficient. Therefore, the output terminal f1 of the logic circuit 342 is rendered to be "High", and in the calculation circuit 344, equations as follows are worked out based on the data Qvfm1, Bv1 and Sv on the assumption that $Av1 = Av0$ and $\Delta fx = \Delta fM$ for obtaining the value Tvx.

$$Tvx = Bv1 - (Qvfm1 + \Delta fM) - \log_2 (2^{\Delta t1} - 1) \tag{42}$$

$$\Delta t1 = (Av0 - Sv) - (Qvfm1 + \Delta fM) \tag{43}$$

while the data for Av0, $\Delta fM$ and Tvx are output from the selector 346. It is to be noted here that, since the value $\Delta fx$ worked out by the calculation circuit 340 is of the re-calculated value due to the insufficiency of the light emitting amount at $\Delta fc$, there is no possibility that the relation becomes $\Delta fx < 0$.

When the value Av1 worked out by the calculation circuit 338 comes to be in the relation $Av1 > AvM$, the light emitting amount becomes excessive at $\Delta fc$. Therefore, the terminal d1 of the judging circuit 339 is rendered to be "High" and in the calculation circuit 340, equations as follows are worked out on the assumption that $Av1 = AvM$ for the re-calculation of $\Delta fx$.

$$\Delta fx = (Bv1 - Tvs) + \log_2 (2^{\Delta d1} - 1) - Qvfm1 \tag{39}$$

$$\Delta d1 = (Avm - Sv) - (Bv1 - Tvs)$$

If the relation is $\Delta fx \geq 0$, the terminal e2 of the judging circuit 341 is rendered to be "High", and the data for AvM, $\Delta fx$ and Tvs are developed from the selector 346. Meanwhile, if the relation is $\Delta fx < 0$, with the terminal e3 being of "High", the output terminal f2 of the logic circuit 343 is rendered to be "High", and the ordinary calculation for the ambient light photographing is effected to work out the data Ava and Tva, and further, the terminal f3 is rendered to be "High". By the above processing, the data for Ava and Tva are developed from the selector 346, and the terminal g1 is rendered to be "High", whereby photographing is effected, with the flash-light emitting device remaining unfired. Meanwhile, in the above case, since the value $\Delta fx$ has been re-calculated due to the excessive light emitting amount at $\Delta fc$, there is no possibility that the relation becomes $\Delta fx > \Delta fM$.

In the cases X, XI, XII and XIII, the relations are respectively as follows.

$$X \begin{cases} Qvfm1 - Qvfm2 = \alpha > 0 \\ Bv2 - Bv1 = \beta < 0 \end{cases}$$

$$XI \begin{cases} Qvfm1 - Qvfm2 = \alpha < 0 \\ Bv2 - Bv1 = \beta > 0 \end{cases}$$

$$XII \begin{cases} Qvfm1 - Qvfm2 = 0 \\ Bv2 - Bv1 \neq 0 \end{cases}$$

$$XIII \begin{cases} Qvfm1 - Qvfm2 \neq 0 \\ Bv2 - Bv1 = 0 \end{cases}$$

Accordingly, as is seen from the equation (1-2), the relation will be represented by $$2^{Bv1 - Tvs} + 2^{Qvfm1 + \Delta fx} = 2^{Bv2 - Tvs} + 2^{Qvfm2 + \Delta fx}$$

In the cases X to XIII, the value $\Delta fx$ satisfying the above equations can not be worked out. Therefore, in the above cases, the values Av1 or $\Delta fx$, or Tvx or Ava and Tva, which render the portion measured by the photoelectric element PD1 to be of optimum exposure through similar calculation as in the case IX, with the terminal b10 of the decoder 332 being of "High", are worked out in the similar manner as in the case IX, and the exposure control is effected based on the data thus obtained. In the above case, it is necessary to give the warning for contrast by working out the value Av2 at the calculation circuit 347 on the basis of the data from the selector 346.

In FIG. 31, the value $\Delta fx$ satisfying an equation $$2^{Bv1 - Tvs} + 2^{Qvfm1 + \Delta fx} = 2^{Bv2 - Tvs} + 2^{Qvfm2 + \Delta fx} \tag{1-2}$$

is worked out, and at the relation $\Delta fx < 0$ or $\Delta fx > \Delta fM$, according to the judgement that controlling the contrast to $2^{\Delta cs} = 1$ ($\Delta cs = 0$) is impossible, the aperture value Av1 for rendering the light measuring portion of the photoelectric element PD1 to be of optimum exposure is worked out based on the data Bv1, Qvfm1, Tvs and Sv. It is to be noted, however, that the contents of the calculation may be modified as described hereinbelow.

In the case where the relation is $\Delta fx < 0$ or $\Delta fx > \Delta fM$, on the assumption that $\Delta fx = 0$ or $\Delta fx = \Delta fM$, the value Tvx satisfying equations $$2^{Bv1 - Tvx} + 2^{Qvfm1} = 2^{Bv2 - Tvx} + 2^{Qvfm2}$$

$$2^{Bv1 - Tvx} + 2^{Qvfm1 + \Delta fM} = 2^{Bv2 - Tvx} + 2^{Qvfm2 + \Delta fm}$$

is worked out, and if the value Tvx is in the range which allows the flash-light photographing to be effected, the exposure time is arranged to be controlled based on the value Tvx thus obtained, while on the other hand, if the value Tvx is outside said range, the value Av1 is worked out, with the limit value set to be Tvx. By the above arrangement, the range in which the contrast can be controlled to $2^{\Delta cs} = 1 (\Delta cs = 0)$ may be made broader.

Figure 33:
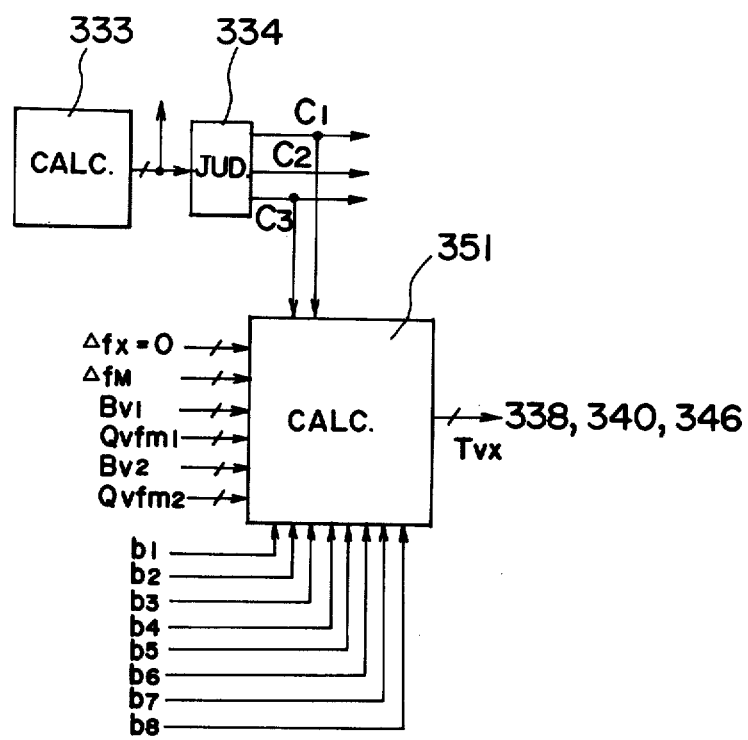
FIG. 33 is a block diagram showing a modification of a part of the circuit arrangement of FIG. 31.

The calculation for obtaining the value Tvx is such that, for example, in the relation represented by $$Qvfm1 - Qvfm2 = \alpha < 0 \quad (30)$$

$$Bv2 - Bv1 = \beta < 0 \quad (31)$$

$$\Delta fx = \Delta fM$$

upon elimination of Qvfm1 and Bv1 for rearrangement in a similar manner as in the description with reference to FIG. 31, the relation will be $$Tvx = Bv2 + \log_2(2^{-\beta} - 1) - Qvfm2 - \log_2(1 - 2^\alpha) - \Delta fM \quad (52)$$

and the value Tvx can be worked out by calculating the equation (52). It is to be noted here that the formula for working out the value Tvx may differ according to the conditions of $\alpha$ and $\beta$ in a similar manner as in the description with reference to FIG. 31. The arrangement as described above is shown in a block diagram of FIG. 33 in which by judging the output $\Delta fx$ of the calculation circuit 333, when the relation becomes $\Delta fx > \Delta fM$, with the terminal C1 being of "High" or the relation is $\Delta fx < 0$, with the terminal C3 being of "High", a calculation circuit 351 coupled to the judging circuit 334 carries out the previously stated calculation according to the state of the terminals b1 to b8 based on the data for $\Delta fx = 0$ or $\Delta fx = \Delta fM$ and the data Bv1, Qvfm1, Bv2 and Qvfm2. The data for Tvx thus worked out are fed to the calculation circuits 338 and 340 and the data selector 346.

In the third embodiment of the present invention as described in the foregoing, although the arrangements are shown only by the block diagrams, it is needless to say that they can readily be put into actual application by those skilled in the art through utilization of a microcomputer.

It should be noted here that, in the foregoing third embodiment, there is shown an arrangement provided with two photoelectric elements, but such arrangement may be modified so that one of said photoelectric elements effects the average light measurement of the whole scene to be photographed, while the other thereof carries out the spot light measurement at the central portion of the scene, or that, with five photoelectric elements provided as in the first and second embodiments, one of the photoelectric elements measures the central portion, and the other four photoelectric elements measure the four corner portions of the scene to be photographed, with the two portions thereof arranged to be manually selectable. The above arrangement may further be so modified as to automatically select, for example, the central portion and the portion in which the measured value during the auxiliary light emission becomes the maximum in the difference in absolute value between the central portion and other four portions, or two portions in which the absolute value for each difference of the five measured values becomes the maximum.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. Light measuring device for use in flash photography, which measures a preliminary flash light to obtain camera exposure information for photography under a primary flash light, comprising:
   a plural means for receiving light coming from various areas of the object field, respectively;
   means for producing outputs in response to said plural means, respectively;
   means for respectively integrating the individual outputs of said producing means during a predetermined period of time including at least the duration time of the preliminary flashing to obtain a first group of signals, respectively;
   means for obtaining a second group of signals respectively including light intensity information of said various areas without the influence of the preliminary flash light, by utilizing the individual outputs of said producing means, respectively;
   means for setting an exposure time signal; and
   means for respectively processing at least each of said first group of signals and each of said second group of signals with said exposure time signal to respectively obtain information of the amount of light effective in determining the exposure on various areas of the photosensitive surface corresponding to said various areas of the object field upon photography under the primary flash light.

2. Light measuring device according to claim 1, wherein said light receiving means each include a photosensitive element for measuring a part of the object field.

3. Light measuring device according to claim 2, wherein said processing means includes means for calculating an average of said information of said light amount.

4. Light measuring device according to claim 3, wherein said average is the weighted average.

5. Light measuring device according to claim 3, wherein said average is the geometrical average.

6. Light measuring device according to claim 3, wherein said average is the harmonic average.

7. Light measuring device according to claim 3, wherein said processing means further includes means for calculating a ratio of one of said information of light amount to said average.

8. Light measuring device according to claim 3, further comprising means for setting a sensitivity signal indicative of the sensitivity of the photosensitive surface to be processed by said processing means, and wherein said processing means includes means for calculating an aperture value in response to said average and said sensitivity signal to achieve an averaged optimum exposure for the whole object field.

9. Light measuring device according to claim 2, further comprising means for comparably indicating exposure information each corresponding to each of said various areas of the object field in response to said information of light amount, respectively.

10. Light measuring device according to claim 1, wherein said processing means includes means for maintaining said first and second groups of signals during a change in the exposure time signal setting to obtain said information of light amount with the values thereof modified by the change in the exposure time signal setting.

11. Light measuring device according to claim 1, further comprising means for setting a change in a guide number between the preliminary and primary flashings, and wherein said processing means includes means for further processing said change in guide number to obtain said information of light amount.

12. Light measuring device according to claim 1 further comprising means for selecting one of said information of light amount, and means for setting a sensitivity signal, and wherein said processing means includes means for calculating an aperture value in response to said selected information of light amount and said sensitivity signal to achieve an optimum exposure for an area of the object field corresponding to said selected information of light amount.

13. Light measuring device according to claim 1, wherein said processing means includes means for calculating a ratio of one to another of said information of light amount.

14. Light measuring device for use in flash photography, which measures a preliminary flash light to obtain camera exposure information for photography under a primary flash light, comprising:
at least a pair of means for receiving light coming from a pair of areas of the object field, respectively;
means for producing outputs in response to said pair means, respectively;
means for respectively integrating the individual outputs of said producing means during a predetermined period of time including at least the duration time of the preliminary flashing to obtain a first group of signals, respectively;
means for obtaining a second group of signals respectively including light intensity information of said pair of areas without the influence of the preliminary flash light, by utilizing the individual outputs of said producing means, respectively;
means for setting an exposure time signal; and
means for processing said first and second groups of signals with said exposure time signal to obtain a ratio of a first light amount to a second light amount, said first and second light amounts being effective in determining the exposure on a pair of areas of the photosensitive surface corresponding to said pair of areas of the object field upon photography under primary flash light, respectively.

15. Light measuring device according to claim 14, wherein said processing means includes means for warning when said ratio is outside a given range.

16. Light measuring device according to claim 14, further comprising means for setting a change in guide number between the preliminary and primary flashings, and wherein said processing means includes means for further processing said change in guide number to obtain said ratio.

17. Light measuring device for use in flash photography, which measures a preliminary flash light to obtain camera exposure information for photography under a primary flash light, comprising:
at least a pair of means for receiving light coming from a pair of areas of the object field, respectively;
means for producing outputs in response to said light receiving means, respectively;
means for respectively integrating the individual outputs of said producing means during a predetermined period of time including at least the duration time of the preliminary flashing to obtain a first group of signals, respectively;
means for obtaining a second group of signals respectively including light intensity information of said pair of areas without the influence of the preliminary flash light, by utilizing the individual outputs of said producing means, respectively;
means for setting one of an exposure time signal and a signal indicative of a change in guide number between the preliminary and primary flashings; and
means for processing said first and second groups of signals with the signal set by said setting means to obtain the other of said exposure time signal and said signal indicative of the change in guide number so as to achieve a given ratio of a first light amount to a second light amount, said first and second light amounts being effective in determining the exposure on a pair of areas of the photosensitive surface corresponding to said pair of areas of the object field upon photography under the primary flash light, respectively.

18. Light measuring device according to claim 17 further comprising means connected to said processing means for setting said ratio.

19. Light measuring device according to claim 17, wherein one of said light receiving means includes a photosensitive element for averaging light measurement.

20. Light measuring device according to claim 17, wherein said processing means includes means for identifying that the obtained signal by said processing means is impractical, and means for replacing the obtained signal by a signal closest to the obtained signal in the practical range.

21. Light measuring device according to claim 20, wherein said processing means includes means for calculating the ratio of said first light amount to said second light amount in response to said first and second groups of signals, the signal set by said setting means and said closest signal, and means for warning when said ratio is outside a given range.

22. Light measuring device according to claim 20, wherein said processing means includes means for substituting a signal for the signal set by said setting means, when the obtained signal is replaced with said closest signal, so as to achieve said given ratio in response to said first and second groups of signals, said closest signal and said substituted signal.

23. Light measuring device according to claim 17, wherein said processing means includes means for detecting that the given ratio is impossible by any means.

24. Light measuring device according to claim 23 further comprising means for adjusting a sensitivity signal, and wherein said processing means includes means for calculating an aperture value in response to, at least, one of said first group of signals, a corresponding one of said second group of signals, the signal set by said setting means, said sensitivity signal and a predetermined value assumed in place of a value of the signal to be obtained by said processing means, if said detecting means detects that the given ratio is impossible.

25. Light measuring device according to claim 23, wherein said processing means includes means for calculating the ratio of said first light amount to said second light amount in response to said first and second groups of signals, the signal set by said setting means and said predetermined signal, and means for warning when said ratio is outside a given range.

26. Light measuring device according to claim 17, further comprising means for adjusting a sensitivity signal and means for selecting one of said areas of the object field, and wherein said processing means includes means for calculating an aperture value in response to one of said first group of signals corresponding to the selected area of the object field, a corresponding one of said second group of signals, said exposure time signal, said signal indicative of a change in guide number and said sensitivity signal.

27. Light measuring device according to claim 17, wherein said light receiving means includes three or more light receiving elements corresponding to three or more areas of the object field, and wherein said light measuring device further comprises means for selecting the pair of areas among said three or more areas.

28. Light measuring device for use in flash photography, which measures a preliminary flash light to obtain camera exposure information for photography under a primary flash light, comprising:
- at least a pair of means for receiving light coming from a pair of areas of the object field, respectively;
- means for producing outputs in response to said light receiving means, respectively;
- means for respectively integrating the individual outputs of said producing means during a predetermined period of time including at least the duration time of the preliminary flashing to obtain a first group of signals, respectively;
- means for obtaining a second group of signals respectively including light intensity information of said pair of areas without the influence of the preliminary flash light, by utilizing the individual outputs of said producing means, respectively; and
- means for processing at least said first and second groups of signals to obtain camera exposure information.

29. Light measuring device according to claim 28, wherein said processing means includes means responsive to said first and second groups of signals for obtaining an exposure time signal so as to achieve a given ratio of a first light amount to a second light amount, said first and second light amounts being effective in determining the exposure on a pair of areas of the photosensitive surface corresponding to said pair of areas of the object field upon photography under the primary flash light, respectively.

30. Light measuring device for use in flash photography, which measures a preliminary flash light to obtain camera exposure information for photography under a primary flash light, comprising:
- means for receiving light coming from the object field;
- means for producing an output in response to said light receiving means;
- means for integrating the output of said producing means during a predetermined period of time including at least the duration time of the preliminary flashing to obtain a first signal;
- means for obtaining a second signal including light intensity information without influence of the preliminary flash light, by utilizing the output of said producing means;
- means for setting an exposure time signal;
- means for setting an aperture size signal;
- means for setting a sensitivity signal; and
- means for processing said first and second signals, said exposure time signal, said aperture size signal and said sensitivity signal to obtain a signal indicative of a difference in guide number between the preliminary and primary flashings so as to achieve an optimum exposure.

31. Light measuring device according to claim 30 further comprising means for controlling the primary flashing in response to said signal indicative of the difference in guide number.

32. Light measuring device according to claim 30 further comprising means for warning when the difference in guide number is impractical.

33. A light measuring system, adapted for use with a camera having a variable aperture and shutter speed and an electronic flash device for flash photography, to ensure proper contrast in the object scene comprising:
- means for producing a preliminary flash of light towards the object scene;
- means for measuring the preliminary flash of light reflected from discrete predetermined areas of the object scene and producing corresponding preliminary light signals representative of the object scene;
- means for measuring ambient light reflected from the discrete predetermined areas of the object scene and producing corresponding ambient light signals representative of the object scene;
- means for setting a predetermined exposure time signal, and
- means for producing the preliminary light signals and the ambient light signals relative to the exposure time signal to determine the proper light exposure of a photosensitive member in the camera to record the object scene.

34. The invention of claim 33 further including display apparatus for providing indicia indicating the exposure condition of the predetermined areas.

35. The invention of claim 33 further including means for varying the intensity of the flash in response to the determination of the proper light exposure.

* * * * *